US010894663B2

(12) United States Patent
Kapust et al.

(10) Patent No.: US 10,894,663 B2
(45) Date of Patent: Jan. 19, 2021

(54) AUTOMATED STORAGE AND RETRIEVAL SYSTEM

(71) Applicant: Symbotic, LLC, Wilmington, MA (US)

(72) Inventors: Michael J. Kapust, Tewksbury, MA (US); Gerald M. Friedman, New Ipswich, NH (US)

(73) Assignee: Symbotic LLC, Wilmington, MA (US)

( * ) Notice: Subject to any disclaimer, the term of this patent is extended or adjusted under 35 U.S.C. 154(b) by 0 days.

(21) Appl. No.: 14/486,008

(22) Filed: Sep. 15, 2014

(65) Prior Publication Data

US 2015/0081089 A1 Mar. 19, 2015

Related U.S. Application Data

(60) Provisional application No. 61/877,614, filed on Sep. 13, 2013.

(51) Int. Cl.
*B65G 1/04* (2006.01)
*B65G 1/137* (2006.01)

(52) U.S. Cl.
CPC ......... *B65G 1/0492* (2013.01); *B65G 1/0435* (2013.01); *B65G 1/1373* (2013.01)

(58) Field of Classification Search
CPC .. B65G 1/0435; B65G 49/085; B65G 1/0407; B65G 1/04; B65G 1/0485; B65G 1/0421; B65G 1/0428; B65G 1/1378; B65G 1/026; B65G 1/06; B65G 1/1373; B65G 1/0492; B66F 9/07; B66F 9/141; G11B 15/6835; G11B 17/225; B27N 3/22; B63C 15/00; H01L 21/67769

USPC ................................................. 414/280–286
See application file for complete search history.

(56) References Cited

U.S. PATENT DOCUMENTS

| | | | |
|---|---|---|---|
| 1,845,962 | A | 2/1932 | Dorr |
| 1,887,667 | A | 11/1932 | Wheeler |
| 2,606,508 | A | 8/1952 | van Nes |
| 2,656,995 | A | 10/1953 | Wolf |
| 2,673,689 | A | 3/1954 | Bonanno |

(Continued)

FOREIGN PATENT DOCUMENTS

| | | |
|---|---|---|
| CN | 2752234 | 1/2006 |
| CN | 202321418 | 7/2012 |

(Continued)

OTHER PUBLICATIONS

JP2006160523A (Yoon) abstract/translation (Year: 2006).*

(Continued)

*Primary Examiner* — Jeffrey A Shapiro
(74) *Attorney, Agent, or Firm* — Perman & Green, LLP

(57) ABSTRACT

An autonomous transport vehicle including a frame forming a payload area, telescoping arms movably mounted to the frame, each telescoping arm being configured for extension and retraction relative to the frame along an extension axis to effect transfer of at least one pickface to and from the payload area, and traversal, relative to the frame, in at least one direction that is angled to the extension axis, and at least one tab extending from each telescoping arm where the at least one tab extends in a direction transverse to the direction of extension and retraction, and the at least one tab on one of the telescoping arms opposes the at least one tab on another of the telescoping arms.

17 Claims, 30 Drawing Sheets

(56) References Cited

U.S. PATENT DOCUMENTS

| | | |
|---|---|---|
| 2,792,234 A | 5/1957 | Page |
| 2,840,248 A | 6/1958 | Grove et al. |
| 2,877,575 A | 3/1959 | Stedt |
| 2,923,421 A | 2/1960 | de Senigon de Roumefort |
| 2,945,604 A | 7/1960 | Kroll et al. |
| 2,996,621 A | 8/1961 | Barrett, Jr. |
| 3,016,154 A | 1/1962 | Ugolini et al. |
| 3,161,303 A | 12/1964 | Burrows |
| 3,162,459 A | 12/1964 | Marmorine et al. |
| 3,269,744 A | 8/1966 | Dobson |
| 3,369,648 A | 2/1968 | Wentz |
| 3,370,492 A | 2/1968 | Treff |
| 3,512,625 A * | 5/1970 | Burgess ............... B65G 17/063 198/418 |
| 3,519,149 A | 7/1970 | Saul |
| 3,554,390 A | 1/1971 | Saul |
| 3,581,915 A | 6/1971 | Saul |
| 3,636,586 A | 1/1972 | Bollinger et al. |
| 3,677,421 A | 7/1972 | Kintner |
| 3,732,828 A | 5/1973 | Wanner |
| 3,737,056 A | 6/1973 | Hathcock |
| 3,738,506 A | 6/1973 | Cornford et al. |
| 3,744,945 A | 7/1973 | Metrailer |
| 3,746,189 A | 7/1973 | Burch et al. |
| 3,751,758 A | 8/1973 | Higbee et al. |
| 3,774,543 A | 11/1973 | Welsh |
| 3,782,565 A | 1/1974 | Doran et al. |
| 3,789,765 A | 2/1974 | Schultz |
| 3,802,580 A | 4/1974 | Castaldi |
| 3,811,383 A | 5/1974 | Butzow |
| 3,822,647 A | 7/1974 | Hill et al. |
| 3,845,715 A | 11/1974 | Hochstrasser |
| 3,850,111 A | 11/1974 | Hansen |
| 3,876,087 A | 4/1975 | Osta |
| 3,876,095 A | 4/1975 | Stedt |
| 3,896,955 A | 7/1975 | Collins et al. |
| 3,904,216 A | 9/1975 | Metrailer |
| 3,940,105 A | 2/1976 | Metrailer |
| 3,970,840 A | 7/1976 | De Bruine |
| 3,976,302 A | 8/1976 | Hammarstrand |
| 3,984,012 A | 10/1976 | Ennis et al. |
| 4,007,843 A | 2/1977 | Lubbers et al. |
| 4,026,365 A | 5/1977 | Andersson et al. |
| 4,037,291 A | 7/1977 | Huempfner et al. |
| 4,057,019 A | 11/1977 | Shaffer |
| 4,064,986 A | 12/1977 | Bertovich |
| 4,072,203 A | 2/1978 | Pierson |
| 4,079,955 A | 3/1978 | Thorpe et al. |
| 4,087,116 A | 5/1978 | Morimoto |
| 4,174,854 A | 11/1979 | Spicka et al. |
| 4,183,304 A | 1/1980 | Forster |
| 4,213,396 A | 7/1980 | Mehren et al. |
| 4,214,535 A | 7/1980 | Gerhard |
| 4,219,296 A | 8/1980 | Fujii et al. |
| 4,223,611 A | 9/1980 | Dawson et al. |
| 4,265,582 A | 5/1981 | Theobald |
| 4,268,207 A | 5/1981 | Pipes |
| 4,271,764 A | 6/1981 | Braun et al. |
| 4,273,234 A | 6/1981 | Bourgeois |
| 4,307,988 A | 12/1981 | Page et al. |
| 4,346,659 A | 8/1982 | Binder |
| 4,349,937 A | 9/1982 | Fontana |
| 4,349,938 A | 9/1982 | Fontana |
| 4,353,572 A | 10/1982 | McCain |
| 4,372,219 A | 2/1983 | Gibbs |
| 4,372,724 A | 2/1983 | Stolzer |
| 4,394,104 A | 7/1983 | Camerini et al. |
| 4,395,181 A | 7/1983 | Loomer |
| 4,406,570 A | 9/1983 | Duncan et al. |
| 4,415,975 A | 11/1983 | Burt |
| 4,428,708 A | 1/1984 | Burt |
| 4,445,440 A | 5/1984 | Geiss |
| 4,459,078 A | 7/1984 | Chiantella et al. |
| 4,470,742 A | 9/1984 | Schindler |
| 4,492,504 A | 1/1985 | Hainsworth |
| 4,505,630 A | 3/1985 | Kaschner et al. |
| 4,527,486 A | 7/1985 | Baird et al. |
| 4,538,950 A | 9/1985 | Shiomi et al. |
| 4,621,526 A | 11/1986 | Carr et al. |
| 4,678,390 A | 7/1987 | Bonneton et al. |
| 4,679,149 A | 7/1987 | Merz |
| 4,715,662 A | 12/1987 | van Zanten et al. |
| 4,716,530 A | 12/1987 | Ogawa et al. |
| 4,726,725 A | 2/1988 | Baker et al. |
| 4,733,740 A | 3/1988 | Bigowsky et al. |
| 4,750,429 A | 6/1988 | Mordaunt et al. |
| 4,773,807 A | 9/1988 | Kroll et al. |
| 4,777,416 A | 10/1988 | George, II et al. |
| 4,786,229 A | 11/1988 | Henderson |
| 4,811,229 A | 3/1989 | Wilson |
| 4,812,985 A | 3/1989 | Hambrick et al. |
| 4,856,263 A | 8/1989 | Schneider et al. |
| 4,856,956 A | 8/1989 | Zur |
| 4,862,807 A | 9/1989 | Guadagno |
| 4,878,876 A | 11/1989 | Ishimoto |
| 4,883,401 A | 11/1989 | Kavieff |
| 4,887,016 A | 12/1989 | Malick |
| 4,905,783 A | 3/1990 | Bober |
| 4,909,697 A | 3/1990 | Bernard, II et al. |
| 4,936,738 A | 6/1990 | Brennan et al. |
| 4,942,826 A | 7/1990 | Erickson |
| 4,966,242 A | 10/1990 | Baillargeon |
| 4,966,513 A | 10/1990 | Motoda |
| 4,967,370 A | 10/1990 | Stern et al. |
| 4,987,992 A | 1/1991 | Pfleger |
| 4,993,905 A | 2/1991 | Potocnjak |
| 5,002,449 A | 3/1991 | Kita et al. |
| 5,004,399 A | 4/1991 | Sullivan et al. |
| 5,015,145 A | 5/1991 | Angell et al. |
| 5,069,592 A | 12/1991 | Galperin |
| 5,096,355 A | 3/1992 | Schroder |
| 5,134,353 A | 7/1992 | Kita et al. |
| 5,134,940 A | 8/1992 | Fujita et al. |
| 5,135,344 A | 8/1992 | Kita et al. |
| 5,140,787 A | 8/1992 | Corcoran |
| 5,149,654 A | 9/1992 | Gross et al. |
| 5,156,639 A | 10/1992 | Bostrom |
| 5,163,001 A | 11/1992 | Luke, Jr. |
| 5,165,838 A | 11/1992 | Kallansrude et al. |
| 5,168,815 A | 12/1992 | Comer et al. |
| 5,179,329 A | 1/1993 | Nishikawa et al. |
| 5,187,664 A | 2/1993 | Yardley et al. |
| 5,199,840 A | 4/1993 | Castaldi et al. |
| 5,207,555 A | 5/1993 | Shiari |
| 5,213,463 A | 5/1993 | Rothlisberger et al. |
| 5,218,909 A | 6/1993 | Ng |
| 5,219,264 A | 6/1993 | McClure et al. |
| 5,220,263 A | 6/1993 | Onishi et al. |
| 5,226,782 A | 7/1993 | Rigling |
| 5,238,100 A | 8/1993 | Rose, Jr. et al. |
| 5,265,944 A | 11/1993 | Gloceri |
| 5,271,703 A | 12/1993 | Lindqvist et al. |
| 5,273,392 A | 12/1993 | Bernard, II et al. |
| 5,281,901 A | 1/1994 | Yardley et al. |
| 5,286,157 A | 2/1994 | Vainio et al. |
| 5,307,888 A | 5/1994 | Urvoy |
| 5,323,098 A | 6/1994 | Hamaguchi et al. |
| 5,327,354 A | 7/1994 | Tsujimoto |
| 5,328,316 A | 7/1994 | Hoffmann |
| 5,333,982 A | 8/1994 | Tanizawa et al. |
| 5,333,983 A | 8/1994 | Hatouchi et al. |
| 5,337,880 A | 8/1994 | Claycomb et al. |
| 5,350,270 A | 9/1994 | Stallard et al. |
| 5,362,197 A | 11/1994 | Rigling |
| 5,370,492 A | 12/1994 | Gleyze et al. |
| 5,377,851 A | 1/1995 | Asano et al. |
| 5,377,910 A | 1/1995 | Newton et al. |
| 5,379,229 A | 1/1995 | Parsons et al. |
| 5,380,139 A | 1/1995 | Pohjonen et al. |
| 5,388,955 A | 2/1995 | Schroder |
| 5,395,206 A | 3/1995 | Cerny, Jr. |
| 5,397,212 A | 3/1995 | Watanabe et al. |
| 5,403,147 A | 4/1995 | Tanaka |
| 5,405,232 A | 4/1995 | Lloyd et al. |

(56) References Cited

U.S. PATENT DOCUMENTS

| | | |
|---|---|---|
| 5,410,969 A | 5/1995 | Rene et al. |
| 5,418,732 A | 5/1995 | McFadin |
| 5,421,265 A | 6/1995 | Suigmoto et al. |
| 5,421,685 A | 6/1995 | Elmer et al. |
| 5,421,697 A | 6/1995 | Ostwald |
| 5,425,612 A | 6/1995 | Ebstein |
| 5,434,490 A | 7/1995 | Ishida et al. |
| 5,445,485 A | 8/1995 | Poulet |
| 5,450,797 A | 9/1995 | Becker et al. |
| 5,460,476 A | 10/1995 | Gazza |
| 5,472,309 A | 12/1995 | Bernard, II et al. |
| 5,501,295 A | 3/1996 | Muller et al. |
| 5,509,538 A | 4/1996 | Spindler et al. |
| 5,525,884 A | 6/1996 | Sugiura et al. |
| 5,529,165 A | 6/1996 | Shupert |
| 5,548,516 A | 8/1996 | Gudat et al. |
| 5,559,696 A | 9/1996 | Borenstein |
| 5,564,880 A | 10/1996 | Lederer |
| 5,588,796 A | 12/1996 | Ricco et al. |
| 5,601,395 A | 2/1997 | Lichti, Sr. et al. |
| 5,611,422 A | 3/1997 | Harkonen |
| 5,615,992 A | 4/1997 | Proske et al. |
| 5,626,362 A | 5/1997 | Mottola |
| 5,632,350 A | 5/1997 | Gauvin |
| 5,650,703 A | 7/1997 | Yardley et al. |
| 5,664,688 A | 9/1997 | Kitanaka et al. |
| 5,664,929 A | 9/1997 | Esaki et al. |
| 5,667,230 A | 9/1997 | Riley et al. |
| 5,668,724 A | 9/1997 | Ehret et al. |
| 5,707,199 A | 1/1998 | Faller |
| 5,709,291 A | 1/1998 | Nishino et al. |
| 5,718,322 A | 2/1998 | Mulhern |
| 5,718,551 A | 2/1998 | Ebstein |
| 5,725,063 A | 3/1998 | Ceragioli et al. |
| 5,743,562 A | 4/1998 | Mottola |
| 5,764,014 A | 6/1998 | Jakeway et al. |
| 5,798,920 A | 8/1998 | Crucius et al. |
| 5,801,506 A | 9/1998 | Netzler |
| 5,802,980 A | 9/1998 | Hofmiller |
| 5,806,870 A | 9/1998 | Hull et al. |
| 5,810,540 A | 9/1998 | Castaldi |
| 5,829,096 A | 11/1998 | Perry |
| 5,833,431 A | 11/1998 | Rosse, III et al. |
| 5,839,872 A | 11/1998 | Goto et al. |
| 5,847,537 A | 12/1998 | Parmley, Sr. |
| 5,857,413 A | 1/1999 | Ward |
| 5,866,469 A | 2/1999 | Hays |
| 5,918,951 A | 7/1999 | Rudd, III |
| 5,927,926 A | 7/1999 | Yagi et al. |
| 5,928,058 A | 7/1999 | Francis et al. |
| 5,974,348 A | 10/1999 | Rocks |
| 5,988,306 A | 11/1999 | Ooishi |
| 6,000,502 A | 12/1999 | Leasor et al. |
| 6,021,367 A | 2/2000 | Pilutti et al. |
| 6,024,381 A | 2/2000 | Mottola |
| 6,036,427 A | 3/2000 | Kita et al. |
| 6,038,501 A | 3/2000 | Kawakami |
| 6,061,607 A | 5/2000 | Bradley et al. |
| 6,062,942 A | 5/2000 | Ogihara |
| 6,116,842 A | 9/2000 | Harris et al. |
| 6,135,697 A * | 10/2000 | Isaacs ................ B07C 3/008 414/280 |
| 6,149,366 A | 11/2000 | Deandrea |
| 6,158,566 A | 12/2000 | Pollock |
| 6,164,045 A | 12/2000 | Focke et al. |
| 6,170,635 B1 | 1/2001 | Rommelli |
| 6,213,704 B1 | 4/2001 | White et al. |
| 6,220,676 B1 | 4/2001 | Rudd, III |
| 6,257,597 B1 | 7/2001 | Galazin |
| 6,257,826 B1 | 7/2001 | Neagle et al. |
| 6,272,406 B2 | 8/2001 | Alofs et al. |
| 6,289,260 B1 | 9/2001 | Bradley et al. |
| 6,295,922 B1 | 10/2001 | Salamone et al. |
| 6,324,994 B1 | 12/2001 | Glenn |
| 6,325,586 B1 | 12/2001 | Loy |
| 6,341,269 B1 | 1/2002 | Dulaney et al. |
| 6,345,217 B1 | 2/2002 | Zeitler et al. |
| 6,352,035 B1 | 3/2002 | Kashiwase et al. |
| 6,354,430 B1 | 3/2002 | Oe |
| 6,360,673 B1 | 3/2002 | Herrin et al. |
| 6,377,867 B1 | 4/2002 | Bradley et al. |
| 6,389,981 B1 | 5/2002 | Strothmann et al. |
| 6,390,756 B1 | 5/2002 | Isaacs et al. |
| 6,391,226 B1 | 5/2002 | Chauvette et al. |
| 6,394,260 B1 | 5/2002 | Barth et al. |
| 6,397,990 B1 | 6/2002 | Brien et al. |
| 6,425,723 B1 | 7/2002 | Okada et al. |
| 6,439,131 B1 | 8/2002 | Higgins |
| 6,439,955 B1 | 8/2002 | Feketo |
| 6,463,360 B1 | 10/2002 | Terada et al. |
| 6,496,755 B2 | 12/2002 | Wallach et al. |
| 6,503,043 B1 | 1/2003 | Smith et al. |
| 6,508,102 B1 | 1/2003 | Margolis et al. |
| 6,563,128 B2 | 5/2003 | Lublin et al. |
| 6,597,143 B2 | 7/2003 | Song et al. |
| 6,600,418 B2 | 7/2003 | Francis et al. |
| 6,601,435 B2 | 8/2003 | Hong |
| 6,629,502 B2 | 10/2003 | Matsukawa |
| 6,631,321 B1 | 10/2003 | Ciprian |
| 6,645,355 B2 | 11/2003 | Hanson et al. |
| 6,652,213 B1 | 11/2003 | Mitchell et al. |
| 6,655,297 B2 | 12/2003 | Kawato et al. |
| 6,663,334 B2 | 12/2003 | Warhurst et al. |
| 6,692,211 B2 | 2/2004 | Yuyama et al. |
| 6,695,328 B2 | 2/2004 | Cope |
| 6,721,638 B2 | 4/2004 | Zeitler |
| 6,748,292 B2 | 6/2004 | Mountz |
| 6,763,767 B2 | 7/2004 | Jackson et al. |
| 6,764,373 B1 | 7/2004 | Osawa et al. |
| 6,808,058 B2 | 10/2004 | Shiohara |
| 6,836,701 B2 | 12/2004 | McKee |
| 6,851,921 B2 | 2/2005 | Haag |
| 6,859,682 B2 | 2/2005 | Naka et al. |
| 6,861,154 B2 | 3/2005 | Olson et al. |
| 6,864,489 B2 | 3/2005 | Chen et al. |
| 6,880,202 B2 | 4/2005 | Thompson et al. |
| 6,922,632 B2 | 7/2005 | Foxlin |
| 6,928,336 B2 | 8/2005 | Peshkin et al. |
| 6,929,440 B1 | 8/2005 | Grond |
| 6,948,899 B2 | 9/2005 | Lee |
| 6,950,722 B2 | 9/2005 | Mountz |
| 6,988,451 B2 | 1/2006 | Marcotte et al. |
| 6,997,665 B2 | 2/2006 | Bouche et al. |
| 7,002,698 B2 | 2/2006 | Hanson et al. |
| 7,002,772 B2 | 2/2006 | Yardy |
| 7,003,375 B2 | 2/2006 | Inui |
| 7,008,164 B2 | 3/2006 | Rokkaku |
| 7,011,487 B2 | 3/2006 | Kafka et al. |
| 7,017,228 B2 | 3/2006 | Silverstein et al. |
| 7,025,191 B2 | 4/2006 | Lichti et al. |
| 7,039,501 B2 | 5/2006 | Freeman et al. |
| 7,054,716 B2 | 5/2006 | McKee et al. |
| 7,058,866 B2 | 6/2006 | Flanagan et al. |
| 7,066,291 B2 | 6/2006 | Martins et al. |
| 7,069,124 B1 | 6/2006 | Whittaker et al. |
| 7,074,151 B2 | 7/2006 | Thompson |
| 7,085,097 B2 | 8/2006 | Starr et al. |
| 7,100,294 B1 | 9/2006 | Goldsobel et al. |
| 7,101,139 B1 | 9/2006 | Benedict |
| 7,102,848 B2 | 9/2006 | Kumpon et al. |
| 7,110,855 B2 | 9/2006 | Leishman |
| 7,119,982 B2 | 10/2006 | Starr et al. |
| 7,128,196 B2 | 10/2006 | Oldford et al. |
| 7,128,521 B2 | 10/2006 | Hansl |
| 7,133,746 B2 | 11/2006 | Abramson et al. |
| 7,135,992 B2 | 11/2006 | Karlsson et al. |
| 7,137,593 B2 | 11/2006 | Baatz |
| 7,145,478 B2 | 12/2006 | Goncalves et al. |
| 7,145,747 B2 | 12/2006 | Brace et al. |
| 7,155,308 B2 | 12/2006 | Jones |
| 7,184,855 B2 | 2/2007 | Stingel, III et al. |
| 7,192,034 B2 | 3/2007 | Radke et al. |
| 7,221,998 B2 | 5/2007 | Brust et al. |
| 7,266,422 B1 | 9/2007 | DeMotte et al. |

(56) References Cited

U.S. PATENT DOCUMENTS

| | | |
|---|---|---|
| 7,284,652 B2 | 10/2007 | Zeitler et al. |
| 7,319,320 B2 | 1/2008 | Kawashima et al. |
| 7,329,081 B2 | 2/2008 | Baker et al. |
| 7,332,890 B2 | 2/2008 | Cohen et al. |
| 7,376,487 B2 | 5/2008 | Kumhyr |
| 7,381,022 B1 | 6/2008 | King |
| 7,386,379 B2 | 6/2008 | Naik et al. |
| 7,397,213 B2 | 7/2008 | Im et al. |
| 7,402,018 B2 | 7/2008 | Mountz et al. |
| 7,426,970 B2 | 9/2008 | Olsen |
| 7,421,268 B2 | 10/2008 | Steiner et al. |
| 7,433,759 B2 | 10/2008 | Nangoy |
| 7,456,596 B2 | 11/2008 | Goodall et al. |
| 7,460,462 B2 | 12/2008 | Mejia et al. |
| 7,495,561 B2 | 2/2009 | Bodin et al. |
| 7,499,155 B2 | 3/2009 | Cappelletti |
| 7,506,404 B2 | 3/2009 | Block et al. |
| 7,520,376 B2 | 4/2009 | Bar |
| 7,532,947 B2 | 5/2009 | Waddington et al. |
| 7,536,283 B2 | 5/2009 | Potter et al. |
| 7,539,557 B2 | 5/2009 | Yamauchi |
| 7,568,572 B2 | 8/2009 | Zeitler et al. |
| 7,575,406 B2 | 8/2009 | Hofmeister et al. |
| 7,584,812 B2 | 9/2009 | Radke et al. |
| 7,587,260 B2 | 9/2009 | Bruemmer et al. |
| 7,591,630 B2 | 9/2009 | Lert, Jr. |
| 7,615,957 B2 | 11/2009 | Kim et al. |
| 7,620,477 B2 | 11/2009 | Bruemmer |
| 7,636,982 B2 | 12/2009 | Jones et al. |
| 7,641,014 B2 | 1/2010 | Hu |
| 7,648,002 B2 | 1/2010 | Easton et al. |
| 7,653,457 B2 | 1/2010 | Bloom |
| 7,661,920 B2 | 2/2010 | Kantola et al. |
| 7,668,621 B2 | 2/2010 | Bruemmer |
| 7,671,293 B2 | 3/2010 | Fry et al. |
| 7,682,122 B2 | 3/2010 | Maynard et al. |
| 7,686,560 B2 | 3/2010 | Laurin et al. |
| 7,689,318 B2 | 3/2010 | Draper |
| 7,693,757 B2 | 4/2010 | Zimmerman |
| 7,695,235 B1 | 4/2010 | Rallis |
| 7,706,917 B1 | 4/2010 | Chiappetta et al. |
| 7,725,213 B2 | 5/2010 | Hysell et al. |
| 7,725,253 B2 | 5/2010 | Foxlin |
| 7,729,801 B2 | 6/2010 | Abramson |
| 7,730,781 B2 | 6/2010 | Zhang et al. |
| 7,751,928 B1 | 7/2010 | Antony et al. |
| 7,769,513 B2 | 8/2010 | Breed et al. |
| 7,771,152 B2 | 8/2010 | Waltersbacher |
| 7,783,383 B2 | 8/2010 | Eliuk et al. |
| 7,792,350 B2 | 9/2010 | Kiley et al. |
| 7,793,742 B2 | 9/2010 | Donaldson et al. |
| 7,801,644 B2 | 9/2010 | Bruemmer et al. |
| 7,826,919 B2 | 11/2010 | D'Andrea et al. |
| 7,826,920 B2 | 11/2010 | Stevens et al. |
| 7,826,926 B2 | 11/2010 | Myeong et al. |
| 7,845,486 B2 | 12/2010 | Spencer et al. |
| 7,856,290 B2 | 12/2010 | Kumhyr |
| 7,861,844 B2 | 1/2011 | Hayduchok et al. |
| 7,866,671 B2 | 1/2011 | Madler |
| 7,873,469 B2 | 1/2011 | D'Andrea et al. |
| 7,885,750 B2 | 2/2011 | Lu |
| 7,894,940 B2 | 2/2011 | Kumhyr |
| 7,909,562 B2 | 3/2011 | Mead |
| 7,926,145 B2 | 4/2011 | Liao |
| 7,931,431 B2 | 4/2011 | Benedict et al. |
| 7,941,244 B2 | 5/2011 | Somin et al. |
| 7,944,368 B2 | 5/2011 | Carter et al. |
| 7,959,395 B2 | 6/2011 | Hofmeister et al. |
| 7,960,973 B2 | 6/2011 | Zeller et al. |
| 7,963,384 B2 | 6/2011 | Lafontaine |
| 7,965,871 B2 | 6/2011 | Ihara et al. |
| 7,967,354 B2 | 6/2011 | Faulkner et al. |
| 7,972,102 B2 | 7/2011 | Ward et al. |
| 7,974,738 B2 | 7/2011 | Bruemmer et al. |
| 7,988,398 B2 | 8/2011 | Hofmeister et al. |
| 7,991,505 B2 | 8/2011 | Lert, Jr. et al. |
| 8,000,835 B2 | 8/2011 | Friz et al. |
| 8,001,837 B2 | 8/2011 | Larson et al. |
| 8,006,824 B2 | 8/2011 | Wada et al. |
| 8,007,221 B1 | 8/2011 | More et al. |
| 8,024,064 B1 | 9/2011 | Sanghavi et al. |
| 8,024,066 B2 | 9/2011 | Reverte et al. |
| 8,028,822 B2 | 10/2011 | Braunstein |
| 8,031,086 B2 | 10/2011 | Thacher et al. |
| 8,041,456 B1 | 10/2011 | Blackwell et al. |
| 8,042,627 B2 | 10/2011 | Yang et al. |
| 8,046,103 B2 | 10/2011 | Abramson et al. |
| 8,046,160 B2 | 10/2011 | Carter et al. |
| 8,047,756 B2 | 11/2011 | Tuffs et al. |
| 8,060,257 B2 | 11/2011 | Close et al. |
| 8,136,650 B2 | 3/2012 | Frich et al. |
| 8,280,548 B2 | 10/2012 | Zuber et al. |
| 8,364,309 B1 | 1/2013 | Bailey |
| 8,378,825 B2 | 2/2013 | Dahms et al. |
| 8,425,173 B2 | 4/2013 | Lert et al. |
| 8,480,347 B2 | 7/2013 | Schafer |
| 8,515,575 B2 | 8/2013 | Pfeiffer |
| 8,594,835 B2 | 11/2013 | Lert et al. |
| 8,790,061 B2 | 7/2014 | Yamashita |
| 8,965,619 B2 | 2/2015 | Sullivan et al. |
| 9,020,639 B2 | 4/2015 | Bewley et al. |
| 9,037,286 B2 | 5/2015 | Lert |
| 9,327,903 B2 | 5/2016 | Toebes et al. |
| 2002/0029719 A1 | 3/2002 | Matsukawa |
| 2002/0037208 A1 | 3/2002 | Patrito |
| 2002/0076307 A1* | 6/2002 | Fallin .................. B65G 1/0421 414/266 |
| 2002/0124389 A1 | 9/2002 | Matson |
| 2003/0033217 A1 | 2/2003 | Cutlip |
| 2003/0051544 A1 | 3/2003 | Hong |
| 2003/0074125 A1 | 4/2003 | Walenty et al. |
| 2003/0185656 A1* | 10/2003 | Hansl ..................... B66F 9/07 414/277 |
| 2003/0200129 A1 | 10/2003 | Klaubauf et al. |
| 2004/0088081 A1 | 5/2004 | Song et al. |
| 2004/0093116 A1 | 5/2004 | Mountz |
| 2004/0167667 A1 | 8/2004 | Goncalves et al. |
| 2004/0238326 A1 | 12/2004 | Lichti |
| 2005/0029029 A1 | 2/2005 | Thorne |
| 2005/0047895 A1 | 3/2005 | Lert, Jr. |
| 2005/0095095 A1* | 5/2005 | Hansl ..................... B66F 9/07 414/280 |
| 2005/0131645 A1 | 6/2005 | Panopoulos |
| 2005/0151360 A1 | 7/2005 | Bertrand et al. |
| 2005/0166787 A1 | 8/2005 | Astrom |
| 2005/0212478 A1 | 9/2005 | Takenaka |
| 2005/0217532 A1 | 10/2005 | Conneally |
| 2005/0238455 A1 | 10/2005 | Toteff |
| 2005/0238465 A1 | 10/2005 | Ruazumov |
| 2006/0018996 A1 | 1/2006 | Pollock et al. |
| 2006/0058921 A1 | 3/2006 | Okamoto |
| 2006/0104712 A1 | 5/2006 | Bufano et al. |
| 2006/0210382 A1 | 9/2006 | Mountz et al. |
| 2006/0216137 A1 | 9/2006 | Sakata et al. |
| 2006/0232025 A1 | 10/2006 | Braud |
| 2006/0245862 A1* | 11/2006 | Hansl ................... B65G 1/0435 414/281 |
| 2006/0257236 A1 | 11/2006 | Stingel, III et al. |
| 2007/0021864 A1 | 1/2007 | Mountz et al. |
| 2007/0059132 A1 | 3/2007 | Akamatsu et al. |
| 2007/0061041 A1 | 3/2007 | Zweig |
| 2007/0065258 A1 | 3/2007 | Benedict et al. |
| 2007/0065259 A1 | 3/2007 | Talley |
| 2007/0071585 A1 | 3/2007 | Henkel |
| 2007/0114975 A1 | 5/2007 | Cohen et al. |
| 2007/0125727 A1 | 6/2007 | Winkler |
| 2007/0267998 A1 | 11/2007 | Cohen et al. |
| 2007/0276535 A1 | 11/2007 | Haag |
| 2007/0288123 A1 | 12/2007 | D'Andrea et al. |
| 2007/0290040 A1 | 12/2007 | Wurman et al. |
| 2007/0293978 A1 | 12/2007 | Wurman et al. |
| 2007/0297879 A1 | 12/2007 | Yuyama et al. |
| 2008/0001372 A1 | 1/2008 | Hoffman et al. |
| 2008/0007203 A1 | 1/2008 | Cohen et al. |

(56) References Cited

U.S. PATENT DOCUMENTS

| | | |
|---|---|---|
| 2008/0025833 A1 | 1/2008 | Baker et al. |
| 2008/0044262 A1 | 2/2008 | Kim et al. |
| 2008/0065265 A1 | 3/2008 | Ozick et al. |
| 2008/0075357 A1 | 3/2008 | Yoon et al. |
| 2008/0080963 A1 | 4/2008 | Bufano et al. |
| 2008/0129445 A1 | 6/2008 | Kraimer et al. |
| 2008/0154429 A1 | 6/2008 | Lee et al. |
| 2008/0161987 A1 | 7/2008 | Breed |
| 2008/0166217 A1 | 7/2008 | Fontana |
| 2008/0174268 A1 | 7/2008 | Koo et al. |
| 2008/0215180 A1 | 9/2008 | Kota |
| 2008/0269960 A1 | 10/2008 | Kostmann |
| 2008/0275609 A1 | 11/2008 | Boydell |
| 2008/0281717 A1 | 11/2008 | Kortelainen |
| 2009/0033316 A1 | 2/2009 | Hosek et al. |
| 2009/0074545 A1* | 3/2009 | Lert, Jr. ............... B65G 1/0492 414/276 |
| 2009/0085741 A1 | 4/2009 | Ravi et al. |
| 2009/0099879 A1 | 4/2009 | Ouimet |
| 2009/0114115 A1 | 5/2009 | Minges |
| 2009/0148259 A1 | 6/2009 | Shani |
| 2009/0185884 A1 | 7/2009 | Wurman et al. |
| 2009/0188774 A1 | 7/2009 | Tsujimoto |
| 2009/0216366 A1 | 8/2009 | Zuber et al. |
| 2009/0224750 A1 | 9/2009 | Hosek et al. |
| 2009/0265031 A1 | 10/2009 | Tachibana et al. |
| 2009/0284245 A1 | 11/2009 | Kirby et al. |
| 2009/0315501 A1 | 12/2009 | Li et al. |
| 2010/0043665 A1 | 2/2010 | Brigham |
| 2010/0044124 A1 | 2/2010 | Radke et al. |
| 2010/0044977 A1 | 2/2010 | Hughes et al. |
| 2010/0076591 A1 | 3/2010 | Lert, Jr. |
| 2010/0086385 A1 | 4/2010 | Shani |
| 2010/0102532 A1 | 4/2010 | Timoney et al. |
| 2010/0118149 A1 | 5/2010 | Levin et al. |
| 2010/0121481 A1 | 5/2010 | Talley et al. |
| 2010/0131182 A1 | 5/2010 | Deegan et al. |
| 2010/0135759 A1 | 6/2010 | Dillon |
| 2010/0141483 A1 | 6/2010 | Thacher et al. |
| 2010/0167556 A1* | 7/2010 | Totsu ................... H02K 41/03 438/795 |
| 2010/0183409 A1 | 7/2010 | Checketts et al. |
| 2010/0185353 A1 | 7/2010 | Barwick et al. |
| 2010/0188210 A1 | 7/2010 | Howard et al. |
| 2010/0218697 A1 | 9/2010 | Sugimoto |
| 2010/0224427 A1 | 9/2010 | Nuchter et al. |
| 2010/0234995 A1 | 9/2010 | Zini et al. |
| 2010/0272546 A1* | 10/2010 | Wolkerstorfer ...... B65G 1/0435 414/277 |
| 2010/0277005 A1 | 11/2010 | Karalis et al. |
| 2010/0277121 A1 | 11/2010 | Hall et al. |
| 2010/0286905 A1 | 11/2010 | Goncalves et al. |
| 2010/0290874 A1* | 11/2010 | Wolkerstorfer ...... B65G 1/0435 414/280 |
| 2010/0290878 A1 | 11/2010 | Ricketts |
| 2010/0295943 A1 | 11/2010 | Cha et al. |
| 2010/0305854 A1 | 12/2010 | Kammel et al. |
| 2010/0308939 A1 | 12/2010 | Kurs |
| 2010/0316468 A1 | 12/2010 | Lert et al. |
| 2010/0316469 A1 | 12/2010 | Lert et al. |
| 2010/0322746 A1 | 12/2010 | Lert et al. |
| 2010/0324815 A1 | 12/2010 | Hiruta et al. |
| 2011/0008138 A1* | 1/2011 | Yamashita ........... B65G 1/0435 414/277 |
| 2011/0038692 A1 | 2/2011 | Hofmeister et al. |
| 2011/0043373 A1 | 2/2011 | Best et al. |
| 2011/0055926 A1 | 3/2011 | Winkler |
| 2011/0068943 A1 | 3/2011 | Lane, Jr. |
| 2011/0082583 A1 | 4/2011 | Kumhyr |
| 2011/0090064 A1 | 4/2011 | Dahms et al. |
| 2011/0102144 A1 | 5/2011 | Okina et al. |
| 2011/0106295 A1 | 5/2011 | Miranda et al. |
| 2011/0106339 A1 | 5/2011 | Phillips et al. |
| 2011/0118903 A1 | 5/2011 | Kraimer et al. |
| 2011/0125323 A1 | 5/2011 | Gutmann et al. |
| 2011/0130974 A1 | 6/2011 | Yngve et al. |
| 2011/0148364 A1 | 6/2011 | Ota |
| 2011/0176895 A1 | 7/2011 | Kortelainen |
| 2011/0182703 A1 | 7/2011 | Alan |
| 2011/0185975 A1 | 8/2011 | van den Berg et al. |
| 2011/0202175 A1 | 8/2011 | Romanov et al. |
| 2011/0208350 A1 | 8/2011 | Eliuk et al. |
| 2011/0216185 A1 | 9/2011 | Laws et al. |
| 2011/0231016 A1 | 9/2011 | Goulding |
| 2011/0238206 A1 | 9/2011 | Somin et al. |
| 2011/0254503 A1 | 10/2011 | Widmer et al. |
| 2011/0271469 A1 | 11/2011 | Ziegler et al. |
| 2011/0285349 A1 | 11/2011 | Widmer et al. |
| 2011/0297509 A1 | 12/2011 | Taylor |
| 2012/0099953 A1* | 4/2012 | Hortig .................... B65G 1/065 414/279 |
| 2012/0185122 A1 | 7/2012 | Sullivan et al. |
| 2012/0186192 A1* | 7/2012 | Toebes ..................... B65G 1/04 53/235 |
| 2012/0189409 A1 | 7/2012 | Toebes et al. |
| 2012/0189416 A1 | 7/2012 | Toebes et al. |
| 2012/0247239 A1* | 10/2012 | Hortig ................. B65G 1/0407 74/89.22 |
| 2012/0277940 A1 | 11/2012 | Kumar et al. |
| 2012/0299260 A1 | 11/2012 | Goertzen et al. |
| 2013/0061420 A1 | 3/2013 | Vanderstegen-Drake et al. |
| 2013/0094926 A1 | 4/2013 | Olszak et al. |
| 2013/0142599 A1* | 6/2013 | McDowell, Jr. ........ E04H 6/305 414/256 |
| 2014/0350725 A1 | 11/2014 | Lafary et al. |
| 2015/0081089 A1 | 3/2015 | Kapust et al. |
| 2015/0150429 A1 | 6/2015 | Yoo et al. |
| 2015/0314446 A1 | 11/2015 | Day et al. |
| 2015/0336741 A1 | 11/2015 | Ahammer et al. |
| 2016/0000282 A1 | 1/2016 | Vanderstegen-Drake et al. |
| 2016/0121486 A1 | 5/2016 | Lipinski et al. |
| 2016/0214808 A1 | 7/2016 | Cyrulik et al. |
| 2017/0083020 A1 | 3/2017 | Purwin et al. |
| 2017/0320522 A1 | 11/2017 | Lorenz et al. |

FOREIGN PATENT DOCUMENTS

| | | |
|---|---|---|
| DE | 2150500 | 4/1973 |
| DE | 4104527 | 8/1992 |
| DE | 20011661 | 12/2000 |
| DE | 10142395 | 11/2002 |
| DE | 10356563 | 6/2005 |
| DE | 102011012950 | 9/2012 |
| EP | 0466004 | 1/1992 |
| EP | 0647575 | 4/1995 |
| EP | 0733563 | 9/1996 |
| EP | 0737630 | 10/1996 |
| EP | 0995704 | 4/2000 |
| EP | 1193195 | 4/2002 |
| EP | 1598291 | 11/2005 |
| EP | 1627830 | 2/2006 |
| EP | 1772400 | 4/2007 |
| EP | 1775240 | 4/2007 |
| EP | 1818286 | 8/2007 |
| EP | 2039580 | 3/2009 |
| FR | 2730715 | 8/1996 |
| JP | 49131671 | 8/1973 |
| JP | 5310055 | 3/1978 |
| JP | 5931297 | 2/1984 |
| JP | 60183405 | 9/1985 |
| JP | 61094905 | 5/1986 |
| JP | 62041705 | 2/1987 |
| JP | 6337007 | 2/1988 |
| JP | 63160204 | 10/1988 |
| JP | 1179321 | 3/1993 |
| JP | 061309 | 1/1994 |
| JP | 07187330 | 7/1995 |
| JP | 07187331 | 7/1995 |
| JP | 081553 | 1/1996 |
| JP | 08091795 | 4/1996 |
| JP | 08113321 | 5/1996 |
| JP | 08133426 | 5/1996 |

(56) References Cited

FOREIGN PATENT DOCUMENTS

| | | |
|---|---|---|
| JP | 08258763 | 10/1996 |
| JP | 0948507 | 2/1997 |
| JP | 11079321 | 3/1999 |
| JP | 11124298 | 5/1999 |
| JP | 11180697 | 7/1999 |
| JP | 11296226 | 10/1999 |
| JP | 2000118615 | 4/2000 |
| JP | 2000118639 | 4/2000 |
| JP | 2000122720 | 4/2000 |
| JP | 2001344020 | 12/2001 |
| JP | 2002356207 | 12/2001 |
| JP | 2003012117 | 1/2003 |
| JP | 2003063610 | 3/2003 |
| JP | 2003321102 | 11/2003 |
| JP | 2004043109 | 2/2004 |
| JP | 2004123240 | 4/2004 |
| JP | 3102245 | 7/2004 |
| JP | 2004249895 | 9/2004 |
| JP | 2005082331 | 3/2005 |
| JP | 2005138956 | 6/2005 |
| JP | 2005206259 | 8/2005 |
| JP | 2006160523 | 6/2006 |
| JP | 3867866 | 1/2007 |
| JP | 4735387 | 11/2007 |
| JP | 2007283958 | 11/2007 |
| JP | 2008023639 | 2/2008 |
| JP | 2008023639 A * 2/2008 .............. B25J 13/00 | |
| JP | 2008238959 | 2/2008 |
| JP | 2008510673 | 4/2008 |
| JP | 2008100825 | 5/2008 |
| JP | 2009513457 | 4/2009 |
| JP | 60153309 | 8/2009 |
| JP | 2010049987 | 3/2010 |
| JP | 2010158942 | 7/2010 |
| JP | 2012071929 | 4/2012 |
| JP | 2007131383 | 5/2017 |
| TW | 506936 | 10/2002 |
| TW | 588712 | 5/2004 |
| TW | 201003347 | 1/2010 |
| TW | 201022108 | 6/2010 |
| WO | 8501493 | 4/1985 |
| WO | 9534491 | 12/1995 |
| WO | 0187648 | 11/2001 |
| WO | 2005009324 | 2/2005 |
| WO | 2005056943 | 6/2005 |
| WO | 2005071597 | 8/2005 |
| WO | 2006024035 | 3/2006 |
| WO | 2006095047 | 9/2006 |
| WO | 2007011814 | 1/2007 |
| WO | 2008152245 | 12/2008 |
| WO | 2009098573 | 8/2009 |
| WO | 2009106988 | 9/2009 |
| WO | 2010080539 | 7/2010 |
| WO | 2010118412 | 10/2010 |
| WO | 2012044734 | 4/2012 |
| WO | 2016118955 | 7/2016 |

OTHER PUBLICATIONS

English Translation/Abstract of JP2008023639 A (Year: 2008).*
International Search Report, International Application No. PCT/US2014/055563, dated Mar. 16, 2015.
International Search Report, International Application No. PCT/US2014/030217, dated Jul. 7, 2014 (1 page).

* cited by examiner

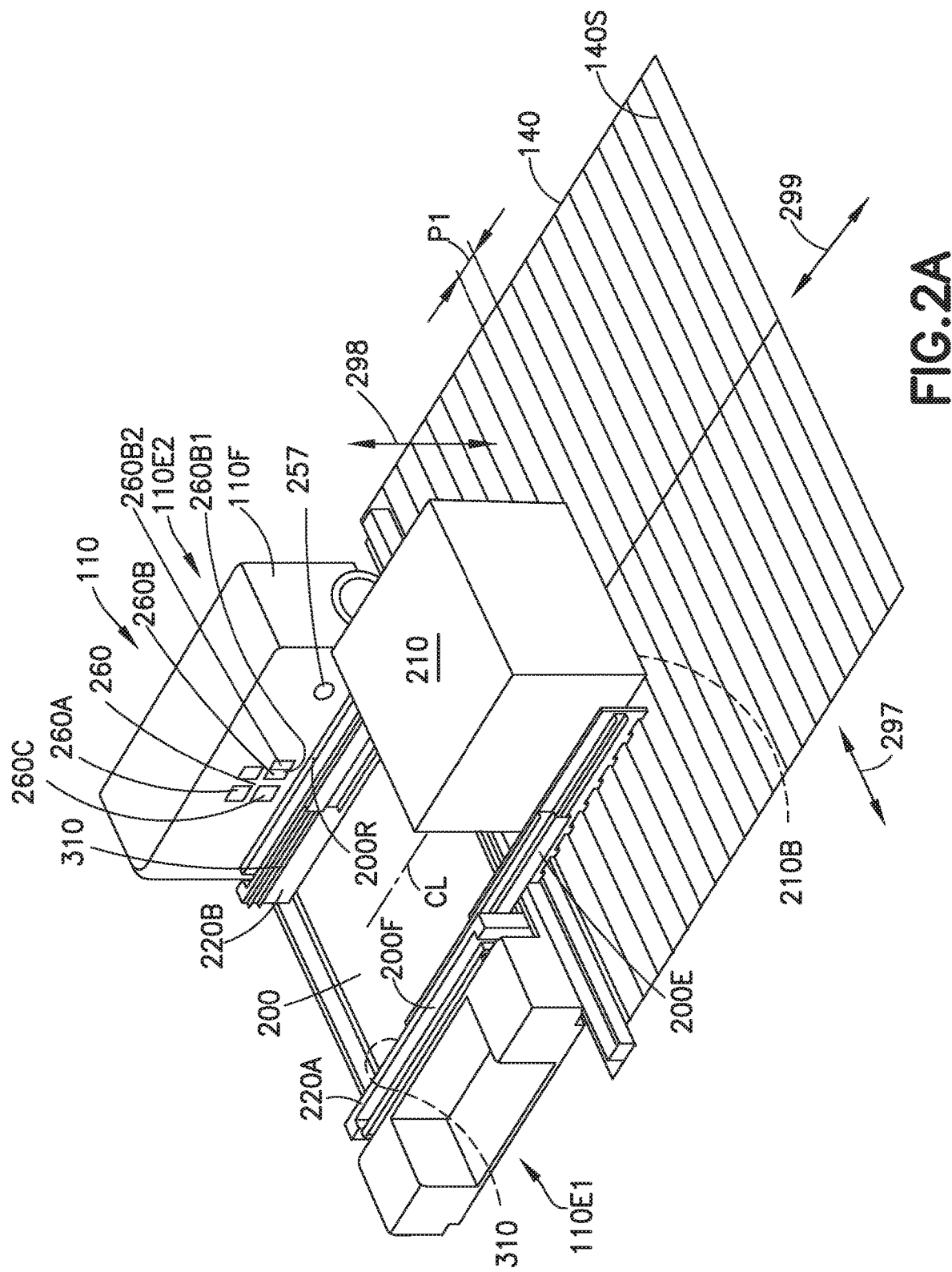

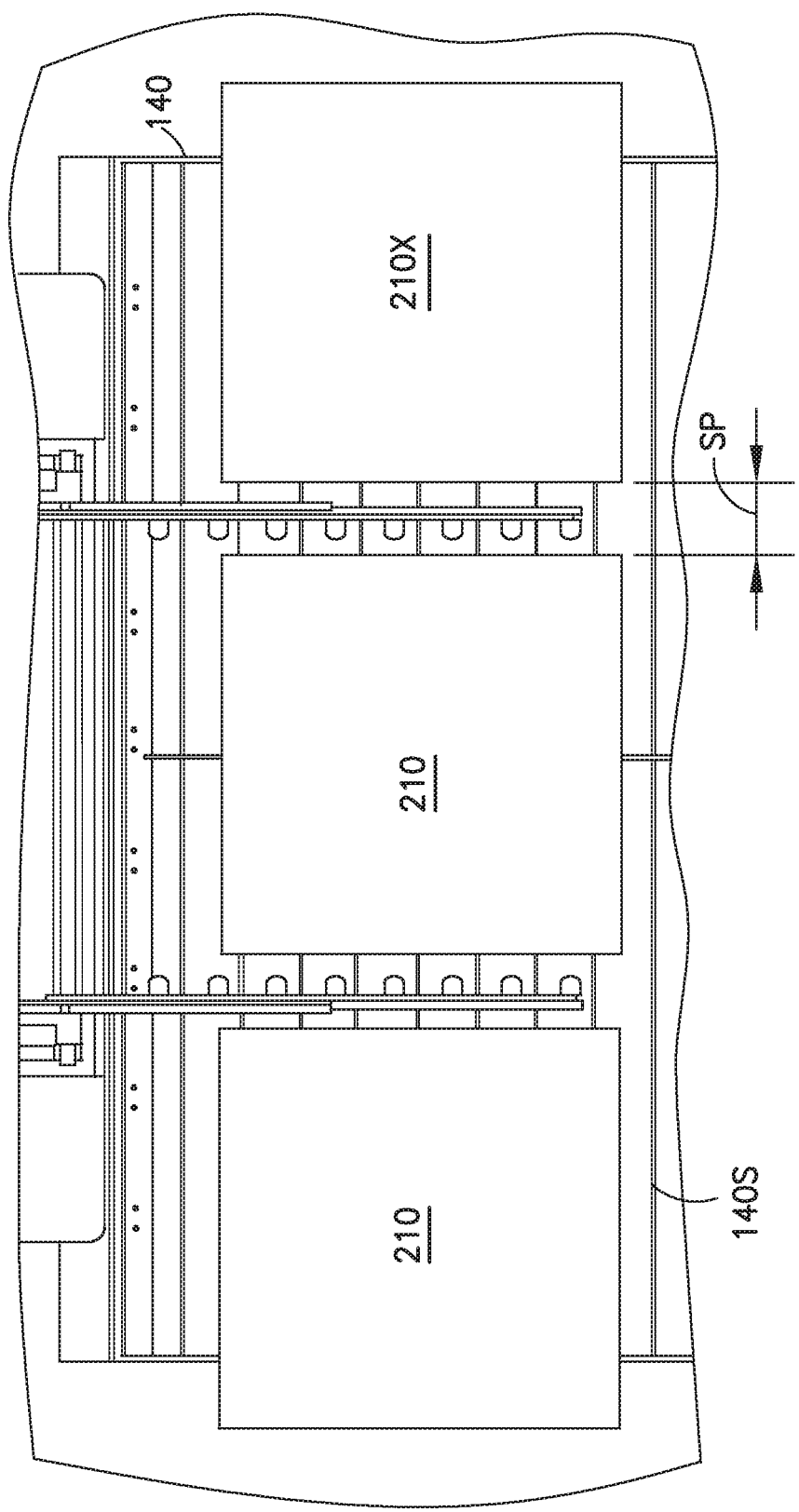

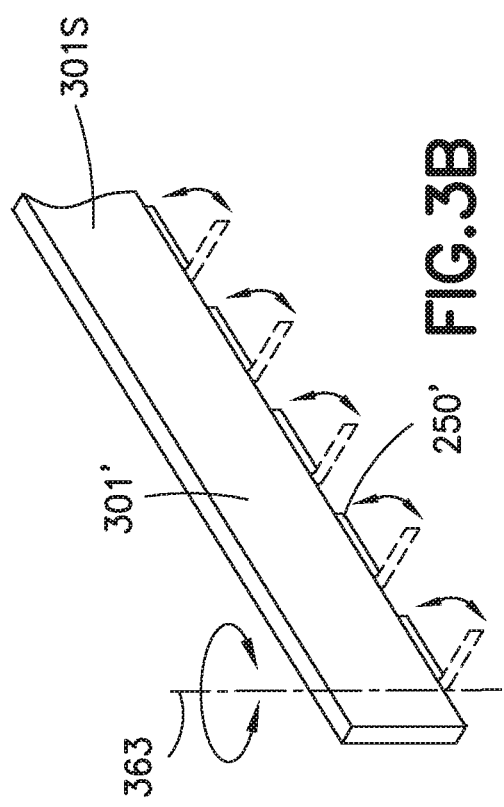
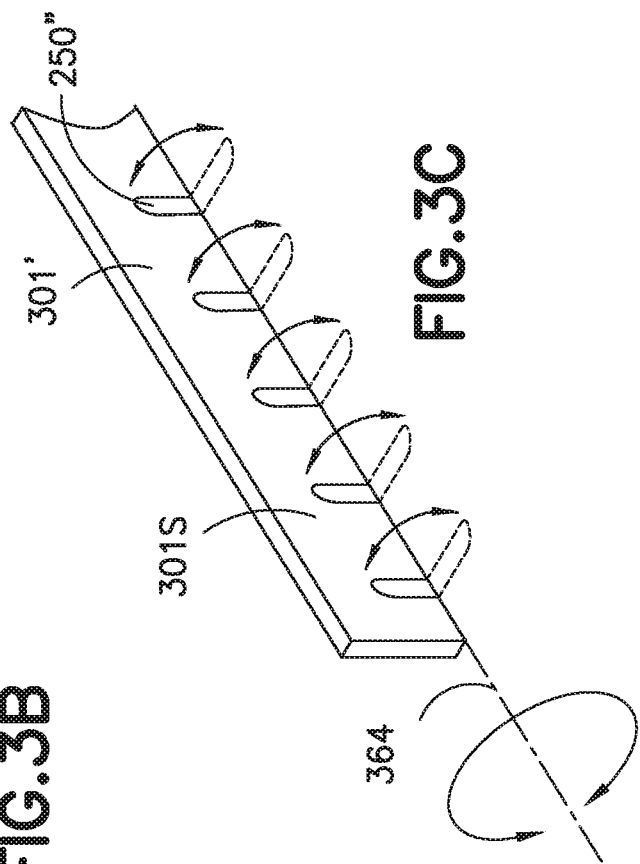

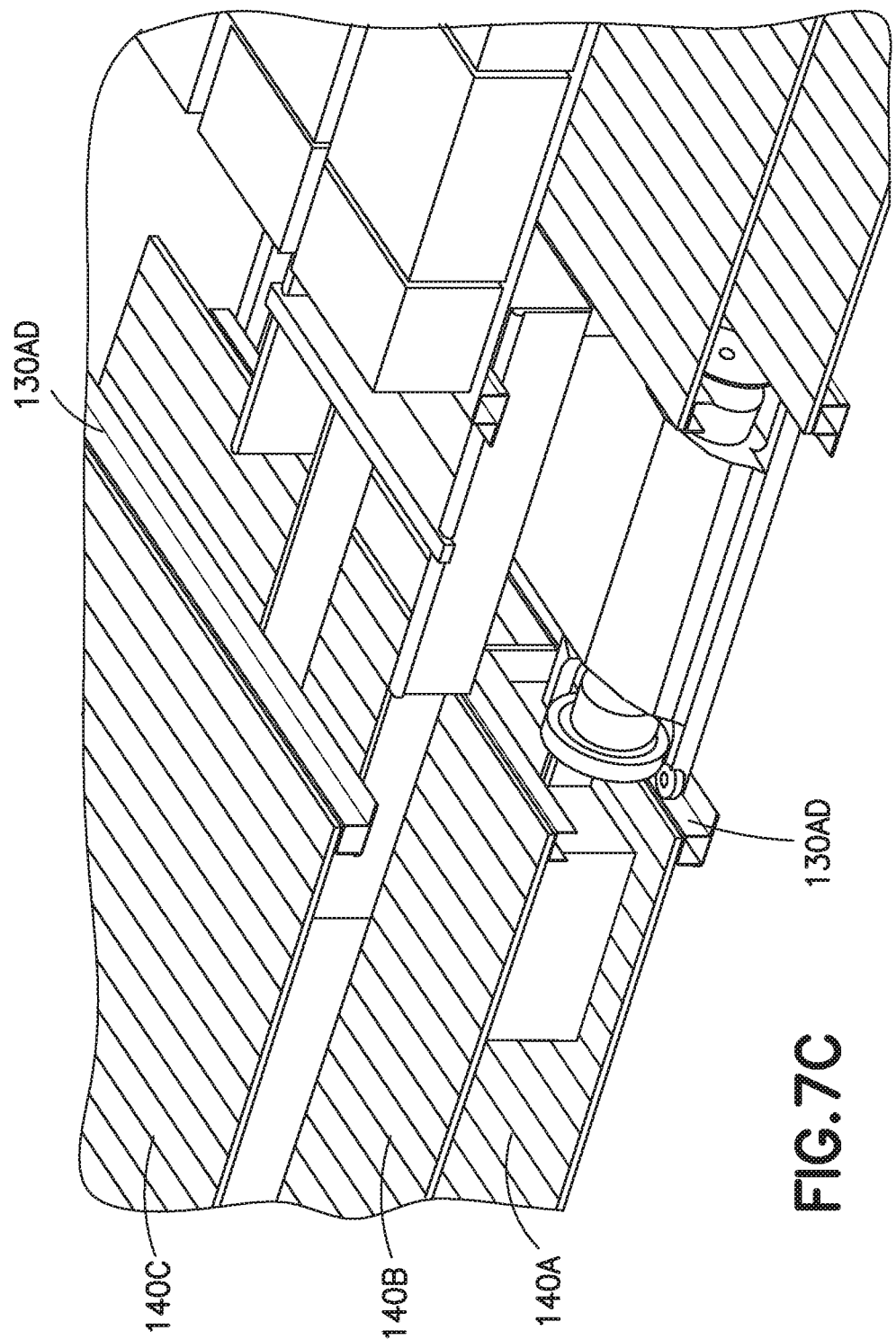

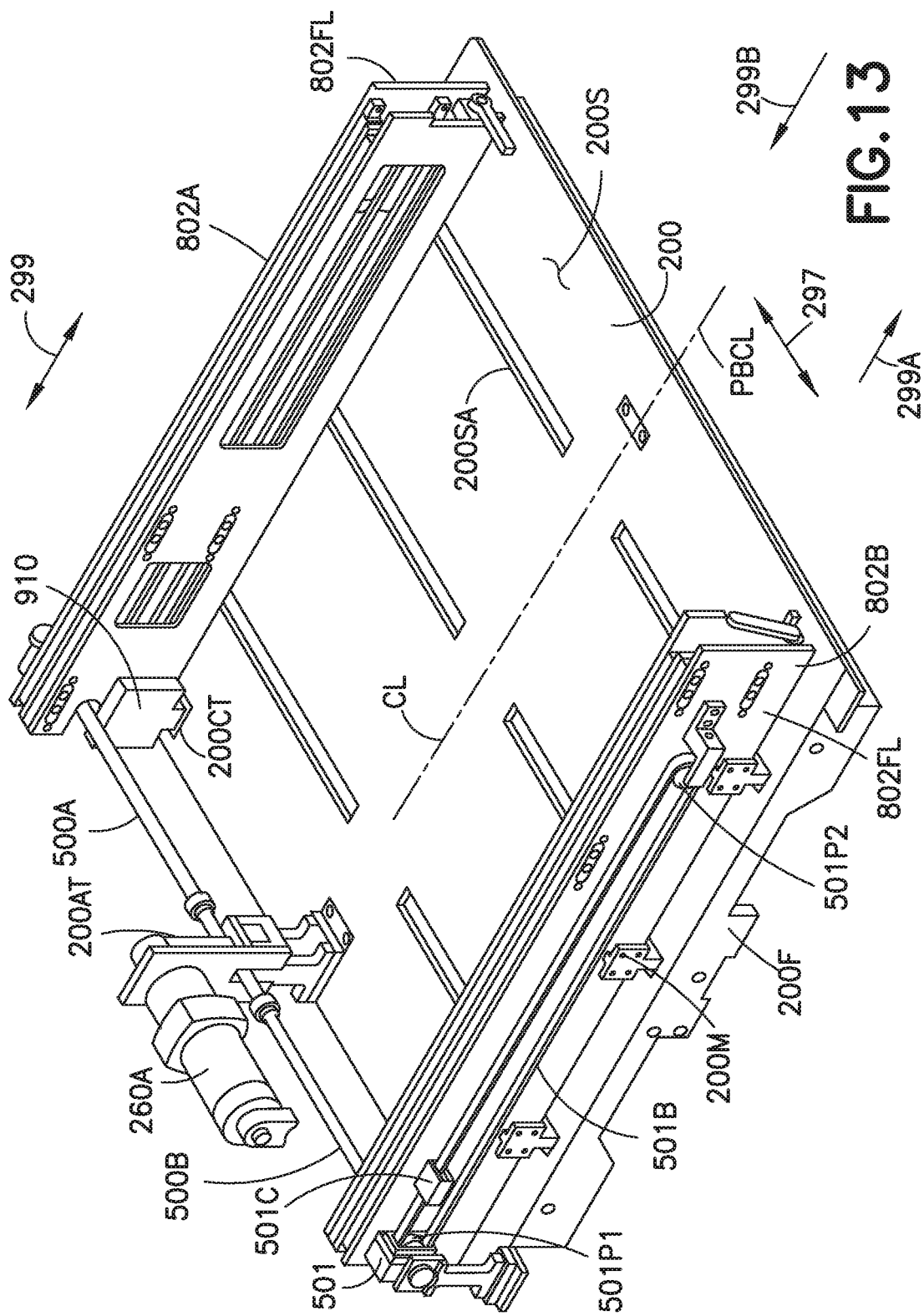

AUTOMATED STORAGE AND RETRIEVAL SYSTEM

CROSS REFERENCE TO RELATED APPLICATIONS

This application is a non-provisional of and claims the benefit of U.S. provisional patent application No. 61/877,614 filed on Sep. 13, 2013, the disclosure of which is incorporated herein by reference in its entirety.

BACKGROUND

1. Field

The exemplary embodiments generally relate to material handling systems and, more particularly, to transport and storage of items within the material handling systems.

2. Brief Description of Related Developments

Generally the storage of items within, for example, a warehouse requires a large building or storage structure space with an associated footprint. Automated vehicles or robots may be used in these warehouses to place items in storage and remove items from storage.

It would be advantageous to have an automated vehicle that can efficiently pick items for removal from the storage structure. It would also be advantageous to have an automated vehicle that can access multiple storage levels so that a storage density of the storage structure may be increased.

BRIEF DESCRIPTION OF THE DRAWINGS

The foregoing aspects and other features of the disclosed embodiments are explained in the following description, taken in connection with the accompanying drawings, wherein:

FIGS. 2A-2E are schematic illustrations of a portion of the automated storage and retrieval system of FIG. 1 in accordance with aspects of the disclosed embodiment;

FIGS. 3A-3C are schematic illustrations of portions of an autonomous transport vehicle in accordance with aspects of the disclosed embodiment;

FIGS. 7A-7C are schematic illustrations of a portion of the automated storage and retrieval system of FIG. 1 in accordance with aspects of the disclosed embodiment;

FIGS. 9-11, 11A, 12A, 12B, 13, 13A, 13B, 14A and 14B are schematic illustrations of portions of an autonomous transport vehicle in accordance with aspects of the disclosed embodiment;

DETAILED DESCRIPTION

Figure 1:
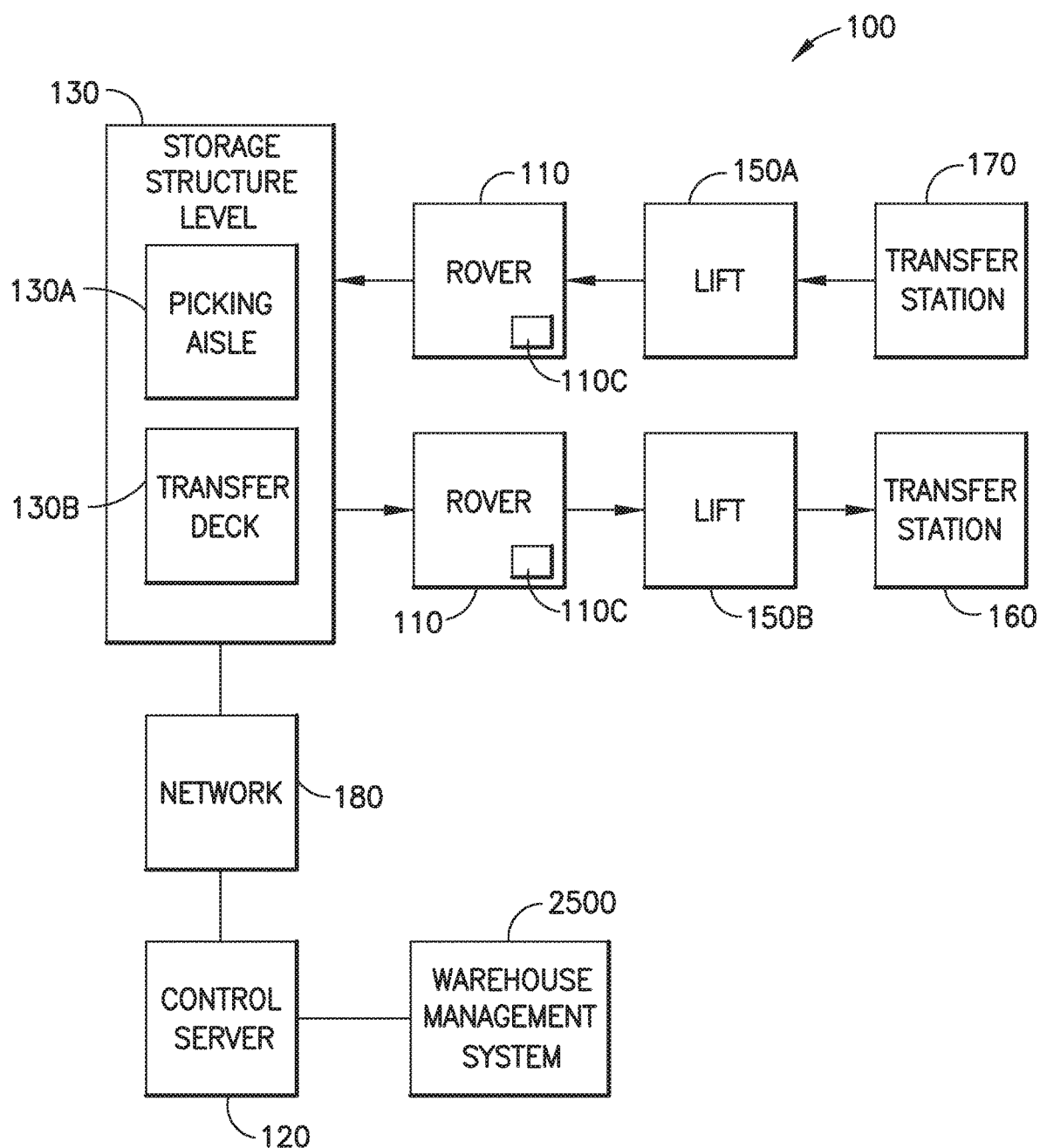
FIG. 1 is a schematic illustration of an automated storage and retrieval system in accordance with aspects of the disclosed embodiment.

FIG. 1 schematically illustrates a storage and retrieval system in accordance with an aspect of the disclosed embodiment. Although the aspects of the disclosed embodiment will be described with reference to the drawings, it should be understood that the aspects of the disclosed embodiment can be embodied in many alternate forms. In addition, any suitable size, shape or type of elements or materials could be used.

In accordance with aspects of the disclosed embodiment the storage and retrieval system 100 operates in, for example, a retail distribution center or warehouse to, for example, fulfill orders received from retail stores for case units such as those described in U.S. patent application Ser. No. 13/326,674 filed on Dec. 15, 2011 and PCT patent application PCT/US10/30669 filed on Apr. 12, 2010 entitled "Storage and Retrieval System" (WO Pub. 2010/118412), the disclosures of which are incorporated by reference herein in their entireties.

The storage and retrieval system 100 may include in-feed and out-feed transfer stations 170, 160, input and output vertical lifts 150A, 150B (generally referred to as lifts 150), a storage structure 130, and a number of autonomous rovers or autonomous transport vehicle 110 (which may also be referred to as bots). The storage structure 130 include, for example, multiple levels of storage rack modules where each level includes respective storage or picking aisles 130A, and transfer decks 130B for transferring case units between any of the storage areas of the storage structure 130 and any shelf of the lifts 150. The storage aisles 130A, and transfer decks 130B are also configured to allow the rovers 110 to traverse the storage aisles 130A and transfer decks 130B for placing case units into picking stock and to retrieve ordered case units.

The rovers 110 are any suitable autonomous vehicles capable of, for example, carrying and transferring case units throughout the storage and retrieval system 100. The rovers 110 are configured to place case units, such as the above described retail merchandise, into picking stock in the one or more levels of the storage structure 130 and then selectively retrieve ordered case units for shipping the ordered case units to, for example, a store or other suitable location.

The rovers 110 and other suitable features of the storage and retrieval system 100 are controlled by, for example, one or more central system control computers (e.g. control server) 120 through, for example, any suitable network 180. In one aspect, the network 180 is a wired network, a wireless network or a combination of a wireless and wired network using any suitable type and/or number of communication protocols. In one aspect, the control server 120 includes a collection of substantially concurrently running programs that are configured to manage the storage and retrieval system 100 including, for exemplary purposes only, controlling, scheduling, and monitoring the activities of all active system components, managing inventory and pickfaces, and interfacing with the warehouse management system 2500.

Referring now to FIG. 2 the rover 110 includes a frame 110F having a first end 110E1 and a second end 110E2 longitudinally spaced from the first end 110E1. The frame 110F forms a payload bed 200 configured to support a pickface 210 within the payload bed 200 in any suitable manner. In one aspect laterally arranged rollers (not shown) support the pickface and allow the pickface 210 to move in the longitudinal direction within the payload bed, while in other aspects, the payload bed has any suitable support surface(s) for supporting the pickface 210 within the payload bed such as those described herein. In still other aspects the end effector 200E supports the pickface 210 within the payload bed 200. The rover 110 includes any suitable controller 110C (FIG. 1) that is connected to one or more drive sections of the rover 110 for controlling movement of the rover 110 through the storage and retrieval system, the end effector 200E and any other suitable movable components of the rover. It is noted that a "pickface" as used herein is, for example, one or more merchandise case units placed one behind the other, side by side, or a combination thereof. Suitable examples of rovers 110 that may incorporate aspects of the disclosed embodiment are those described in U.S. Pat. No. 8,425,173; and U.S. patent application Ser. No. 14/215,310 filed on Mar. 17, 2014 entitled "Automated Storage and Retrieval System"; Ser. No. 13/236,423 filed on Dec. 12, 2011 (PG Pub. No. 2012/0189409); Ser. No. 13/327,040 filed on Dec. 15, 2011 (PG Pub. No. 2012/0197431); Ser. No. 13/326,952 filed on Dec. 15, 2011 (PG Pub. No. 2012/0189416); Ser. No. 13/326,993 filed on Dec. 15, 2011 (PG Pub. No. 2012/0185082); Ser. No. 13/326,447 filed on Dec. 15, 2011 (PG Pub. No. 2012/0185122); Ser. No. 13/326,505 filed Dec. 15, 2011 (PG Pub. No. 2012/0195724) the disclosures of which are incorporated by reference herein in their entireties.

Figure 2B:
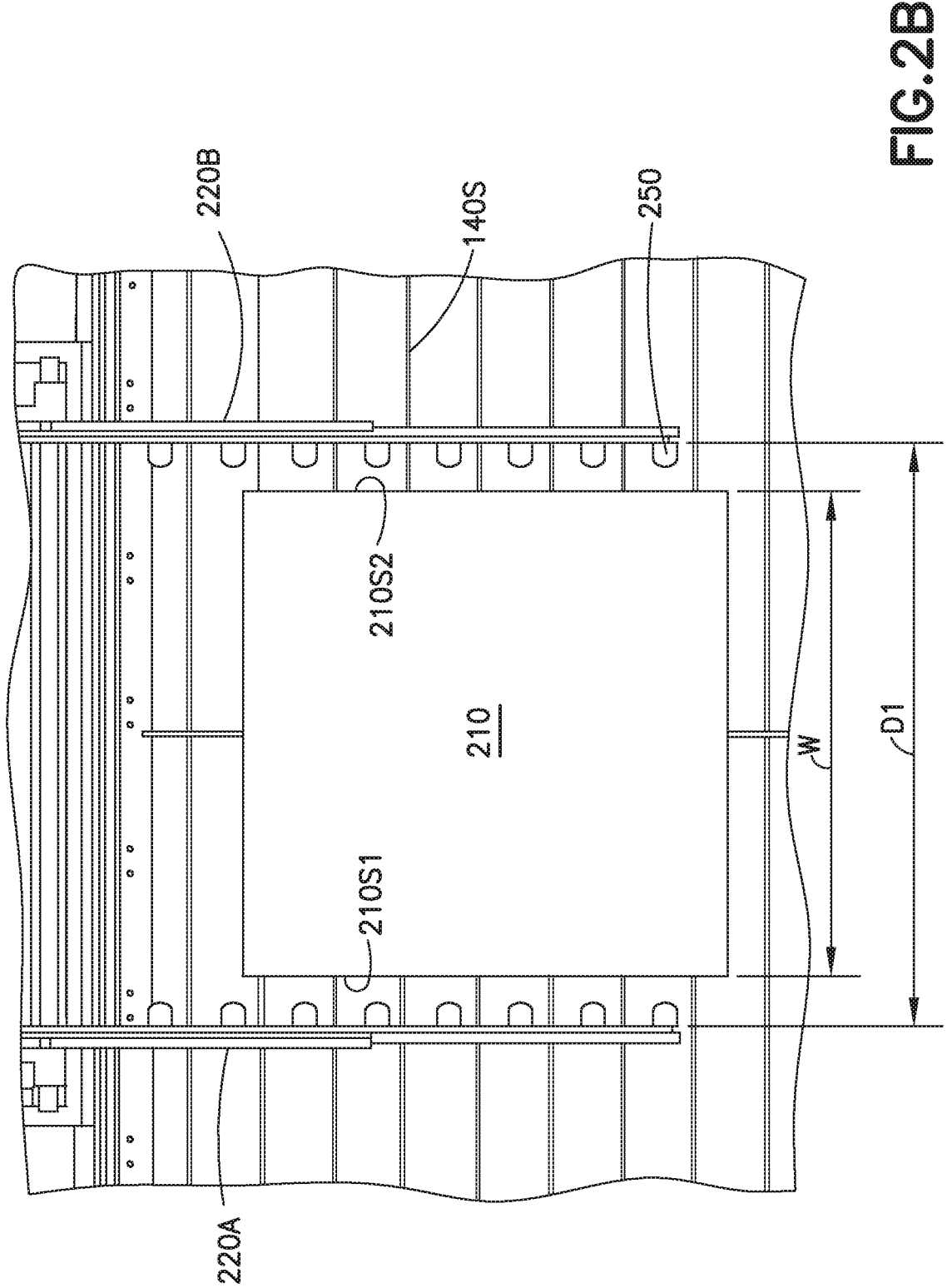
Figure 3A:
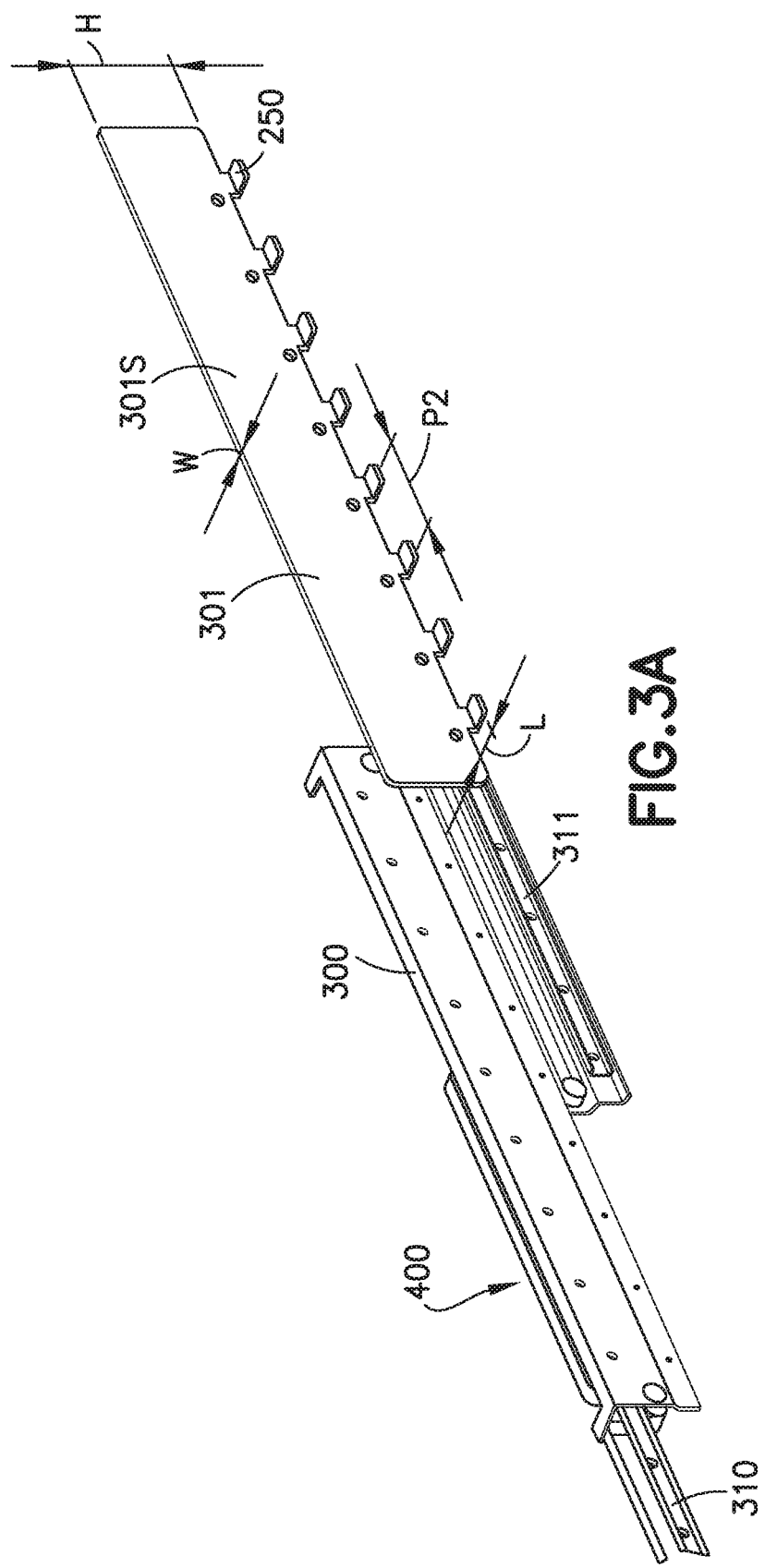
Figure 6:
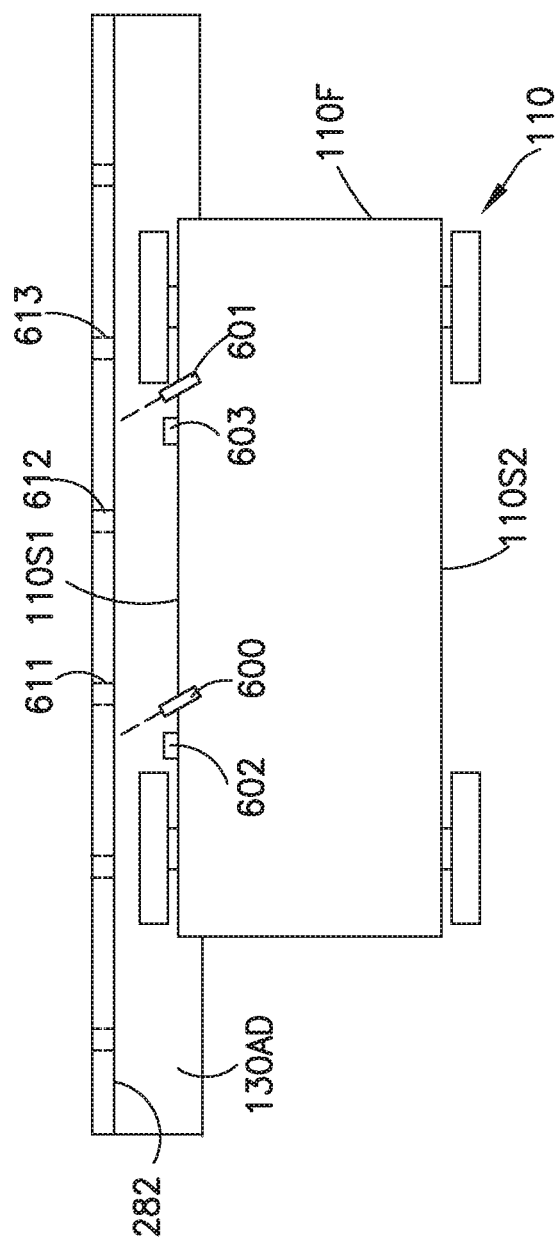
FIG. 6 is a schematic illustration of an autonomous transport vehicle in accordance with aspects of the disclosed embodiment.

Still referring to FIGS. 2A, 2B and also to FIG. 3A, the rover 110 includes any suitable end effector 200E movably connected to the frame 110F for transferring the pickface 210 to and from the payload bed 200. In one aspect the end effector includes telescopic arms 220A, 220B that are configured to straddle opposing sides of pickfaces 210 and handle the pickfaces 210 by lifting and supporting each pickface by, for example, its base (e.g. from underneath) with any suitable number of fingers or pickface support members 250. As will be described below, in one aspect the fingers 250 are static (e.g. fixed) relative to their respective arms 220A, 220B while in other aspects (as will be described below), the fingers 250 are actuated (e.g. movable) relative to their respective arms 220A, 220B. Each arm has any suitable number of telescoping members to provide any suitable extension or reach of the end effector 200E into a storage space of the storage shelves. For example, at least telescoping member 300 is slidably coupled to another telescoping member 301 along an axis of extension 299 of the end effector for telescopic extension and retraction of each arm 220A, 220B of the end effector. Each arm is suitably mounted to the frame 110F in any suitable manner. For example, in one aspect any suitable number of guides 310, such as rails or tracks, are mounted to the frame 110F in any suitable manner. The rails are mounted to or adjacent to each longitudinal side of the payload bed 200 so that each guide 310 extends laterally relative to the frame 110F. One or more telescoping members 300, 301 are slidably mounted to the guide 310 so that the one or more telescoping members 300, 301 extends laterally in the direction of arrow 299 for transferring pickfaces 210 to and from the payload bed 200. It is noted that while the end effector 200E is illustrated as extended only from one lateral side of the rover 110 in other aspects the end effector 200E is configured to extend from either lateral side 110S1, 110S2 (FIG. 6) of the rover. In one aspect a first telescoping member 300 is slidably mounted to the guide 310 in any suitable manner such as, for example, with guide rollers or sliders that engage suitable tracks on the guide 310. The first telescoping member 300 of the arms 220A, 220B includes a guide 311 for movably mounting a second telescoping member 301 to the first telescoping member 300 in a manner substantially similar to that described above with respect to guide 310. Although two telescoping members are illustrated in the figures it should be understood that in other aspects any suitable number of telescoping members are, for example, serially mounted to each other for extension and retraction in a manner substantially similar to that described above. As may be realized the distal most serially mounted telescoping member of each arm 220A, 220B (e.g. when extended each arm 220A, 220B has a proximate end closest to the frame 110F and a distal end furthest from the frame 110F), which in this case is the second telescoping member 301, includes the fingers 250, while in other aspects any suitable telescoping member of the arm includes fingers 250.

Each of the telescoping members 300, 301 has any suitable cross section so that at least one of the telescoping members 300, 301 is capable of extending in the space SP (FIG. 2C) between adjacent pickfaces 210 arranged on a storage shelf 240. In one aspect a height H of each telescoping member 300, 301 may be substantially larger than a width W of the telescoping member to stiffen the arm 220A, 220B (e.g. to minimize sagging of the arms when extended and to allow greater payload capacity of the arms) which, for example, also facilitates deep storage (e.g. where one or more merchandise case units placed one behind the other). Dual-sided picking is also possible, since the arms 220A, 220B are located at the front 200F and rear 200R of the payload bed 200 (it is noted that front and rear are used here for exemplary purposes only and that in other aspects any suitable spatial identifiers may be used to reference the longitudinal sides of the payload bed 200) so as to straddle opposing sides of the pickfaces.

Referring now to FIG. 3A the distal most telescoping member of each arm 220A, 220B, which in this aspect is the second telescoping member 301, includes surface 301S such that the fingers 250 extend from the surface 301S towards a centerline CL of the payload bed 200. As may be realized, the fingers 250 of each arm oppose one another for extending underneath a pickface. As may also be realized, the fingers 250 have any suitable length L such that at least one of the telescoping members 300, 301 and the fingers 250 are able to be extended in the space SP (FIG. 2C) between pickfaces 210. In this aspect the fingers 250 are fixed relative to the distal most telescoping member (e.g. the fingers are incapable of movement relative to the second telescoping member). However, in other aspects, as can be seen in FIGS. 3B and 3C the fingers 250', 250" are, for example, movable relative to the distal most telescoping member 301'. For example, in one aspect fingers 250' are rotatably mounted to the distal most telescoping member 301' such that they are movable between retracted and extended positions. In the retracted position the fingers 250' are, for example, substantially parallel with the surface 310S while in the extended position the fingers 250' are, for example, substantially perpendicular to (or arranged at any other suitable angle relative to) the surface 301S for extending underneath one or more pickfaces 210. In this aspect the fingers 250' are each be rotatable about a respective axis of rotation 363 that extends substantially perpendicular to a direction of extension and retraction 299 (FIG. 2A) of the end effector 200E. In another aspect, the fingers 250" are, for example, rotatable about an axis of rotation 364 that is substantially parallel with the direction of extension and retraction 299 of the end effector 200E. For example, as can be seen in FIG. 3B the fingers 250" are movable between retracted and extended positions. In the retracted position the fingers 250" are folded into or adjacent the surface 301S so as to be substantially parallel with the surface 301S. In the extended position the fingers 250" are unfolded so as to be substantially perpendicular to the surface 301S for extending underneath one or more pickfaces 210. In still other aspects the fingers are movable relative to the distal most telescoping member in any suitable manner so as to move between a retracted and extended position.

Figure 2D:
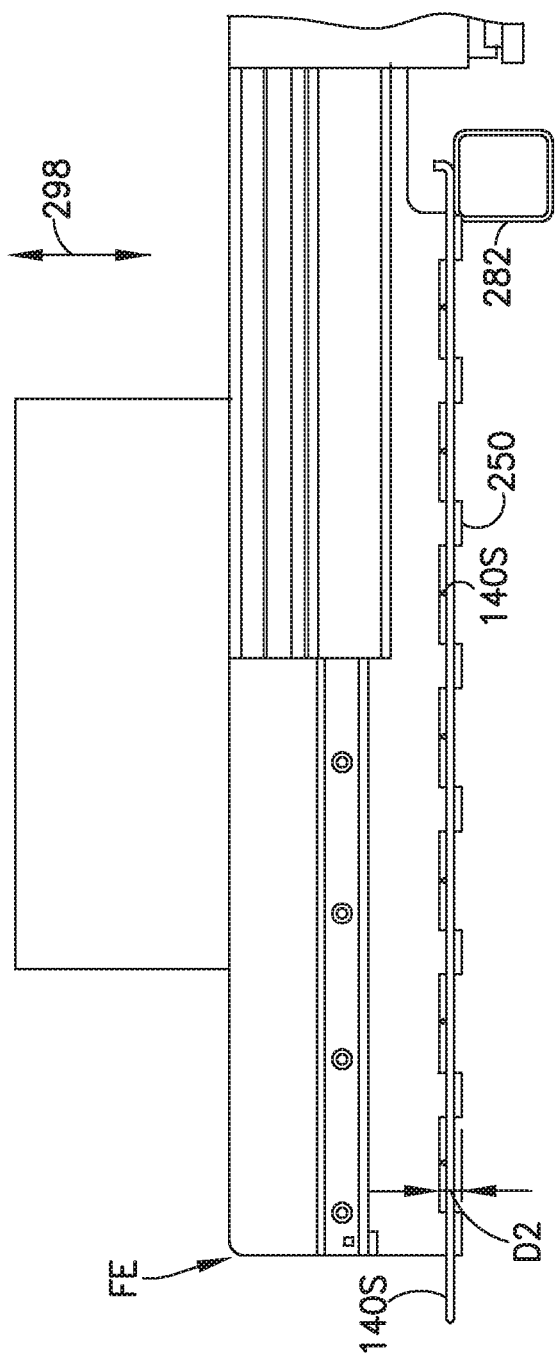

Referring now to FIGS. 2C and 2D, the opposing arrangement of the fingers 250 is, for example, such that when the arms 220A, 220B are extended into the storage shelf 140 the fingers are located between support surfaces 140S of the storage shelf 140. For example, in one aspect the storage shelf 140 includes spaced apart support surfaces 140S that extend in a direction 297 (FIG. 2A) that is substantially perpendicular to (e.g. transverse) the direction of extension and retraction 299 of the end effector 200E. For example, a pitch P1 (FIG. 2A) between support surfaces 140S is, for example, substantially similar to a pitch P2 (FIG. 3A) between the fingers 250 so that when inserted into the storage shelf 140 the fingers 250 are interleaved with the shelf structure (e.g. the support surfaces 140S) in a direction transverse to the extension axis 299 of the end effector 200E, while in other aspects the spacing between the fingers is any suitable spacing that allows the fingers to pass through the openings between the support surfaces.

Figure 4:
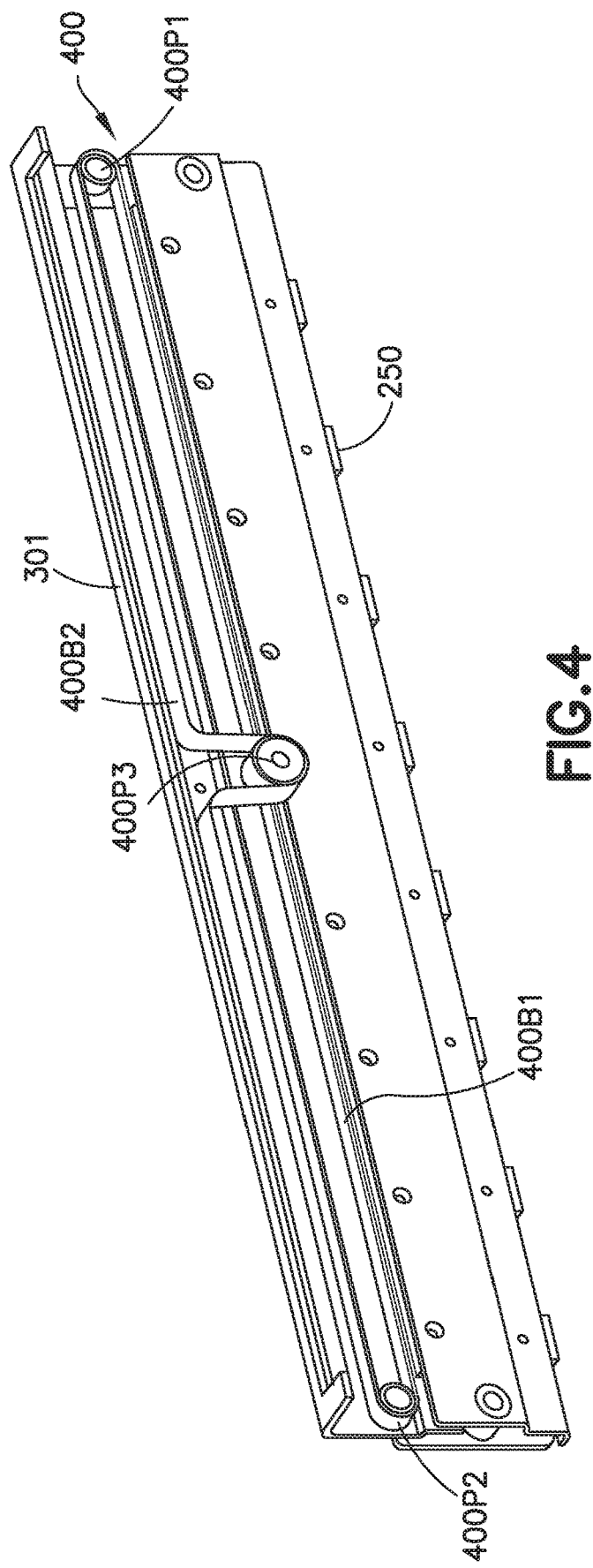
FIG. 4 is a schematic illustration of a portion of an autonomous transport vehicle in accordance with aspects of the disclosed embodiment.
Figure 5A:
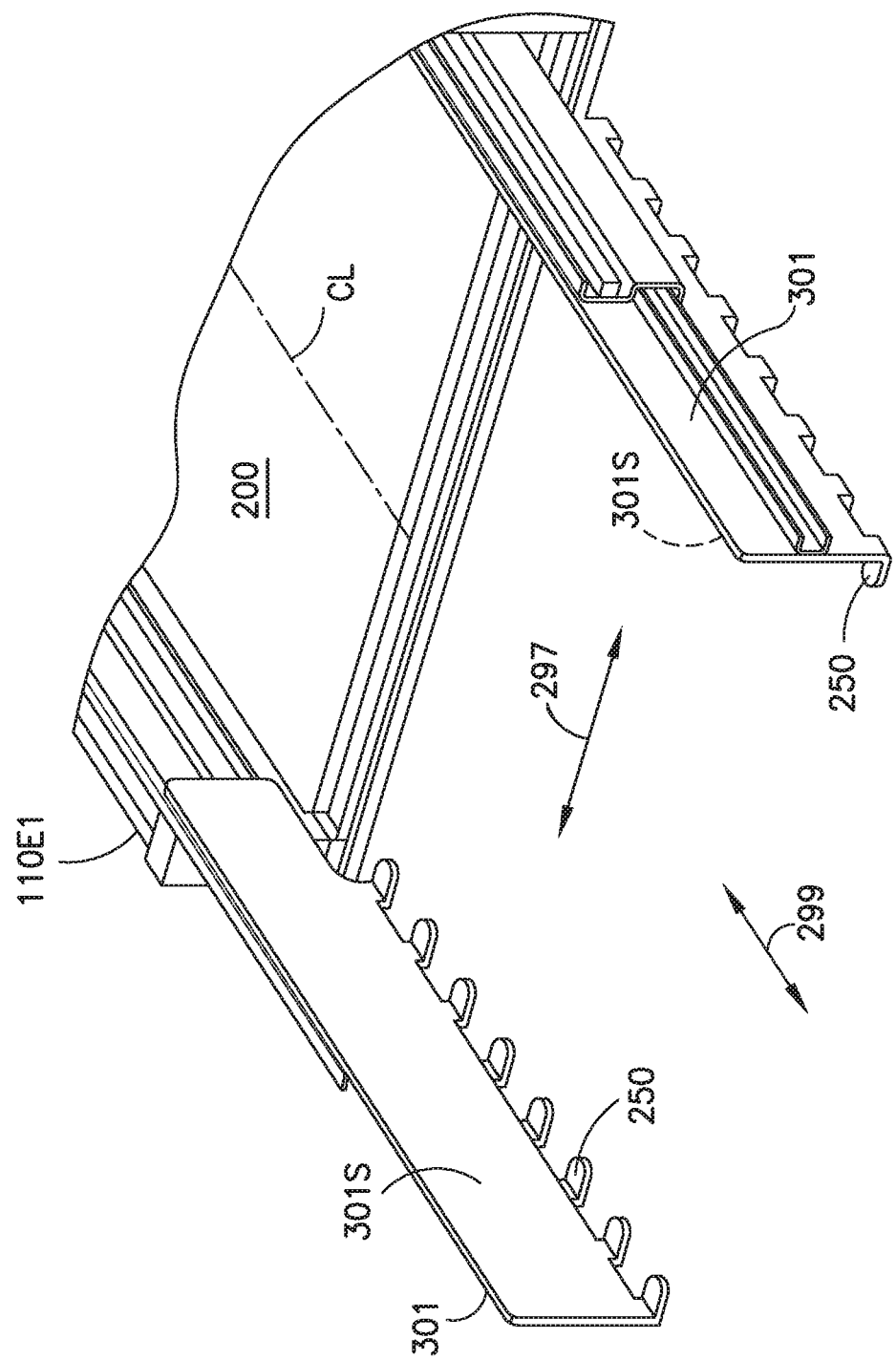
FIGS. 5A-5C are schematic illustrations of portions of an autonomous transport vehicle in accordance with aspects of the disclosed embodiment.
Figure 5B:
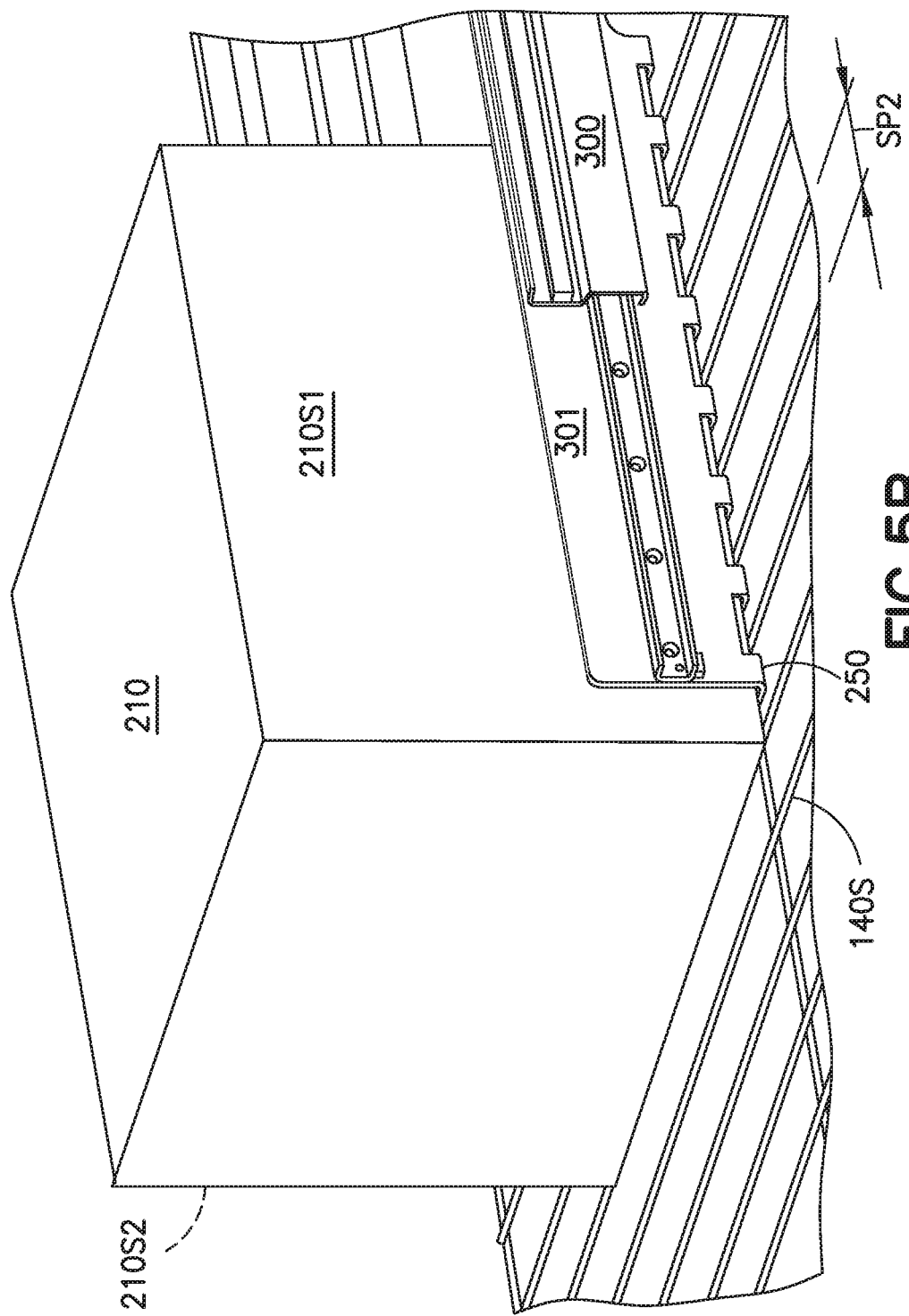
Figure 5C:
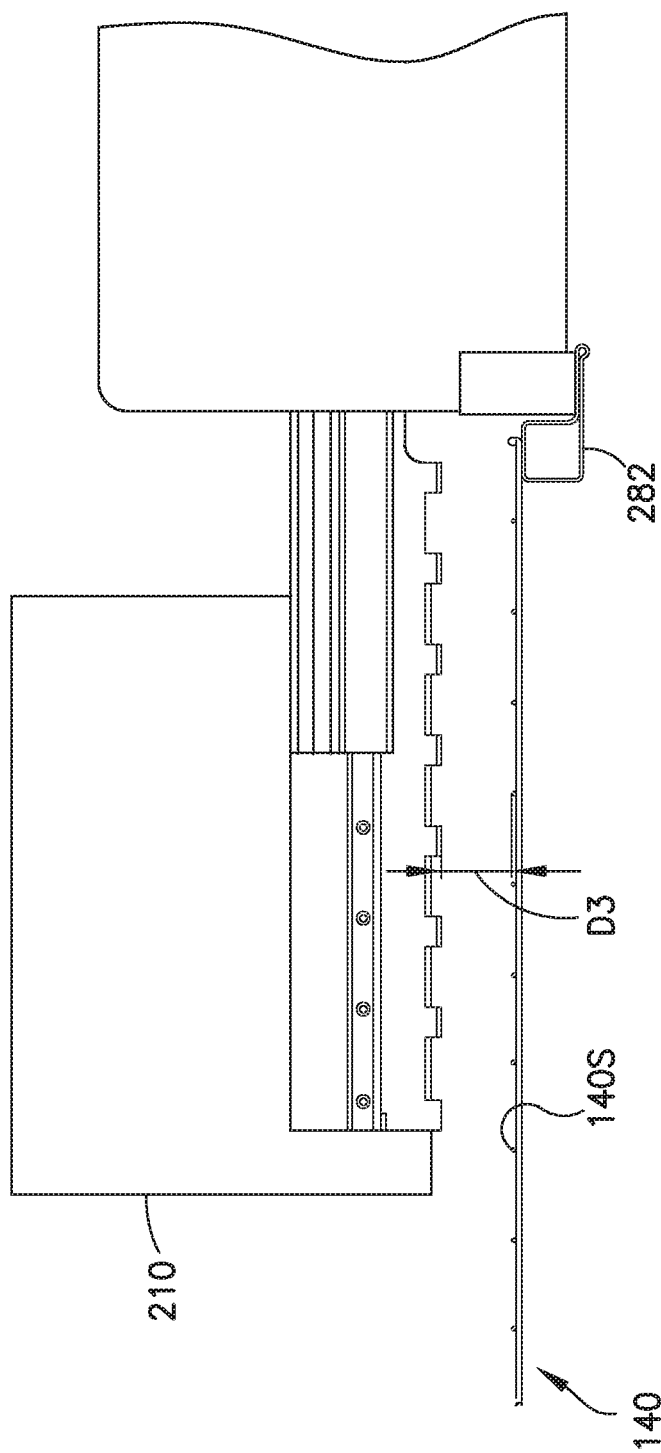

Referring again to FIG. 2A the rover 110 has a drive section 260 that includes any suitable number of drives. For example, the drive section 260 includes one or more end effector drives 260A, 260B, 260C configured to move the end effector in extension/retraction along axis 299, move one or more of the arms 220A, 220B so that the arms are moved together and apart in the direction of arrow 297 towards and away from the payload bed centerline CL (see also FIG. 5A), move the arms so that the arms 220A, 220B are moved together as a unit in the direction of arrow 297 relative to the payload bed centerline CL (e.g. for a justification of pickfaces 210 relative to the payload bed 200 and/or a storage area) and lift/lower the arms in a direction 298 substantially perpendicular to the axis of extension and retraction (e.g. direction) 299 of the end effector 200E. In one aspect, traversal of each transfer arm 220A, 220B is in a plane substantially parallel with a pickface support plane of the payload bed/area to effect a full payload area justification (e.g. a justification of the payload anywhere in within the payload bed and anywhere within a storage shelf area that is accessible by the arms 220A, 220B) of the at least one pickface independent of a size of the at least one pickface. Referring also to FIG. 4, in one aspect an end effector extension/retraction drive 260A (e.g. that moves the arms 220A, 220B in the direction of arrow 299) includes any suitable belt transmission 400 for extending and retracting each arm 220A, 220B of the rover 110. Each telescoping member 300, 301 (see also FIG. 3A) includes any suitable belt and pulley arrangement 400P1, 400P2, 400P3, 400B1, 400B2 configured to extend a respective telescoping member 300, 301 in series (e.g. one of telescoping members 300, 301 extends a predetermined distance/reach in a first stage of extension and then the other one of the telescoping members extends a predetermined distance/reach in a second stage of extension so that the telescoping members 300, 301 move together as a unit in the first stage of extension and only one of the telescoping members 300, 301 moves in the second stage of extension). In other aspects the belt and pulley arrangement 400P1, 400P2, 400P3, 400B1, 400B2 are, for example, configured to extend their respective telescoping members 300, 301 substantially simultaneously (e.g. as telescoping member 300 extends a predetermined distance/reach the telescoping member 301 also extends a corresponding predetermined distance/reach so that telescoping member 300 moves relative to the payload bed 200 and the telescoping member 301 moves relative to both the telescoping member 300 and the payload bed 200). As may be realized retraction of the arms 220A, 220B occurs in a substantially reverse manner to that described above. In other aspects any suitable drive linkage is used to extend and retract the arms 220A, 220B such as, for example, a ball and screw arrangement, chains, hydraulic or pneumatic actuators, electric actuators, magnetic drives, etc. Similarly, an arm gripping drive 260B (e.g. that moves one or more of the arms in the direction of 297) and an end effector lift drive 260C (e.g. that moves the arms 220A, 220B in the direction of arrow 298) have any suitable configuration and include any suitable transmissions for driving the arms such as those transmissions described above. As may be realized, in one aspect the arm gripping drive 260B includes one or more drives 260B1, 260B2 for moving one or more of the arms 220A, 220B as described herein. In one aspect the gripping drive 260B includes a single drive motor 260B1 coupled to one or both of the arms 220A, 220B so as to move one arm 220A, 220B relative to the other arm 220A, 220B (e.g. one of the arms 220A, 220B is stationary while the other arm 220A, 220B moves or both arms move so that the movement of one arm is coupled to movement of the other arm so as to be driven towards and away from each other by a common drive motor in a manner similar to that described below). In other aspects, the gripping drive 260B includes at least two drives 260B1, 260B2 where each arm 220A, 220B is driven by a respective drive motor 260B1, 260B1 so as to move independently of the other arm 220A, 220B. As may be realized, the independent movement of each arm allows not only for the gripping of pickfaces 210 but also for the movement of the pickface 210 in the direction of arrow 297 to effect justification of the pickface 210 in the direction of arrow 297 relative to, for example, a storage space or other pickface holding location. In still other aspects the arms 220A, 220B are movable in the direction of arrow 297 in any suitable manner by any suitable number of drive motors.

As noted above, the storage shelves 140 are, for example, configured to allow the fingers 250 of the arms 220A, 220B to pass through the shelves 140 so that the fingers 250 are positioned bellow the support surfaces 140S of the shelves 140. In one aspect the storage shelf 140 is a wire shelf such that the support surfaces 140S are formed by the wires of the shelf. The wire shelves 140 have any suitable configuration such as a wire mesh configuration where the upper members of the wire shelves form the support surfaces 140S and are oriented and aligned with a direction 297 substantially transverse to a direction 299 in which the pickfaces are transferred to and from the shelves 140. The wire shelves 140 are secured to the storage rack structure (e.g. such as horizontal supports 282) and/or the picking aisle deck/rails in any suitable manner. In one aspect the wire shelves 140 wrap around the storage rack structure and/or the picking aisle deck/rails so that the wire shelves 140 are removably fixed to the storage rack structure and/or the picking aisle deck/rails substantially without fasteners or other fixing methods (e.g. adhesives, welding, etc.). In other aspects the wire shelves 140 are removably fixed to the storage rack structure and/or the picking aisle deck/rails with any removable fasteners. In other aspects the shelves 140 may not be removable.

Figure 2E:
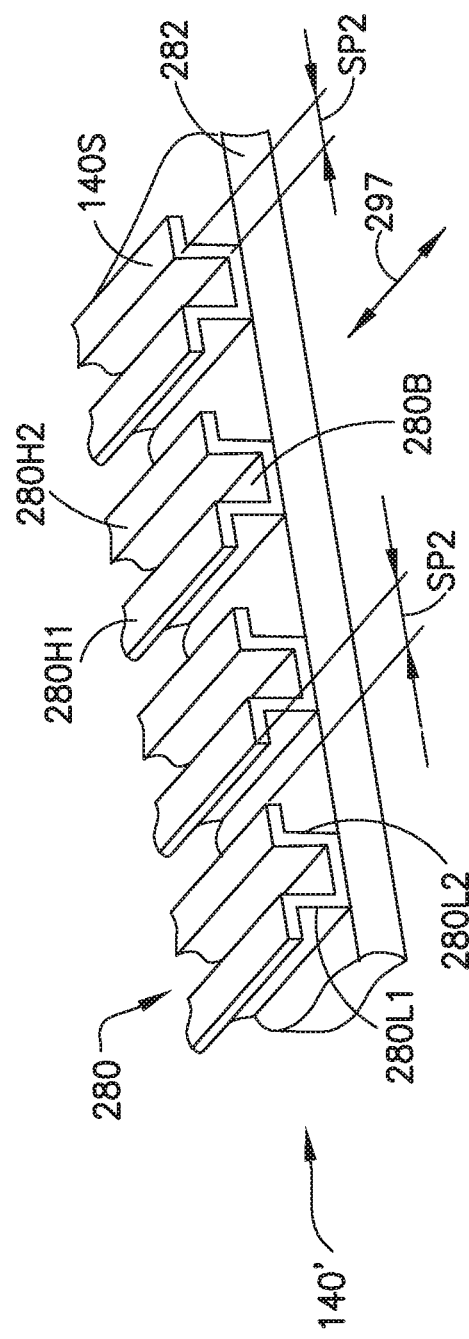

In other aspects the storage shelf 140' is substantially similar to that described in U.S. patent application Ser. No. 12/757,381 filed on Apr. 9, 2010 the disclosure of which is incorporated herein by reference in its entirety. For example, referring to FIG. 2E each storage shelf 140' includes one or more support legs 280L1, 280L2 extending from, for example, horizontal supports 282 of the storage shelf 140'. The support legs 280L1, 820L2 have any suitable configuration and may be part of, for example, a substantially U-shaped channel 280 such that the legs are connected to each other through channel portion 280B. The channel portion 280B provides an attachment point between the channel 280 and one or more horizontal supports 282. In other aspects, each support leg 280L1, 280L2 is configured to individually mount to the horizontal supports 282. In this aspect, each support leg 280L1, 280L2 includes a bent portion 280H1, 280H2 having a suitable support surface 140S area configured to support pickfaces stored on the shelf 140'. The bent portions 280H1, 280H2 is, for example, configured to substantially prevent deformation of the pickfaces stored on the shelf. In other aspects the leg portions 280H1, 280H2 have a suitable thickness or have any other suitable shape and/or configuration for supporting case units stored on the shelves. As can be seen in FIG. 2E, the support legs 280L1, 280L2 or channels 280 may form a slatted or corrugated shelf structure where spaces SP2 between, for example, the support legs 280L1, 280L2 allow for fingers 250 of the end effector 200E to reach into the shelving for transferring pickfaces to and from the shelf as will be described below.

As may be realized the storage shelves described herein, are in one aspect, substantially flat allowing for an increased storage density of the storage and retrieval system 100 while reducing structural costs of the storage and retrieval system 100.

Figure 7A:
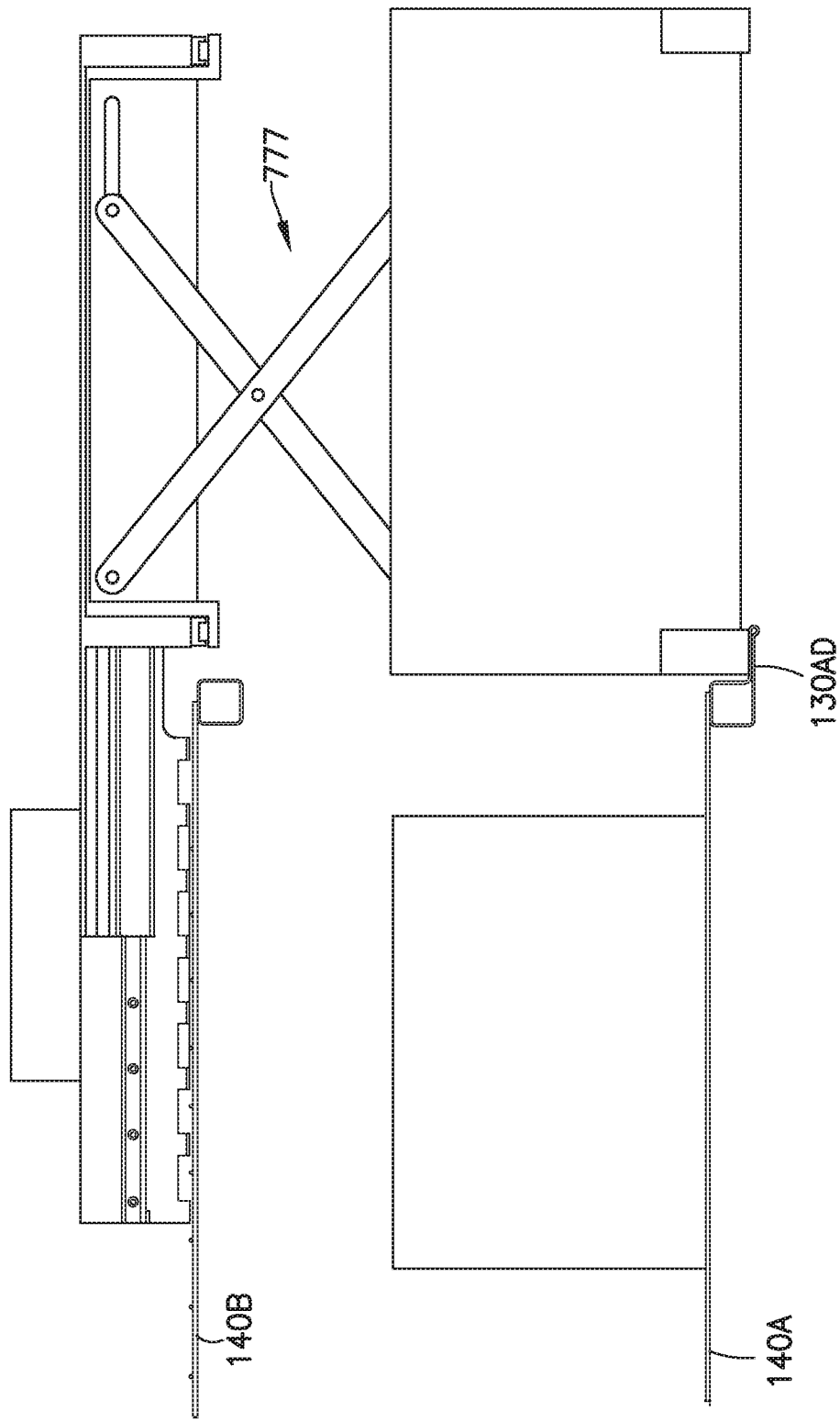
Figure 7B:
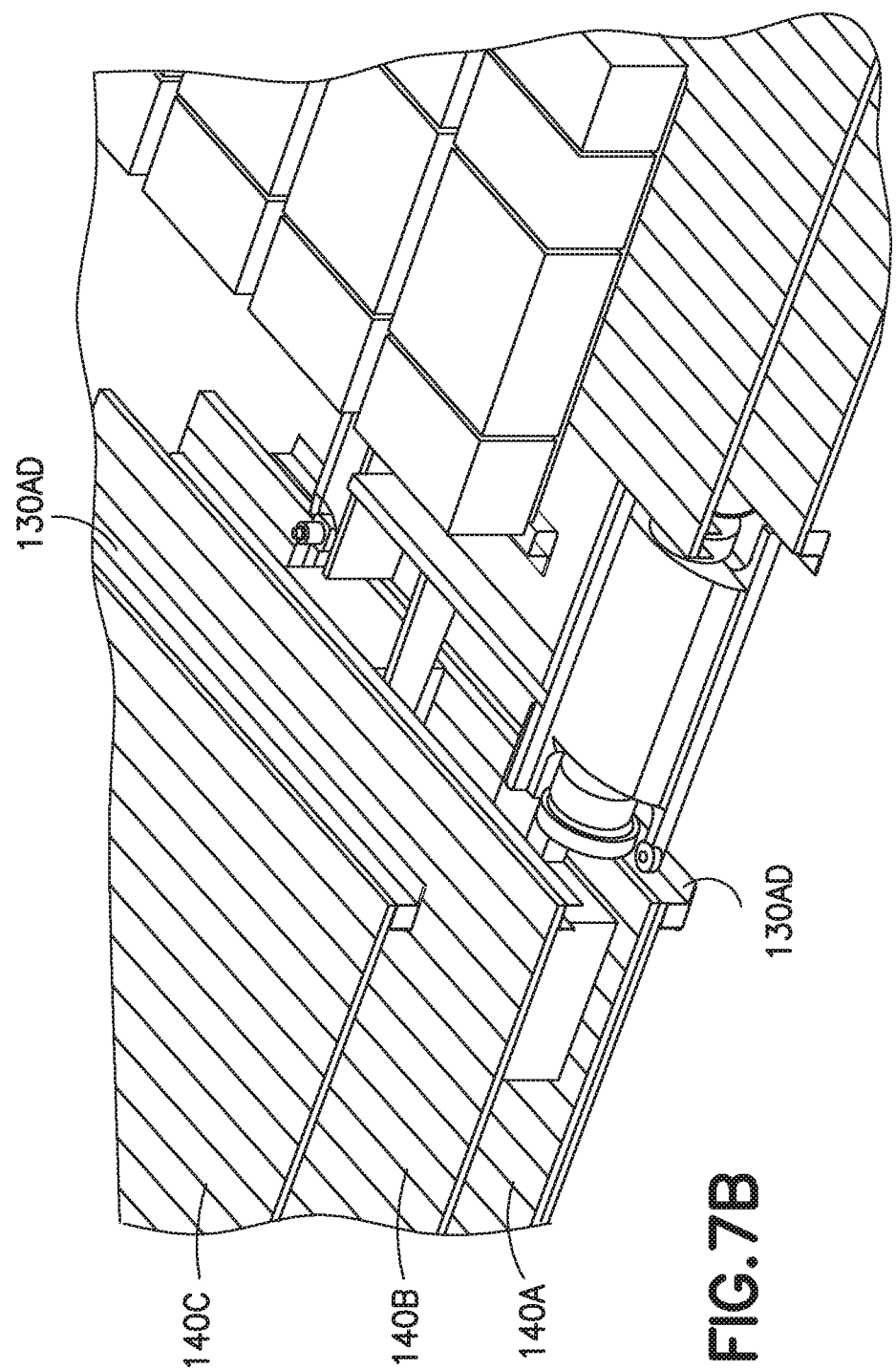

As described above, the storage shelves 140A, 140B, 140C (substantially similar to storage shelves 140, 140') may be stacked one above the other as shown in FIGS. 7A-7C so that multiple storage shelves are accessible from a single picking aisle deck 130AD. Here there are two storage shelves 140A, 140B stacked one above the other and accessible from a single picking aisle deck 130AD. In other aspects there are more than two stacked storage shelves that are accessible from a single picking aisle deck 130AD. In one aspect the end effector lift drive 260C is configured to provide travel of the end effector between multiple storage levels of the storage and retrieval system. For example, referring to FIGS. 7A, 7C and 7C the storage shelves 140 allow for a reduction in the number of picking aisles 130A (FIG. 1) which will allow for a reduced transfer deck 130B (FIG. 1) size, and a reduced deck (e.g. both the transfer deck 130B and the picking aisle deck 130AD) by providing multi-level storage per picking aisle deck 130AD. The configuration of the shelves 140 also allows for an increase in horizontal and vertical case density while positioning/registering the case units or pickfaces with the arms 220A, 220B may allow for moving the pickfaces closer together (e.g. reducing pickface spacing as described above). As noted above, the spacing between the case units or pickfaces allows space for the arms 220A, 220B to be inserted between adjacent case units or pickfaces to transfer the case unit(s) or pickface to and from the storage shelf 140.

Still referring to FIGS. 7A-7C, and as noted above, the rover 110A may be configured to access stacked storage shelves 140A, 140B from a single picking aisle deck 130AD. For exemplary purposes only, in this aspect each picking aisle deck 130AD provides access to two levels of storage 140A, 140B but in other aspects each picking aisle may provide access to more than two levels of storage. It is noted that the level of storage accessed by each picking aisle may vary from one picking aisle deck to another picking aisle deck (e.g. one deck may provide access to a first number of storage levels while another deck may provide access to a second number storage levels where the second number is different than the first number). As noted above, the rover 110 may include end effector lift drive 260C (FIG. 2A) that lifts or lower the arms 220A, 220B to a predetermined height corresponding to a storage level from or to which a case unit or pickface is to be picked or placed in a manner substantially similar to that described herein. The end effector lift drive 260C is any suitable drive section configured to raise and lower the arms 220A, 220B such as, for example, a linear actuator, a screw drive, scissor lift 777 (FIG. 7A), a magnetic drive, etc.

Figure 5D:
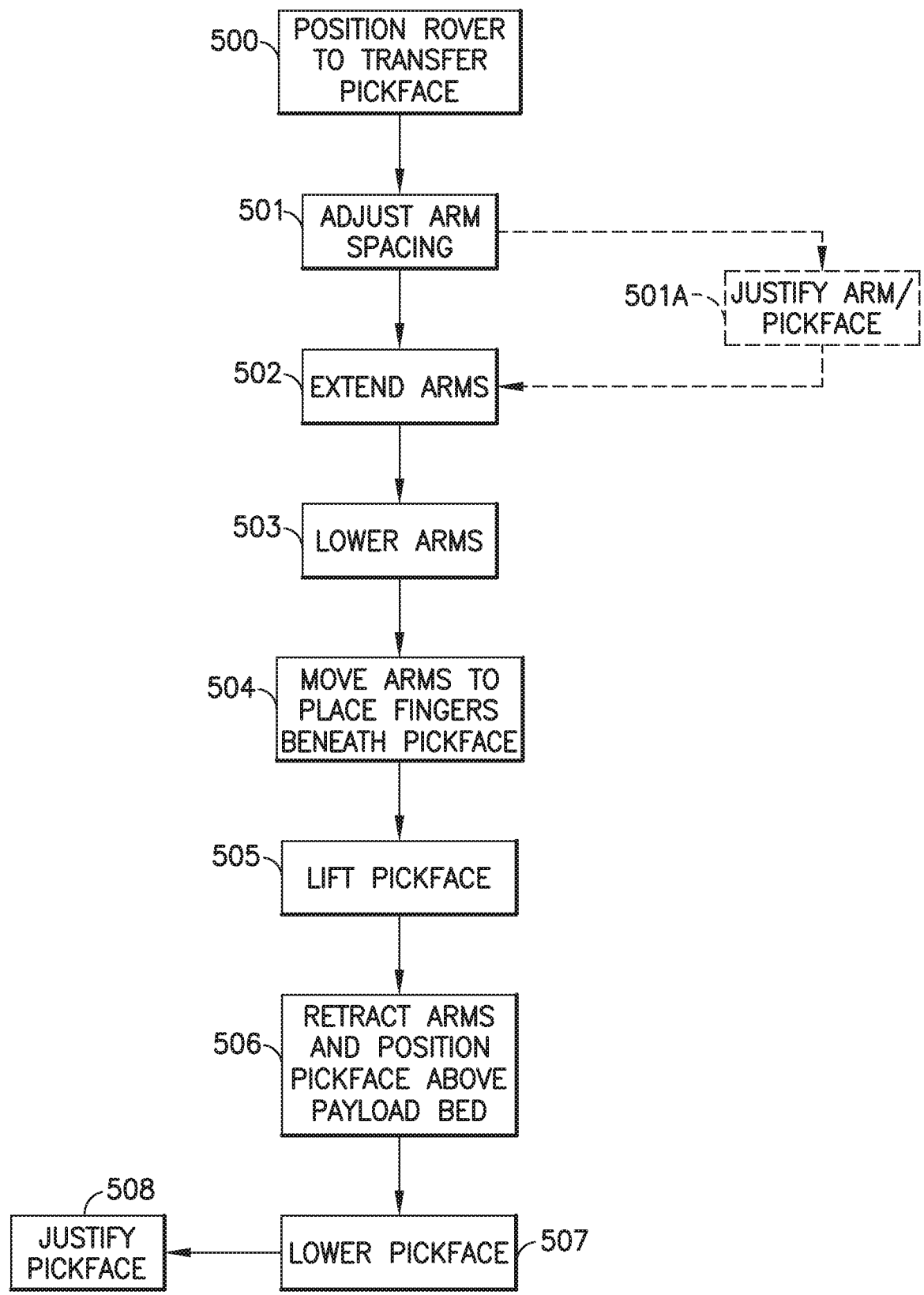
FIG. 5D is a flow chart of a pickface transfer operation in accordance with aspects of the disclosed embodiment.

Referring now to FIGS. 2B, 2D and 5A-5D a pickface 210 picking operation will be described. The rover 110 receives a command from, for example, any suitable controller such as control server 120 (FIG. 1) to transfer a pickface. The rover travels along the transfer deck 130B to a predetermined picking aisle 130A. The rover 110 enters the picking aisle 130A and stops at a predetermined storage location. (FIG. 5D, Block 500). As noted above, the rover 110 includes end effector 200E having arms 220A, 220B that are configured to straddle and interface with opposing sides 210S1, 210S2 of the pickface 210 and to transfer the pickface 210 to and from the payload bed 200. As may be realized, when the arms 220A, 220B are retracted within the payload bed 200 and the rover 110 is not carrying a pickface, the arms 220A, 220B are separated by a distance D1 that is substantially larger than a width W of the widest pickface the rover is capable of carrying and/or that is stored in the storage and retrieval system 100. The rover controller 110C operates the end effector drive section 260 to longitudinally move one or more of the arms 220A, 220B to align the arms 220A, 220B with the storage location according to, for example, the width W of the pickface 210 (FIG. 2B). In one aspect, the rover 110 includes any suitable sensors (as will be described below) configured to detect the sides 210S1, 210S2 of the pickface(s) located on the storage shelves 140 as the rover moves along the picking aisle(s) 130A (FIG. 1). In other aspects the pickfaces 210 are positioned on the storage shelves 140 relative to predetermined features of the storage shelves such that the sensors may detect the predetermined features of the storage shelves to determine the locations of the pickface (and the pickface sides). In one aspect, the case sensors are substantially similar to those described in U.S. patent application Ser. No. 13/327,035 filed on Dec. 15, 2011 (PG Pub. 2012/0189410) and Ser. No. 13/608,877 filed on Sep. 10, 2012 entitled "Storage and Retrieval System Case Unit Detection," the disclosures of which are incorporated by reference herein in their entireties. The rover 110 moves one or more of the arms 220A, 220B to adjust the distance D1 between the arms 220A, 220B so that when extended the arms 220A, 220B are positioned within the spaces SP (FIG. 2C) on either side of the pickface 210 to be transferred to the payload bed 200. As described above, in one aspect the rover 110 includes justification in the direction of arrow 297, the telescoping arms of the rover are moved as a unit in the direction of arrow 297 to further align the arms with the pickface upon picking the pickface from a holding location (or to align the pickface with a holding location upon placement of the pickface at a holding location), e.g. fine positioning of the telescoping arms relative to a pickface holding location (FIG. 5D, Block 501A). The rover 110 controller 110C (FIG. 1) commands the drives 260A, 260C to raise the arms 220A, 220B to a level substantially equal to or above the support surface 140S of the pickface holding location and extend the arms 220A, 220B a predetermined distance into the storage shelf 140 so that the fingers 250 are substantially aligned with the pickface(s) 210 and so that the fingers are positioned in the spaces SP2 between the shelf support surfaces 140S (FIG. 5D, Block 502). In one aspect the arms 220A, 220B are moved in direction 298 independent of a support surface of the payload bed 200 while in other aspects the support surface of the payload bed also are configured move (either by the drive 260C or with a payload bed lift drive) in direction 298 so that the payload bed support surface is adjacent the support surface 140S from which the pickface is to be transferred from/to in a manner substantially similar to that described in U.S. provisional patent application 61/790,801 previously incorporated by reference herein in its entirety. In one aspect, any suitable sensor 257 provides feedback to the controller 110C for determining how deep the arms 220A, 220B are extended into the storage location and to determine the leading and trailing edge boundaries (with respect to the direction of extension of the arms 220A, 220B) of the pickface (as will be described below with respect to the justification of the pickface). The arms 220A, 220B are lowered with drive 260C so that the fingers are positioned a predetermined distance D2 below the shelf support surface 140S (FIG. 5D, Block 503). One or more of the arms 220A, 220B are moved in the direction of arrow 297 with drive 260B towards the sides 210S1, 210S2 of the pickface 210 so that the surface 301S of, for example, telescoping member 301 lightly grips the pickface (e.g. where lightly grip means touching the pickface for alignment of the pickface such that the touching does not provide enough grip to hold the pickface for lifting the pickface off the storage shelf) and the fingers 250 are located beneath the pickface 210 (FIG. 5D, Block 504). In other aspects the surfaces 301S may provide sufficient grip for lifting the pickface. The pickface 210 may be lifted in the direction of arrow 298 any suitable distance D3 from the storage shelf 140 by lifting the arms 220A, 220B using drive 260C so that the fingers 250 are raised to contact bottom 210B (FIG. 2A) of the pickface (e.g. the pickface may slide along the surface 301S to allow contact between the fingers 250 and the bottom 210B of the pickface) (FIG. 5D, Block 505) for supporting the weight of the pickface. The arms 220A, 220B may be retracted in the direction of arrow 299 so that the pickface is located above the payload bed 200 (FIG. 5D, Block 506) and the pickface 210 may be lowered in the direction of arrow 298 into the payload bed 200 (FIG. 5D, Block 507). When located within the payload bed the pickface 210 is, in one aspect, supported by the fingers and/or by any suitable support surface of the payload bed 200. As may be realized, the surfaces 301S are, in one aspect, employed to justify the pickface (FIG. 5D, Block 508) within the payload bed (e.g. locate the pickface at a predetermined position relative to one or more reference datums of the payload bed) in any suitable manner such as that described below where one or more of the arms 220A, 220B are moved in the direction of arrow 297 for justification of the pickface.

During transport of the pickface 210, the pickface is, in one aspect, held or clamped by the surfaces 301S of the arms 220A, 220B or any other suitable alignment/gripping surfaces of the rover. To place the pickface 210 into any suitable pickface holding location the rover 110 may be positioned at a predetermined location relative to the pickface holding location. In one aspect, where the pickface 210 is justified, the pickface 210 is moved by the arms 220A, 220B in the direction of arrow 297 within the payload bed 200 to align the pickface 210 with the pickface holding location. In other aspects the positioning of the rover 110 effects alignment of the pickface 210 with the pickface holding location. The arms 220A, 220B raise the pickface to a level substantially equal to or above the support surface 140S of the pickface holding location and the arms transfer the pickface 210 onto the support surface 140S of the pickface holding location in a manner substantially opposite to that described above for transferring the pickface onto the payload bed 200. As may be realized, while transfer of payload to and from the rover 110 is described with respect to pickface 210 it should be understood that the above-description also applies to transfer of individual case units to and from the rover 110. In addition, while reference is made to the storage shelf 140, 140', 140A, 140B it should be understood that the rover may transfer a case unit and/or a pickface formed of case units to any suitable pickface holding location such as the storage shelves 140, 140', 140A, 140B, a shelf of a lift 150A, 150B or any other suitable location.

Figure 17:
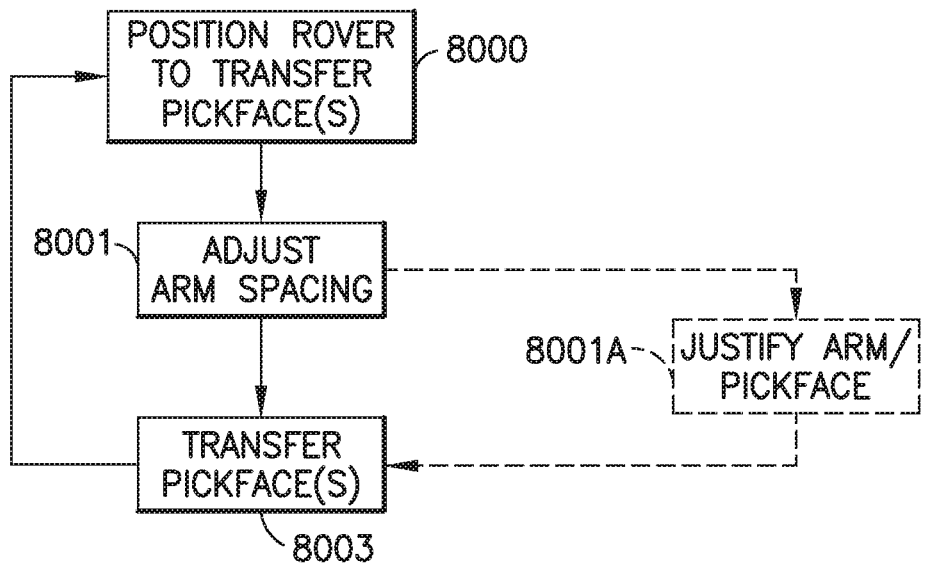
FIGS. 17 and 18 are flow charts of a pickface building operation in accordance with aspects of the disclosed embodiment.

Referring again to FIGS. 2B, 2D and 5A-5D an exemplary pickface building operation of the rover 110 will be described. The rover 110 is positioned to transfer one or more first pickfaces 210 from a shelf to the rover 110 in a manner substantially similar to that described above (FIG. 17, Block 8000). A spacing D1 between the arms 220A, 220B is adjusted in the direction of arrow 297 to align the arms 220A, 220B with the one or more first pickfaces 210 (so as to fit in the space SP between adjacent case units/pickfaces) as illustrated in FIG. 2C (FIG. 17, Block 8001). As described above, in one aspect the rover 110 includes justification in the direction of arrow 297, the telescoping arms of the rover are moved as a unit in the direction of arrow 297 to further align the telescoping arms 220A, 220B with the one or more first pickfaces 210, e.g. fine positioning of the telescoping arms relative to a pickface holding location (FIG. 17, Block 8001A). The telescopic arms 220A, 220B are extended and retracted in the direction of arrows 299A, 299B to transfer the one or more first pickfaces 210 to the payload bay (FIG. 17, Block 8003) in the manner described above with respect to Blocks 502-508 of FIG. 5D. Once the one or more first pickfaces 210 are positioned within the payload bed 200 the rover 110 traverses the picking structure and is positioned relative to another pickface holding location (FIG. 17, Block 8000) for the transfer of one or more second pickfaces 210X (FIG. 2C) to the payload bay 200. The one or more first pickfaces 210 within the payload bay are unclamped and the spacing between the telescoping arms 220A, 220B are adjusted (FIG. 17, Block 8001) and/or justified (FIG. 17, Block 8001A) so as to align the telescoping arms 220A, 220B with the one or more second pickfaces 210X in the other pickface holding location. As may be realized, the one or more first pickfaces 210 already held on the payload bed 200 are moved with the telescoping arms 220A, 220B in the direction of arrow 297 as the telescoping arms are justified. The telescopic arms 220A, 220B are extended and retracted in the direction of arrows 299A, 299B to transfer the one or more second pickfaces 210X to the payload bay (FIG. 17, Block 8003) in the manner described above with respect to Blocks 502-508 of FIG. 5D. As may be realized, during the transfer of the one or more second pickfaces into the payload bay 200 the telescoping arms 220A, 220B may be spaced from the sides of the one or more first pickfaces 210 so that the fingers 250 do not contact the one or more first pickfaces in the payload bay 200 (and/or referring FIGS. 3B and 3C one or more of the fingers 250', 250" are positioned, e.g. retracted, so as to not contact the pickface 210 in the payload bay 200). In other aspects the fingers 250 furthest from the free ends FE (FIG. 2D) of the arms 220A, 220B are longer than the fingers 250 adjacent the free ends FE so that the one or more first pickfaces 210 are held by the arms 220A, 220B during picking of the one or more second pickfaces 210X while still allowing the arms 220A, 220B to be spaced apart so as to straddle the one or more second pickfaces 210X without contact as the arms 220A, 220B are extended into the holding location. The one or more first and second pickfaces 210, 210X are transferred as a unit by the rover 110 and placed at a pickface holding location as a unit (or at more than one pickface holding location separately) in a manner substantially opposite to that described above with respect to transfer of the pickfaces 210, 210X into the payload bed 200.

In one aspect, as noted above, the rover 110 include justification features such as those described in United States provisional patent application Ser. No. 14/215,310 filed on Mar. 17, 2014 entitled "Automated Storage and Retrieval System," previously incorporated by reference herein in its entirety. For example, in one aspect, the rover 110 includes active side justification (where, as noted above, one arm 220A, 220B is fixed and the other arm 220A, 220B is movable in direction 297 or where both arms 220A, 220B are movable in direction 297). Suitable sensors 257 for physical confirmation of case boundaries (FIG. 2A) may also be located adjacent to or within the payload bed 200 and/or on one or more of the arms 220A, 220B. In one aspect the sensors 257 are beam line or curtain sensors disposed on the arms 220A, 220B of the rover. The sensors 257 allow the rover to, on placing pickfaces, confirm empty and adequate space exists on any suitable pickface holding location, such as for example a storage shelf 140, 140', 140A, 140B for a pickface and to confirm that the pickface is placed with the correct setback (e.g. the distance the pickface is located from a picking aisle edge of the pickface holding location or any other suitable reference datum). On picking pickfaces 210 from a storage location the sensors 257 allow for case targeting and confirmation of the depth to which the arms 220A, 220B are extended into the storage location. The arms 220A, 220B also, in one aspect, provide guidance for pickfaces being placed in deep storage locations (e.g. at storage locations that are distant from an edge of, e.g., the storage shelf 140).

Where justification of the pickfaces is provided, the payload bed 200 of the rover 110 is, in one aspect, configured to allow multi-degree of freedom sliding movement of the pickface 210 (and the case units forming the pickface) along the surface of the payload bed 200. In one aspect the payload bed is a substantially flat surface constructed of any suitable material having a low coefficient of friction, while in other aspects the payload bed include a plurality of ball bearings on which the pickface rides, while in still other aspects the payload bed 200 has any suitable construction, such as that describe above, that allows for the multi-degree of freedom sliding movement of the pickface 210 (and the case units forming the pickface) along the surface of the payload bed 200. In other aspects the pickface is justified while being held above the payload bed surface by the fingers 250.

As noted above, referring to FIG. 6, in one aspect, the rover 110 includes any suitable sensors for detecting the position of the pickface(s) 210 located on the storage shelves 140. In one aspect of the disclosed embodiment, the rover includes one or more beam sensors 600, 601 and/or proximity sensors 602, 603 that may be positioned on the frame 110F of the rover 110 below the payload bed 200 to sense predetermined features or targets 611, 612, 613 (e.g. slots, protrusions, etc.) disposed on or in horizontal supports 282 of the storage shelf 140. For example, the sensors 600, 601, 602, 603 are positioned, for example, to sense the targets 611, 612, 613 on the horizontal supports 282 so that as each target 611, 612, 613 is sensed by a respective sensor 600, 601, 602, 603 that sensor produces an on/off signal for determining a position of the rover in a manner substantially similar to that described in U.S. provisional patent application No. 61/790,801. As may be realized, the rover has sensors 700, 701 on both lateral sides of the rover 110S1, 110S2 so that the sensors 600, 601, 602, 603 may detect the targets 611, 612, 613 regardless of the travel orientation of the rover where the targets 611, 612, 613 are located on but one horizontal support 282 in the picking aisle 130A. As may be realized, where the sensors are to detect the pickfaces 210 located on the storage shelf 140 rather than the targets the sensors are located on the rover at any suitable height for detecting the pickfaces 210. In one aspect the beam sensors 600, 601 and one or more proximity sensors 602, 603 are used in conjunction with each other for determining a position of the rover within the storage structure. In one aspect the proximity sensors 602, 603 is used to determine a location of the rover within the picking aisle 130A while the beam sensors 600, 601 is used to determine a location of the rover in an area between the targets 611, 612, 613 for aligning the arms 220A, 220B of the rover 110 with the spaces SP between the pickfaces 210 for transferring pickfaces 210 between the rover 110 and the storage shelf 140, while in other aspects the beam sensors 600, 601 and proximity sensors 602, 603 are used in any suitable manner for determining a location of the rover within the storage structure and for transferring pickfaces between the rover 110 and the storage shelves 140.

Figure 8:
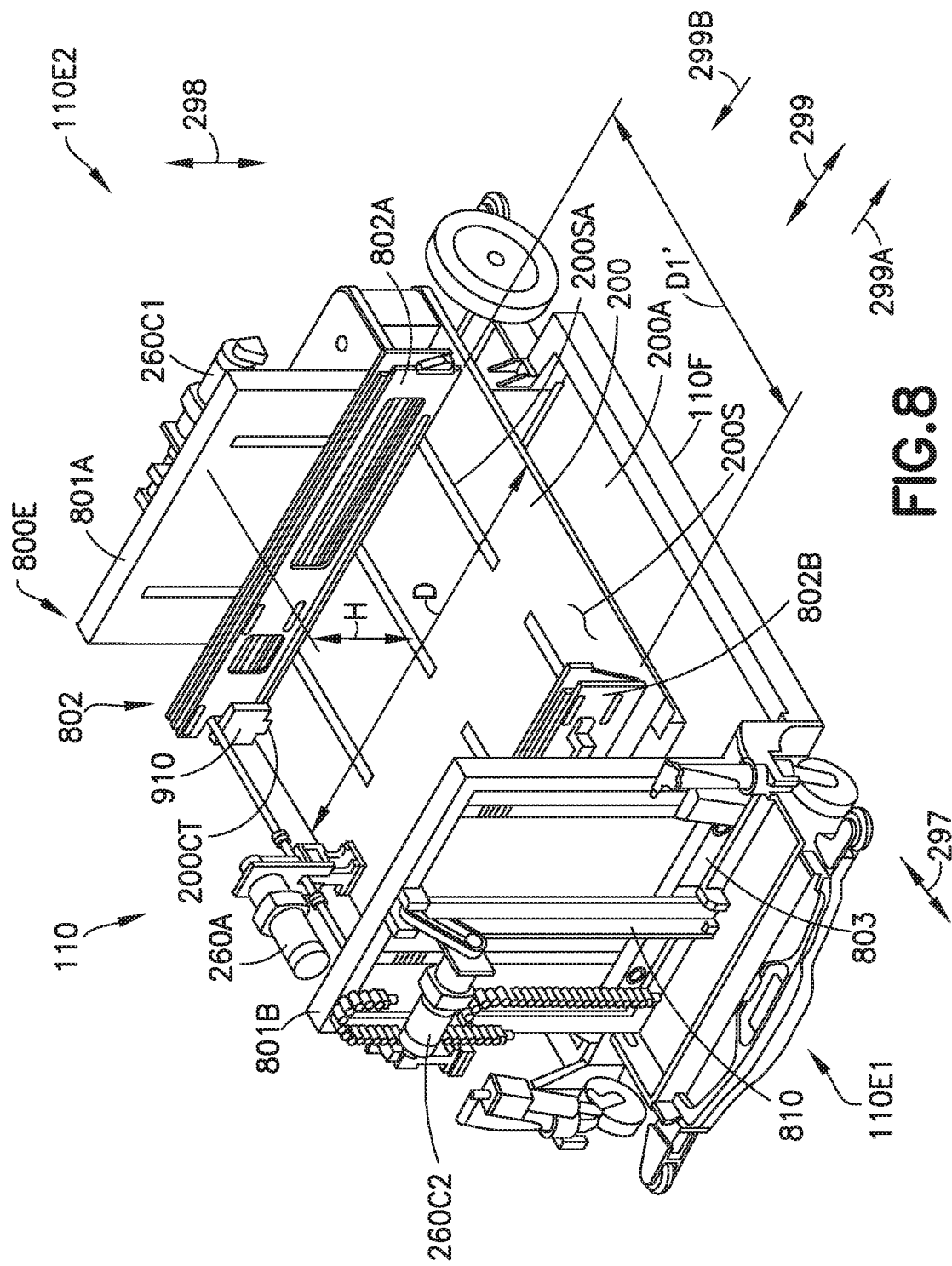
FIG. 8 is a schematic illustration of an autonomous transport vehicle in accordance with aspects of the disclosed embodiment.

Referring now to FIG. 8 a rover 110 is illustrated in accordance with an aspect of the disclosed embodiment. The rover 110 is substantially similar to that described above except where noted. Here the rover 110 includes a frame 110F having a first end 110E1 and a second end 110E2 longitudinally spaced from the first end 110E1. The frame 110F forms a payload area 200A in which a Cartesian telescopic manipulator 800E is mounted. The manipulator 800E, as will be described below, is configured to handle pickfaces 210 (FIG. 2A) of variable length and width by, for example pushing or pulling the pickfaces 210 between any suitable storage shelf and a payload bay of the rover 110. In one aspect the storage shelf may be substantially similar to storage shelf 140 (FIG. 2A) described above while in other aspects the storage shelf may include a substantially flat pickface support surface or a slatted pickface support surface rather than a wire rack pickface support surface.

In this aspect the manipulator 800E includes a drive section having at least a three degree of freedom drive (as will be described below), one or more telescoping arms 802A, 802B (e.g. generally end effector 802), a payload bay 200 and at least one mast assembly or member 801A, 801B. In one aspect the payload bay 200 is suspended between two mast assemblies or members 801A, 801B which are mounted to the payload area 200A of the frame 110F while in other aspects the payload bay 200 may be cantilevered from a single mast member (such as one of mast members 801A, 801B). The mast members 801A, 801B, as will be described in greater detail below, include guides for effecting movement of the payload bay 200 in the direction of arrow 298 (e.g. vertically relative to a surface on which the rover travels). The end effector 802 is mounted at least partly within the payload bay 200 so as to extend and retract in the direction of arrow 299 so as to reach/extend outside of the payload bay 200 for transferring pickfaces 210 between the payload bay 200 and a shelf 140. Here the end effector 802 includes two telescoping arms 802A, 802B disposed substantially at opposite sides (e.g. in the direction of arrow 297) of the payload bay 200. The telescoping arms 802A, 802B are mounted at least partly within the payload bay 200 so as to be movable towards and away from each other within the payload bay in the direction of arrow 297. As may be realized, the payload pay 200 is configured to support a pickface 210 within the payload bed 200 in any suitable manner such as on a substantially flat surface or plate 200S.

Figure 9:
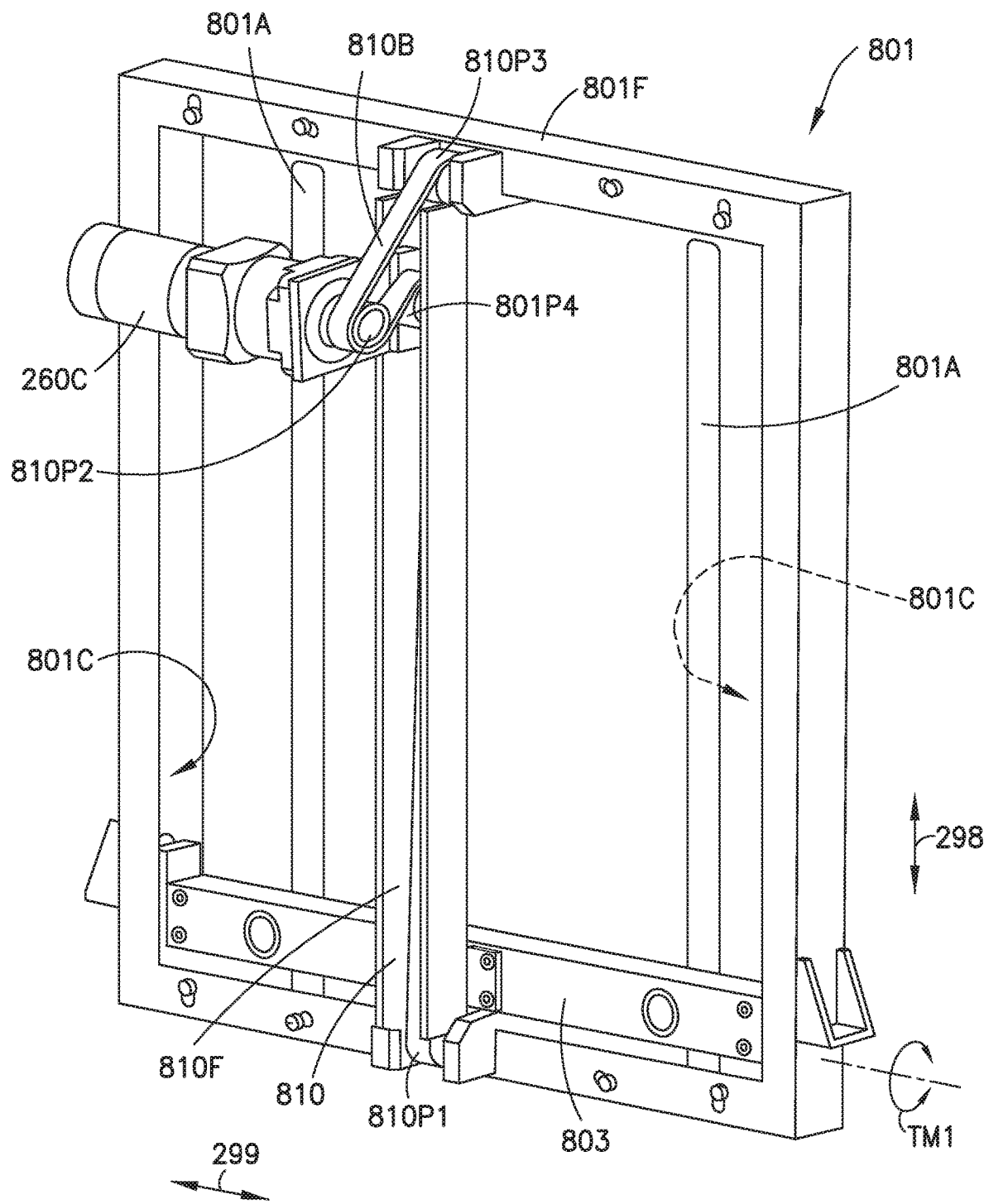
Figure 9A:
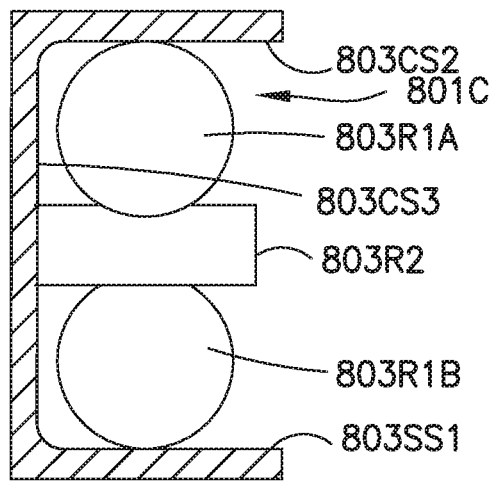
Figure 10:
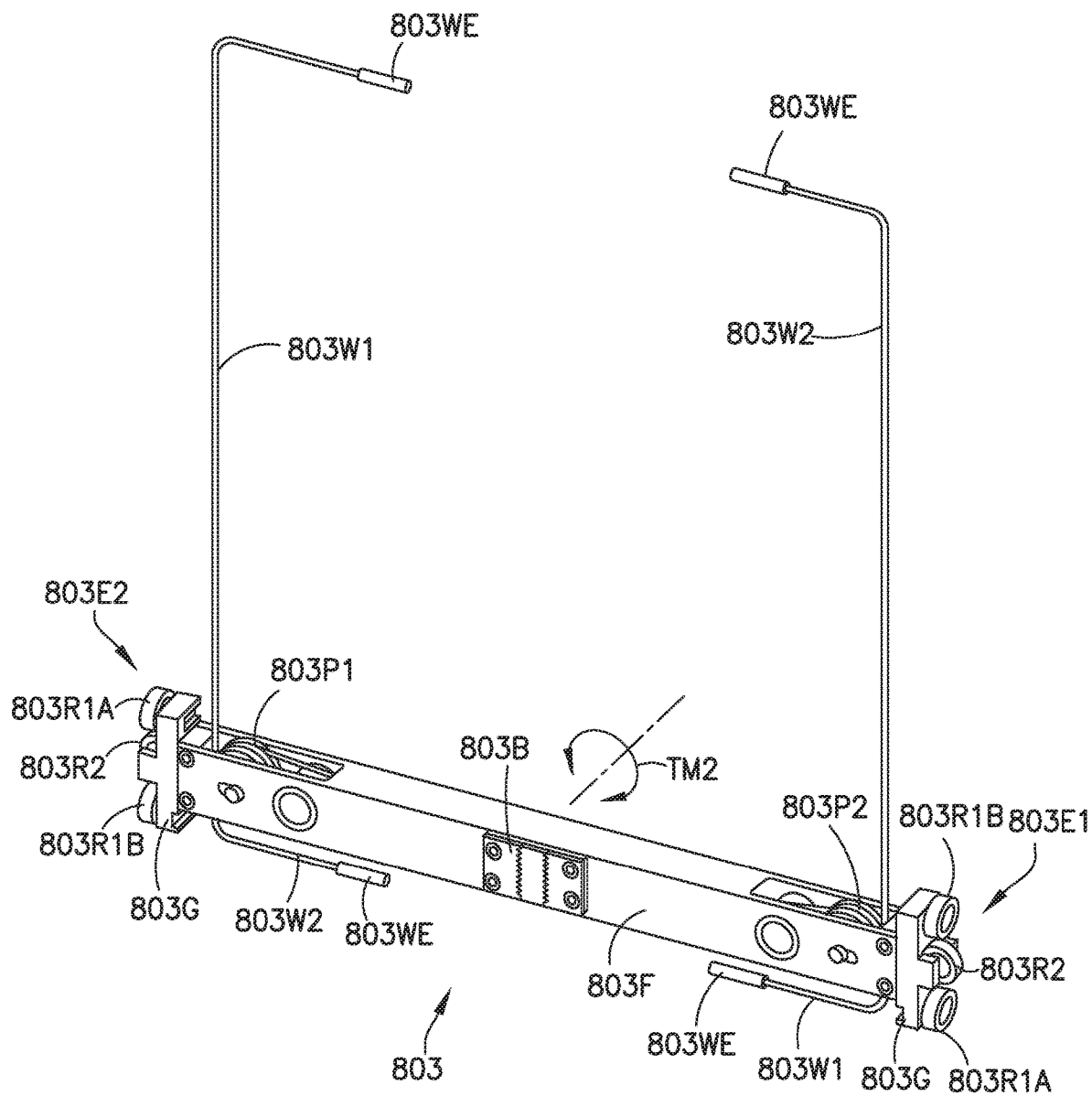

Referring now to FIG. 9, in one aspect the mast members 801A, 801B (generally referred to as mast member 801) have substantially the same configuration while in other aspects the mast members 801A, 801B may each have any suitable configuration. Here each mast member 801 includes a frame 801F, a carriage 803 and a drive 810 (e.g. a vertical drive). The frame 801F forms two opposing channels 801C disposed on opposite vertical sides of the frame 801F. The carriage 803 extends between and is mounted within the channels 801C so as to move vertically in the direction of arrow 298. For example, referring also to FIG. 10, the carriage 803 includes guide wheel members or assemblies 803G mounted at opposite ends 803E1, 803E2 of the carriage 803. Each guide wheel member includes one or more guide wheels 803R1A, 803R1B, 803R2 that engage one or more sides of a respective channel 801C. For example, each guide member 803G includes guide wheels 803R1A, 803R1B, 803R2 that stabilize the carriage in one or more of directions 297, 299. Here, as can also be seen in FIG. 9A, each guide member 803G includes one or more guide wheels 803R1A, 803R1B that engage opposite sides 801CS1, 803CS2 of a common channel 801C (e.g. wheel 803R1A engages side 803CS2 while wheel 803R1B engages side 803CS1 or vice versa) so as to stabilize movement of the carriage 803 in the direction of arrow 297 and one or more guide wheels 803R2 that engages the other side of the channel 801C (spanning between the opposite sides) for stabilizing movement of the carriage 803 in the direction of arrow 299. As may be realized, the guide wheel members 803G are mirror images of one another so that the uppermost (e.g. in the vertical direction of arrow 298) wheels 803R1A (at end 803E2), 803R1B (at end 803E1) engage opposite sides of the respective channels and the lowermost wheels 803R1B (at end 803E2), 803R1A (at end 803E1) engage opposite sides of the respective channels so as to substantially eliminate torsional movement TM1 of the carriage within the channels 801C about an axis extending in the direction of arrow 299. Torsional movement TM2 of the carriage 803 about an axis extending in the direction of arrow 297 is substantially eliminated with a wire rope reeving that includes wires 803W1, 803W2 and pulleys 803P1, 803P2, where the pulleys 803Pa, 803P2 are mounted to the carriage 803 and ends 803WE of wires 803W1, 803W2 are anchored to, for example a respective mast member 801. As can be seen in FIG. 10, the wire rope reeving is arranged so that the wire ropes 802W1, 803W2 pass through the pulleys so as to cross and exit the reeving at an opposite side and/or end of the frame 803F. For example, wire rope 803W1 enters the frame at end 803E2, engages pulley 803P1, travels along a length of the frame, engages pulley 803P2 and then exits the frame from the opposite side at opposite end 803E1. Similarly, wire rope 803W2 enters the frame at end 803E1, engages pulley 803P2, travels along a length of the frame while crossing wire rope 803W1, engages pulley 803P1 and then exits the frame from the opposite side at opposite end 803E2. This crossed reeving arrangement constrains the carriage in a predetermined orientation (e.g. horizontally) for travel along the mast 801.

The carriage 803 is driven in the direction of arrow 298 in any suitable manner such as by drive 810 (e.g. vertical drive) which includes a belt and pulley drive system but in other aspects a lead screw drive or other linear actuator drives the carriage in the direction of arrow 298. The drive 810 includes a frame 810F that is mounted to the mast 801. A drive motor 260C is mounted to the frame 810F so as to drive belt 810B with a pulley 810P2 mounted to an output shaft of the drive motor 260C. The belt 810B is wound around and guided by one or more pulleys 801P1, 801P3, 801P2, which are mounted to the frame 810F. The belt 810B is fixed to the carriage via mount 803B of the carriage 803 so that as the belt 810B moves the carriage 803 moves with the belt 810B in the direction of arrow 298. As may be realized, as each mast member 801A, 801B includes a respective vertical drive, the drives 810 are driven by a Master-Slave control system, such as controller 110C (FIG. 1) so the payload bay 200 suspended between the mast members 801A, 801B is kept level. The vertical positioning of the payload bay 200 within limits of travel defined by, for example, at least the mast members 801 is infinite. As may be realized, a height of the channels 801C and/or width of the frame 801F (e.g. a distance between the opposing channels 801C) are/is suitably sized depending on a travel height H and/or depth D of the payload bay 200. As can be seen in FIG. 9, each mast member 801 includes channels 801A so that the carriage 803 and the payload bay 200 can be coupled to each other so that the carriage(s) 803 support or otherwise carry the payload bay 200 (e.g. the payload bay depends from the carriage(s) 803).

Figure 11A:
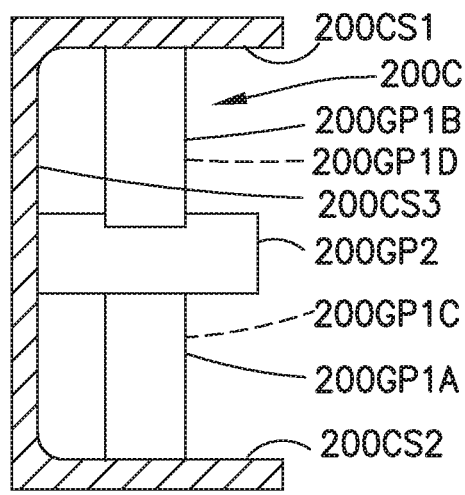
Figure 11:
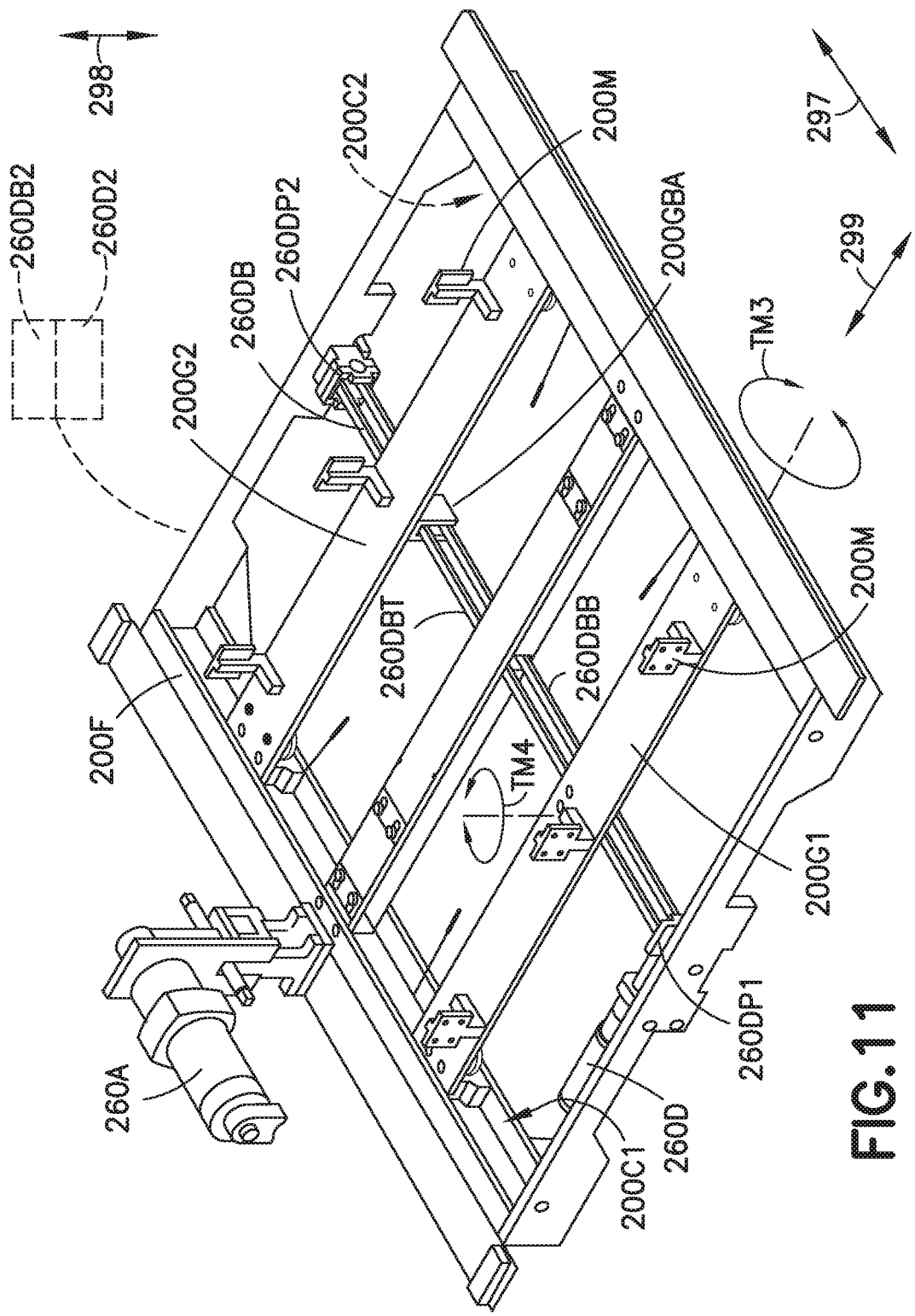
Figure 12A:
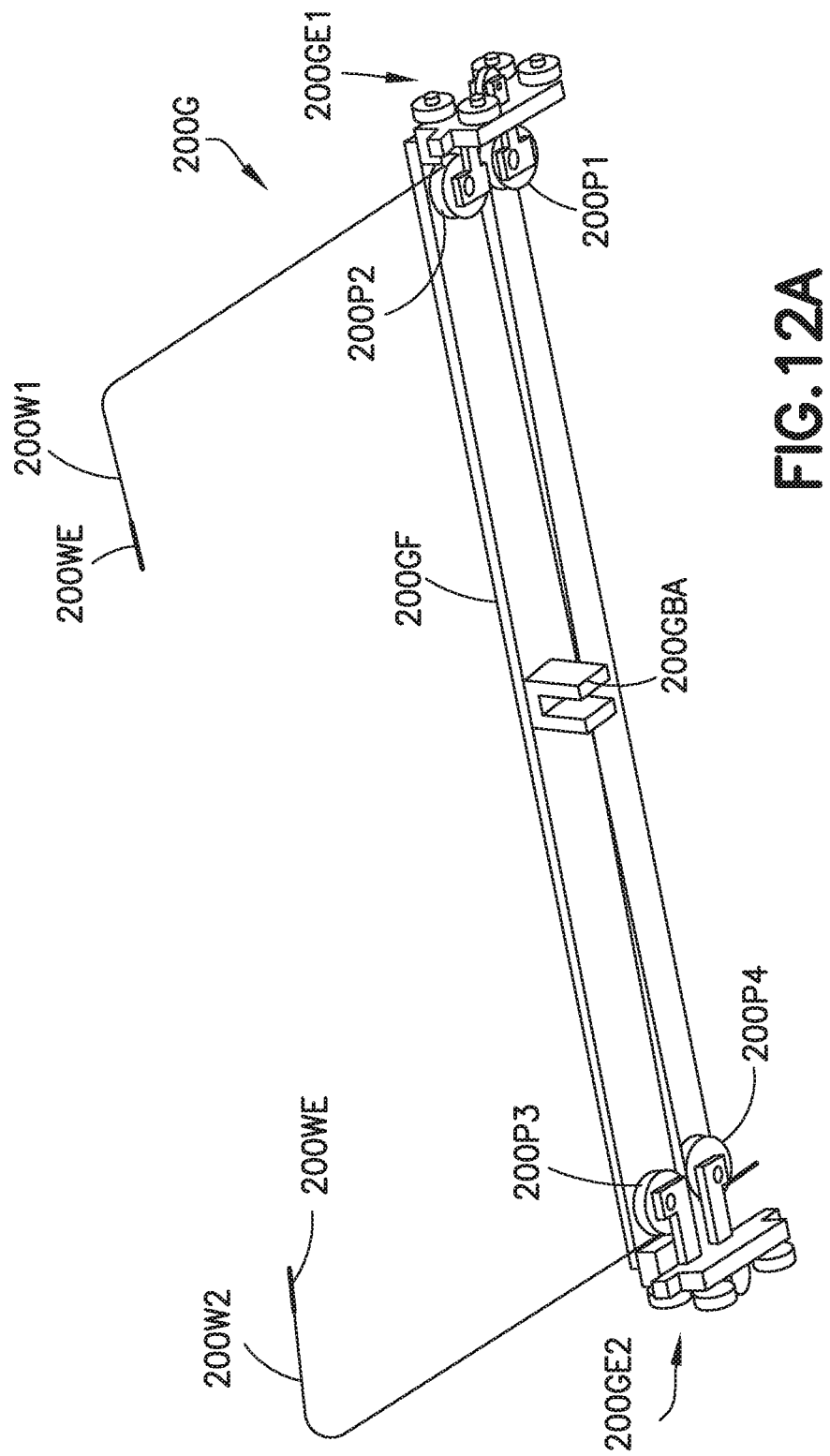
Figure 12B:
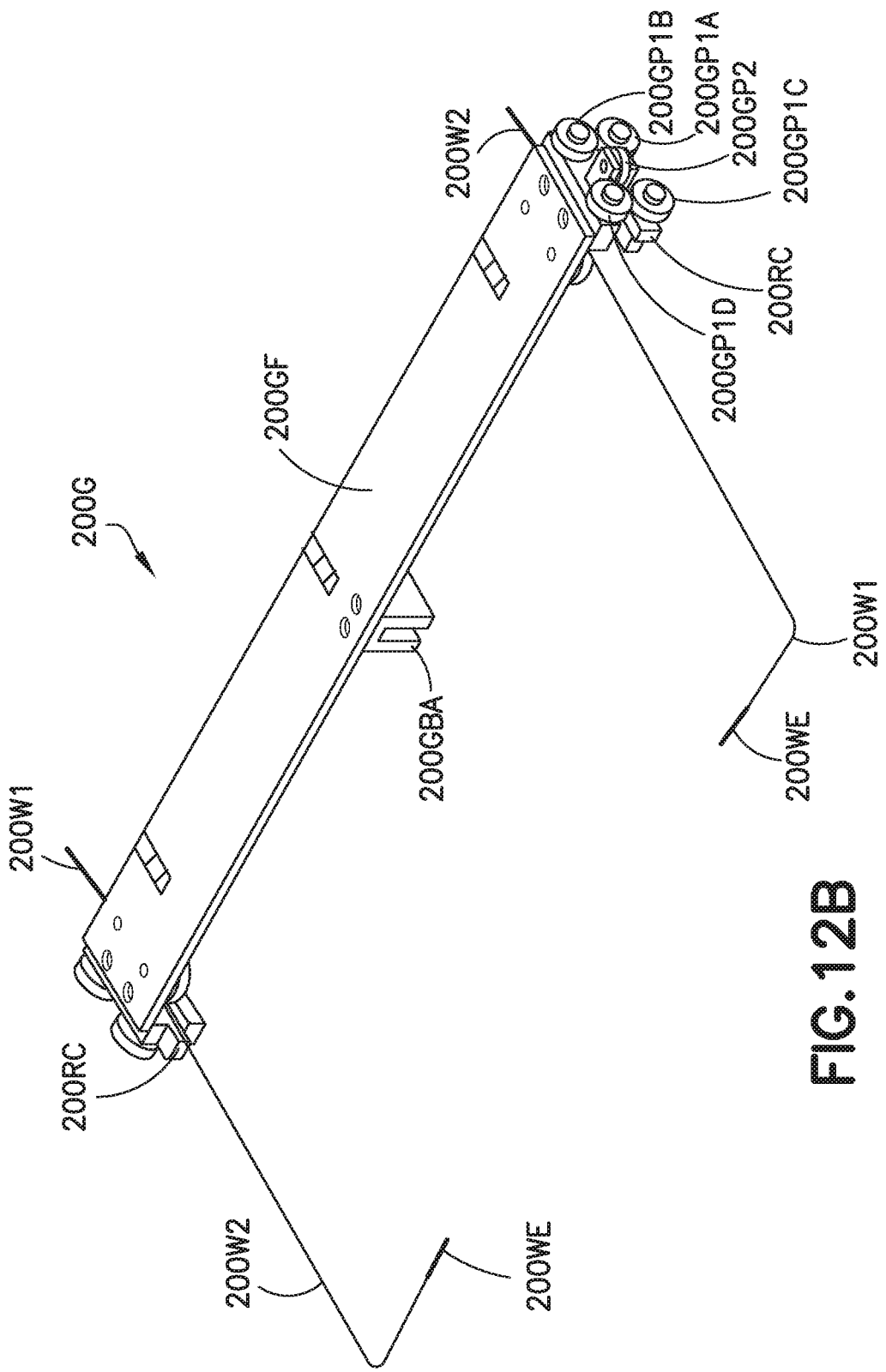

Referring now to FIGS. 8 and 11, the payload bay 200 includes a frame 200F and a pickface support surface 200S (not shown in FIG. 11) mounted to the frame 200F. The frame 200F defines opposing channels 200C1, 200C2 in which two effector carriages 200G1, 200G2 are mounted so as to travel in the direction of arrow 297. Referring also to FIGS. 12A and 12B each effector carriage (generally effector carriage 200G) includes a frame 200GF having guide wheel carriages 200RC disposed at opposite ends 200GE1, 200GE2. Each guide wheel carriage 200RC includes one or more guide wheels 200GP1A-200GP1D configured to engage one or more walls of the channel 200C to stabilize movement of the effector carriage 200G from movement in the directions of arrows 298, 299. For example, referring to FIG. 11A, each guide wheel carriage 200RC includes one or more guide wheels that engages the opposing sides 200CS1, 200CS2 of a respective channel 200C so as to stabilize movement of the effector carriage 200G in the direction of arrow 298 (as well as substantially eliminate torsional movement TM3 of the effector carriage 200G about an axis substantially parallel with the direction 299) and one or more guide wheels that engage the other wall 200CS3 of the respective channel 200C so as to stabilize movement of the effector carriage 200G in the direction of arrow 299. Torsional movement TM4 of the effector carriage 200G about an axis substantially parallel with the direction of arrow 298 is substantially eliminated by a wire rope reeving (which is similar to that described above) in a manner substantially similar to that described above with respect to carriage 803 where the wire rope reeving includes wires 200W1, 200W2 and pulleys 200P1-200P4 mounted to the frame 200GF where the ends 200WE of the wires 200W1, 200W2 are secured or otherwise fixed to, for example, the frame 200F of the payload bed or any other suitable portion of the rover 110. Each effector carriage also includes a drive belt coupling member 200GBA for fixing the respective effector carriage 200G to the drive belt 260DB. A motor 260D, mounted to the frame 200F, drives the drive belt 260DB (which is mounted to the frame 200F with pulleys 260DP1, 260DP2) to move the effector carriages 200G1, 200G2 towards and away from each other where one effector carriage 200G1 is attached to a top 260DBT of the drive belt 260DB (which loops around the pulleys 260DP1, 260DP2) and other effector carriage 200G2 is attached to a bottom 260DBB of the drive 260DP loop. The effector carriage 200G1, 200G2 positions are infinite between their limits of travel. The length and width of the payload bay 200 can be sized to support a pickface having any suitable length and width as the effector carriages 200G1, 200G2 are adjusted to accommodate various size pickfaces. As may be realized, one or more arm mounts 200M are affixed to each effector carriage 200G1, 200G2 so that the telescoping arms 802A, 802B are mounted to a respective one of the carriages 200G1, 200G2. The arm mounts 200M extend through the pickface support surface 200S of the payload bay 200 so as to travel within slots or apertures 200SA formed in the pickface support surface 200S. In another aspect, each effector carriage 200G1, 200G1 is movable independent of the other effector carriage in a manner similar to that described above so that a pickface(s) is justified in the direction of arrow 297 relative to the frame 110F and/or a pickface holding location. For example, in this aspect one of the effector carriages 200G1, 200G2 is coupled to the drive belt 260DB for movement in the direction of arrow 297 by motor 260D. The other effector carriage 200G1, 200G2 is coupled to a second drive belt 260DB2 (in a manner substantially similar to that described above) for movement in the direction of arrow 297 by a second motor 260D2 (substantially similar to motor 260D). Here each effector carriage, and hence each telescoping arm 802A, 802B, is independently movable and movable together so that a pickface can be justified in the direction of arrow 297 by moving one or more of the telescoping arms 802A, 802B.

Figure 13A:
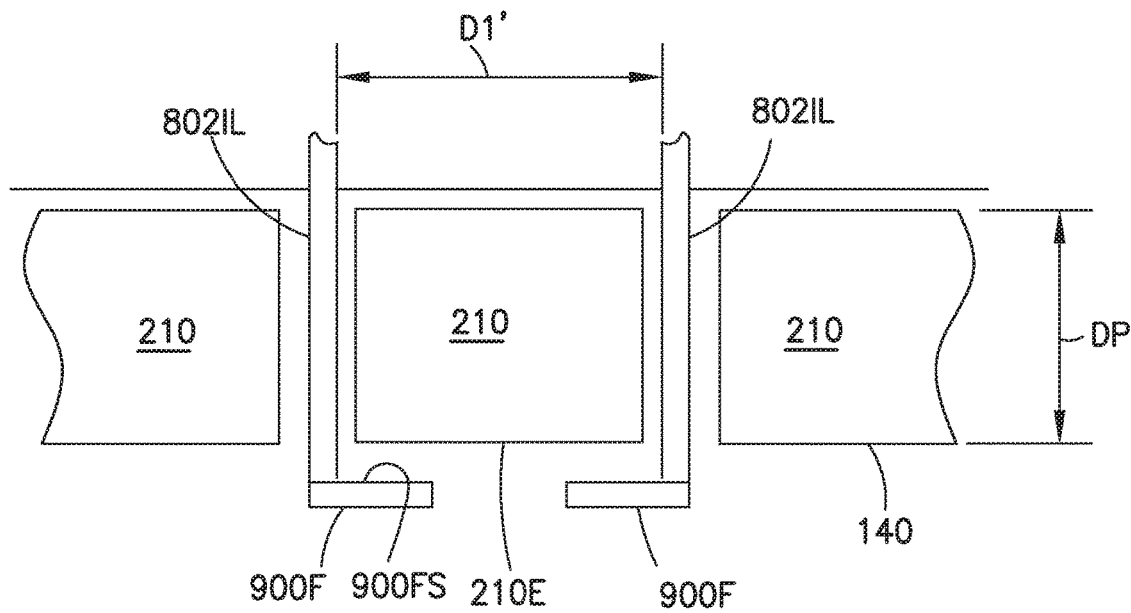
Figure 13B:
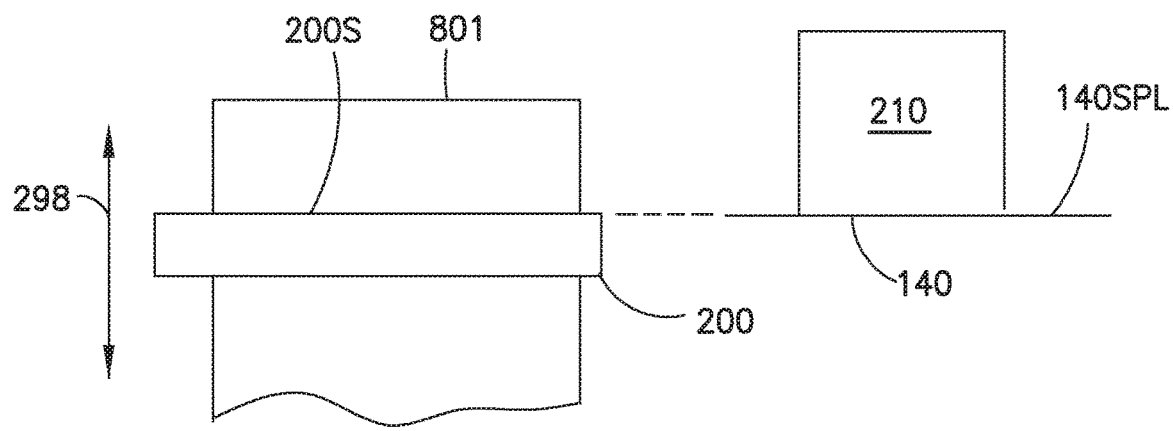
Figure 14A:
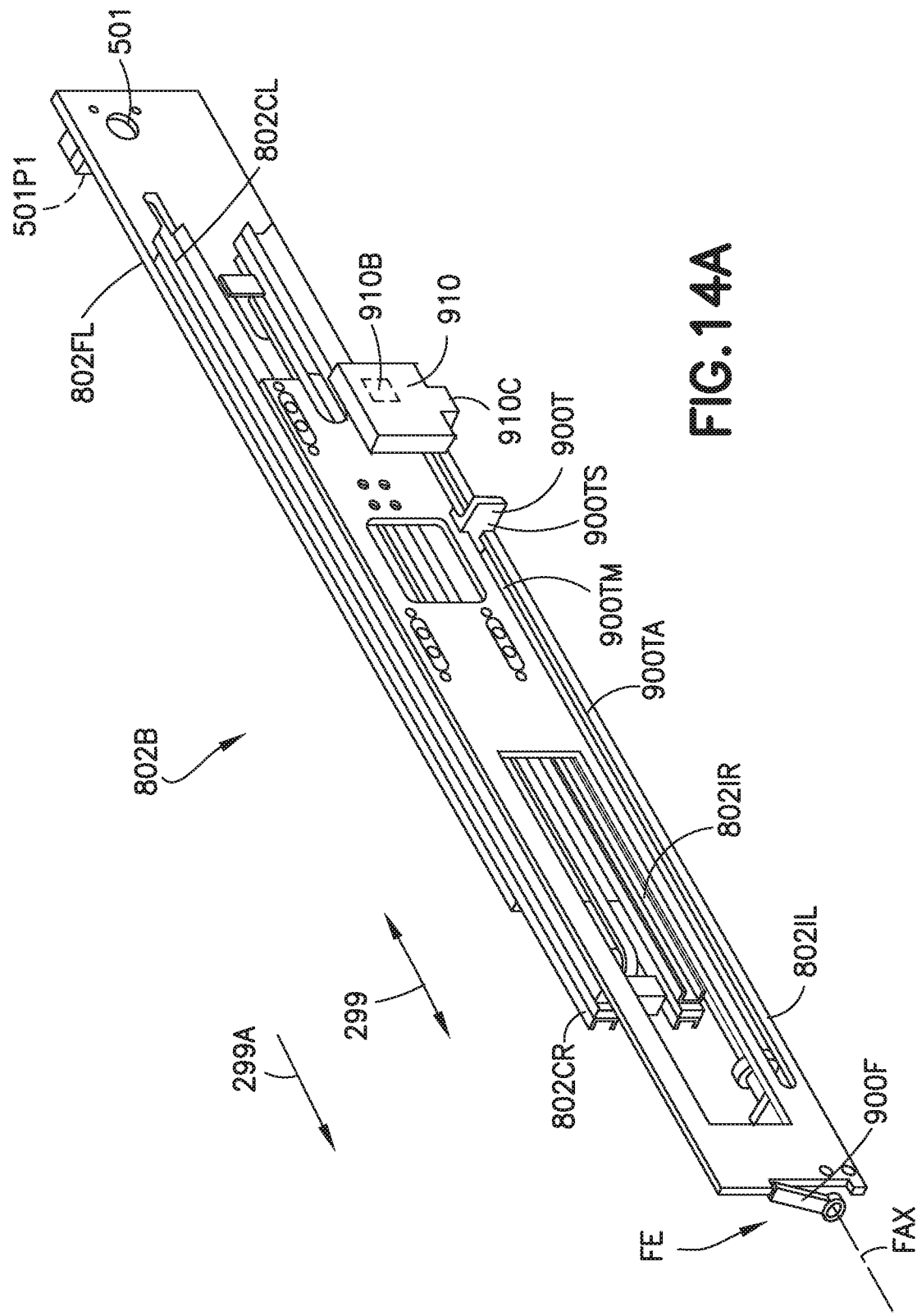
Figure 14B:
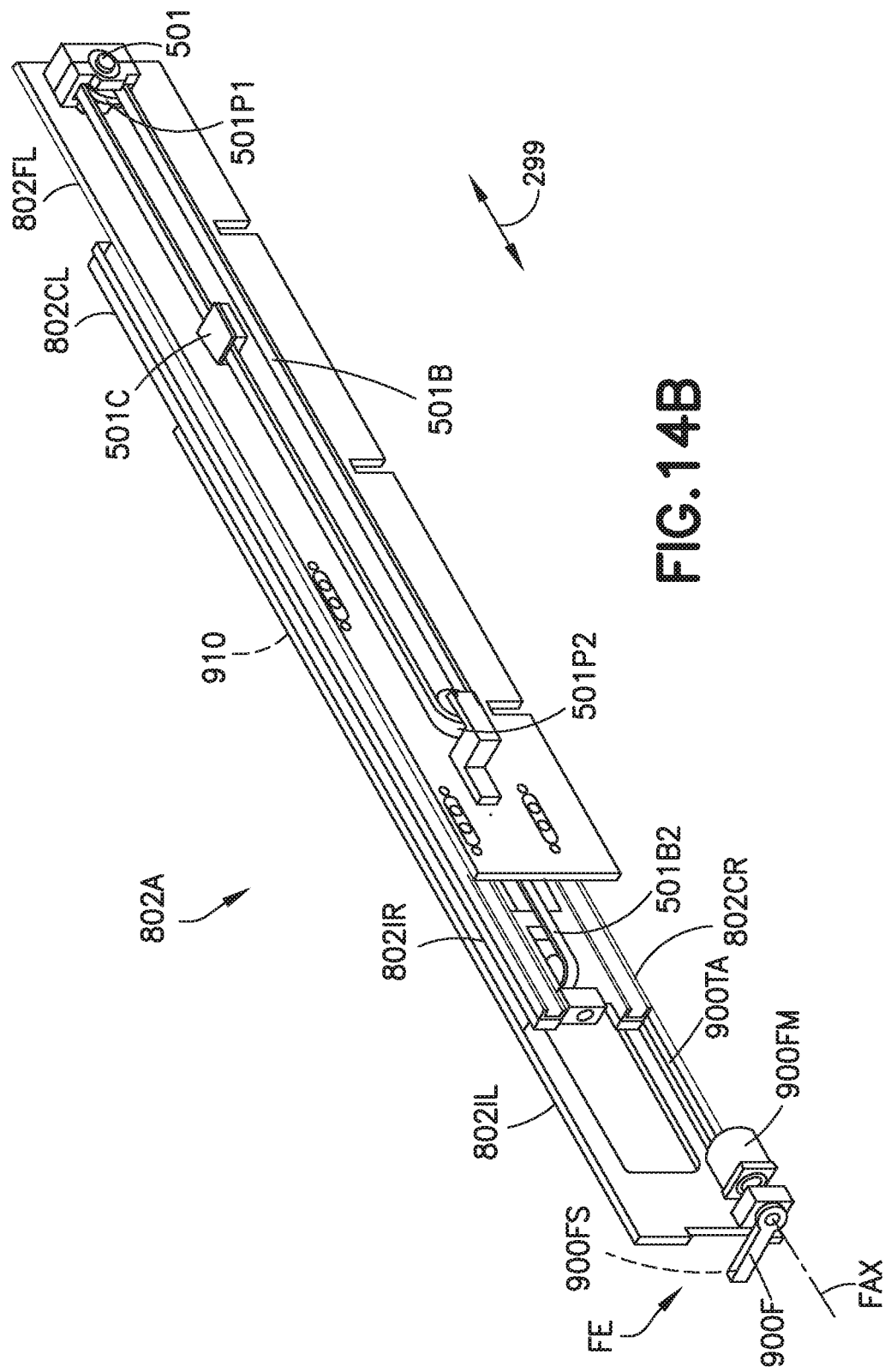

Referring now to FIGS. 13, 14A and 14B, each of the telescoping arms 802A, 802B includes three links 802FL, 802CL, 802IL but in other aspects each telescoping arm 802A, 802B includes any suitable number of links, such as more or less than two links. Here each telescoping arm includes a fixed link 802FL mounted to the arm mounts 200M, a center link 802CL, and inner link 802IL. The center link 802CL is mounted to the fixed link 802FL through any suitable linear slide 802CR or other linearly movable joint so as to be movable relative to the fixed link 802FL in the direction of arrow 299. The inner link 802IL is mounted to the center link 802CL through any suitable linear slide 802IR or other linearly movable joint so as to be movable relative to the center link 802CL in the direction of arrow 299. A drive belt 501B is mounted on the fixed link 802FL through pulleys 501P1, 501P2 where pulley 501P1 is driven a driven pulley having a drive coupling 501. A drive motor 260A is mounted to the frame 200F and is operatively coupled to one or more drive shafts 500A, 500B (two drive shafts are shown in the drawings while in other aspects more or less than two drive shafts are employed) through any suitable transmission 260AT such as, for example, a belt and pulley transmission, a gear drive transmission, a chain drive transmission or any other drive coupling. The one or more drive shafts 500A, 500B connect the motor to the drive coupling 501 so as to drive the pulley 501P1 and hence, the belt 501B. The center link 8012CL is coupled to the belt 501B with coupling 501C so that as the belt 501B moves the center link 802CL moves with the belt 501B in the direction of arrow 299. Another drive belt 501B2 is mounted on the center link 802CL with pulleys in a manner similar to that described above with respect to belt 501B. The belt 501B2 is fixed to both the fixed link 802FL and the inner link 802IL so that as the center link 802CL is driven in the direction of arrow 299, the slaved nature of the belt 501B2 causes relative movement between the inner link 802IL and the center link 802CL so that the inner link 802IL also moves in the direction of arrow 299 and the links 802FL, 802CL, 802IL extend in a telescoping manner.

In one aspect a pickface engagement or pusher member 900T is mounted to the inner link 802IL so as to be movable in the direction of arrow 299. Another pickface engagement or finger member 900F is also mounted on inner link 802IL so as to be rotatable about an axis FAX, which is substantially parallel with the direction of arrow 299, so as to be rotated between a deployed position (see FIG. 14B) and a retracted position (see FIG. 14A). The pusher member 900T is driven by a linear drive or actuator 900TM so as to reciprocate in the direction of arrow 299 within aperture 900TA of the inner link 802IL. The pusher member 900T includes a pickface engagement surface 900TS that extends in the direction of arrow 297 towards a centerline PBCL of the payload bay 200 so as to, when moved in the direction of arrow 299A, push a pickface onto a predetermined shelf 140. In one aspect the pusher member 900T effects a justification of a pickface(s), when being placed into a pickface holding location, in the direction of arrow 299 independent of, for example, one or more of pickface size, the storage rack structure (e.g. the pickface holding location) and extension/retraction of the telescoping arms 802A, 802B. In other words the movement of the pusher member 900T in the direction of arrow 299 effects an independently variable justification of a pickface along a direction of extension and retraction across the storage rack (pickface holding location) and independent of the extension/retraction of the telescoping arms 802A, 802B. As may be realized, in one aspect, the movement of one or more of the pusher member 900T in the direction of arrow 299 along with the movement of the arms 802A, 802B in the direction of one or more of arrows 299, 297 is in a plane substantially parallel with a pickface support plane of the payload bed/ area to effect the full payload area justification (e.g., as noted above, a justification of the payload anywhere in within the payload bed and anywhere within a storage shelf area that is accessible by the arms 220A, 220B) of the at least one pickface independent of a size of the at least one pickface.

The finger member 900F is rotatably mounted on the inner link 802IL through any suitable drive such as rotary motor 900FM. Also referring to FIG. 13A, the finger member 900F is disposed in the retracted position to allow the pickface 210 to travel past the free end FE when being pushed onto a shelf 140 or during extension of the end effector 802 into a pickface storage location on a shelf 140, e.g. so that each telescoping arm is extended between adjacent pickfaces so as to straddle a pickface being picked without interfering with the pickfaces located on the shelf 140. The finger member 900F includes a pickface engagement surface 900FS that engages a predetermined pickface to pull the pickface off the shelf 140 as the telescoping arms 802A, 802B move out of the shelves and transport the pickface into the payload bay 200. As can be seen in FIGS. 13, 14A, 14B the finger member 900F is located at the free end FE of the inner link 802IL and rotates about axis FAX. In operation, when the telescoping arms 802A, 802B (e.g. the end effector 802) are extended into a shelf 140 for picking a pickface 210 the finger member 900F is positioned past the end 210E of the pickface 210 and then rotated to the deployed position so that the pickface engagement surface 900FS is disposed behind the pickface 210. As the end effector 802 is retracted in the direction of arrow 299B the pickface engagement surfaces 900FS of the fingers 900F engage the pickface 210 and pull the pickface 210 into the payload bay 200.

As may be realized, the pusher member 900T is movable in the direction of arrow 299 towards or away from the finger member 900F. This reciprocating movement of the pusher member 900T relative to the finger member 900F effects the gripping (e.g. capture) and releasing of pickfaces (e.g. pickfaces having varying depths/sizes DP) between the finger members 900F and the pusher members 900T. Relative movement between the pusher members 900T and the finger members 900F also effects a justification of a pickface at the free end FE of the telescoping arms 802A, 802B (e.g. the end effector 802) so that the pickface is be pushed onto a shelf at an infinite number of predetermined positions dependent on, for example, an extension length of the end effector 802.

In one aspect, one or more of the telescoping arms 802A, 802B includes a wireless control module 910 for controlling the pusher member motor 900TM and finger motor 900FM of a respective one of the arms or both arms 802A, 802B. As may be realized, in one aspect each telescoping arm 802A, 802B includes a respective wireless control module 910 for controlling the respective motors 900TM, 900FM while in other aspects a common wireless control module 910 can control the motors 900TM, 900FM on both telescoping arms 802A, 802B. The wireless control module(s) 910 is mounted to the inner link 802IL of a respective telescoping arm 802A, 802B while in other aspects the wireless control module 910 is mounted at any suitable location of the respective telescoping arm 802A, 802B. The wireless control module 910 is configured for wireless communication with, for example, the rover controller 110C (FIG. 1) in any suitable manner such as, for example, Bluetooth, infrared, radio frequency or any other form of wireless communication. The wireless control module 910 includes a battery 910B to provide power to the motors 900TM, 900FM and contacts 910C for charging the battery 910B. For example, when the telescoping arms 802A, 802B are in there home or fully retracted configuration/position, as illustrated in FIGS. 8 and 13, the contacts 910C engage contacts 200CT of the payload bay 200 so that the batteries are recharged. Here the contacts are illustrated as mechanical contacts but in other aspects the recharging of the battery 910B may be effective through contactless charging such as by induction. As may be realized, wireless control of the pusher member motor 900TM and the finger motor 900FM substantially eliminates flexing wires between, for example, the payload bay 200 and each link of the telescoping arms 802A, 802B which can occupy a lot of space and can be a reliability problem.

In one aspect a single motor, such as motor 260A, drives both telescopic arms as best illustrated in FIG. 13. As described above, the motor 260A is mounted to the frame 200F of the payload bay 200 at, for example, in the middle rear of the payload bay 200 but in other aspects the motor 260A may be mounted at any suitable location relative to the payload bay 200. The motor 260A is coupled to any suitable transmission such as belt and pulley transmission 260AT, a chain drive transmission, a gear drive transmission or any other transmission. The transmission 260AT couples an output shaft of the motor 260A with, for example, drive shafts 500A, 500B which are oriented substantially perpendicular to the telescoping arm 802A, 802B so as to extend in either direction from, for example, the transmission 260AT. While two drive shafts 500A, 500B are illustrated, in other aspects a single drive is used. The drive shafts 500A, 500B may be any suitable shafts that include any suitable drive engagement or coupling such as, for example, spline couplings, hex couplings, flange couplings, beam couplings, rigid couplings or any other coupling for coupling the shafts 500A, 500B to the transmission 260AT and pulleys 501P1 as will be described below. For example, as described above, pulley 501P1 includes a drive coupling 501 that mates with the drive coupling of a respective one of the drive shafts 500A, 500B. In one aspect the coupling between the shafts 500A, 500B and the pulley 501P1 is a floating coupling so that the drive shafts 500A, 500B are supported by the drive coupling 501 of the pulleys 501PS disposed on in the fixed arms links 802FL in order to avoid binding from, for example, misalignment. As each pulley 501P1 is driven by a respective drive shaft 500A, 500B, each pulley 501P1 in turn drives the belt 501B on the fixed arm link 802FL of each arm 802A, 802B so as to power or otherwise drive the telescopic motion of the arms 802A, 802B. In one aspect the drive shafts 500A, 500B are configured so the drive coupling extends along the length of the drive shaft 500A, 500B so that the pulley 501P1 is able to slide along the length of the respective drive shaft 500A, 500B while maintaining a driving engagement with the drive shaft 500A, 500B. For example, as the arms 802A, 802B are moved towards or away from each other in the direction of arrow 297 the coupling 501 of each pulley 501P1 slides along the drive shaft 500A, 500B allowing the arms to be extended and retracted in an infinite number of positions within the limits of travel along the direction of arrow 297.

As may be realized, because of the way loads are distributed in the manipulator 800E, the structure of the manipulator 800E (as described herein) can be extremely light weight. For example, the masts 801A, 802B, payload bay 200 and the components thereon (e.g. for driving the telescoping arms 802A, 802B in the directions of arrows 298, 297 employ standard aluminum channel and aluminum skins held together with high strength adhesive. This type of construction allows the individual frames 200F, 200GF, 801F, 803F to be configured for large or small payloads depending on the variation of pickfaces to be handled. The telescopic arms 802A, 802B are also easily configured for varied depths of travel.

Figure 15:
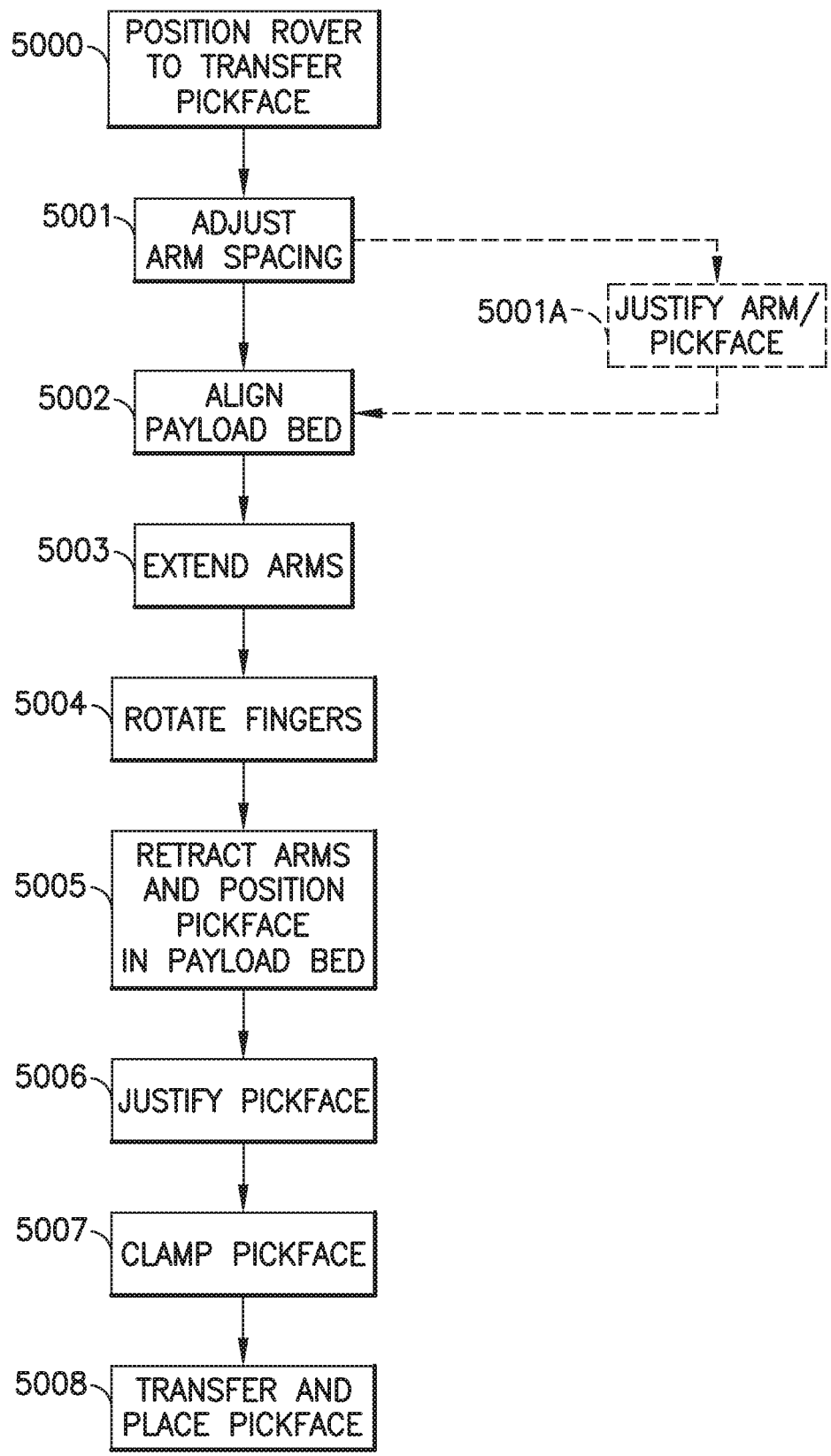
FIGS. 15 and 16 are flow charts of a pickface transfer operation in accordance with aspects of the disclosed embodiment.

Referring again to FIG. 8 an exemplary operation of the manipulator 800E will be described. The rover 110 is positioned to transfer a pickface from a shelf to the rover 110 in a manner substantially similar to that described above (FIG. 15, Block 5000). A spacing between D1' between the arms 802A, 802B is adjusted in the direction of arrow 297 to align the arms 802A, 802B with a pickface (so as to fit in the space SP between adjacent pickfaces) as illustrated in FIG. 13A (FIG. 15, Block 5001). As described above, in one aspect the rover 110 includes justification in the direction of arrow 297, the telescoping arms of the rover are moved as a unit in the direction of arrow 297 to further align the pickface with a holding location (or to align the arms with the pickface), e.g. fine positioning of the telescoping arms relative to a pickface holding location (FIG. 15, Block 5001A). The payload bay 200 is moved in the direction of arrow 298 to substantially align the pickface support surface 200S of the payload bay 200 with a support surface (or plane) 140SPL of the shelf 140 as illustrated in FIG. 13B (FIG. 15, Block 5002). The telescopic arms 802A, 802B are extended in the direction of arrow 299A (e.g. with the fingers 900F in the retracted position) so that the fingers 900F are placed behind (relative to the rover 110) or past an end 210E of the pickface 210 as illustrated in FIG. 13A) (FIG. 15, Block 5003). The fingers 900F are rotated to a deployed position (as illustrated in FIGS. 13A and 14B) (FIG. 15, Block 5004) and the telescoping arms 802A, 802B are retracted in the direction of arrow 299B so that the fingers 900F engage the pickface 210 and pull (e.g. slide) the pickface from the shelf 140 to the pickface support surface 200S of the payload bay 200 (FIG. 15, Block 5005). As may be realized, suitable clearance is provided between the inner arm links 802IL and the pickface 210 to allow the pickface to move between the inner arm links 802IL, however it should be understood that in one aspect the clearance is minimal so that the inner arm links 802IL guide movement of and justify (in the direction of arrow 297) the pickface within the payload bay. In other aspects the pickface is justified in the direction of arrow 297 in the payload bay 200, e.g. along a centerline CL (FIG. 13) of the payload bay 200 where the telescoping arms 802A, 802B are moved towards in other in the direction of arrow 297 for positioning a centerline of the pickface 210 along the centerline CL of the payload bay 200 (FIG. 15, Block 5006). The pusher members 900T are actuated in the direction of arrow 299A so as to move the pickface 210 against the fingers 900F so as to capture or clamp the pickface 210 between the pusher member(s) 900T and the finger(s) 900F (FIG. 15, Block 5007) to allow, for example, transport of the pickface. As may be realized the clamping of the pickface 210 between the pusher member(s) 900T and the fingers 900F also justifies the pickface 210 in the direction of arrow 299 so that the pickface can be placed at any suitable depth on a predetermined shelf 140 or other holding location (FIG. 15, Block 5008). In other aspects, the fingers 900F are disengaged from the pickface and the movement of the pusher members(s) 900T alone, in the direction of arrow 299, effects the justification of the pickface 210 in the direction of arrow 299 so that the pickface can be placed at any suitable depth on a predetermined shelf 140 or other holding location. As may be realized, the picking process described above may be repeated so that multiple pickfaces are arranged along the direction of arrow 299 within the payload bay 200.

Figure 16:
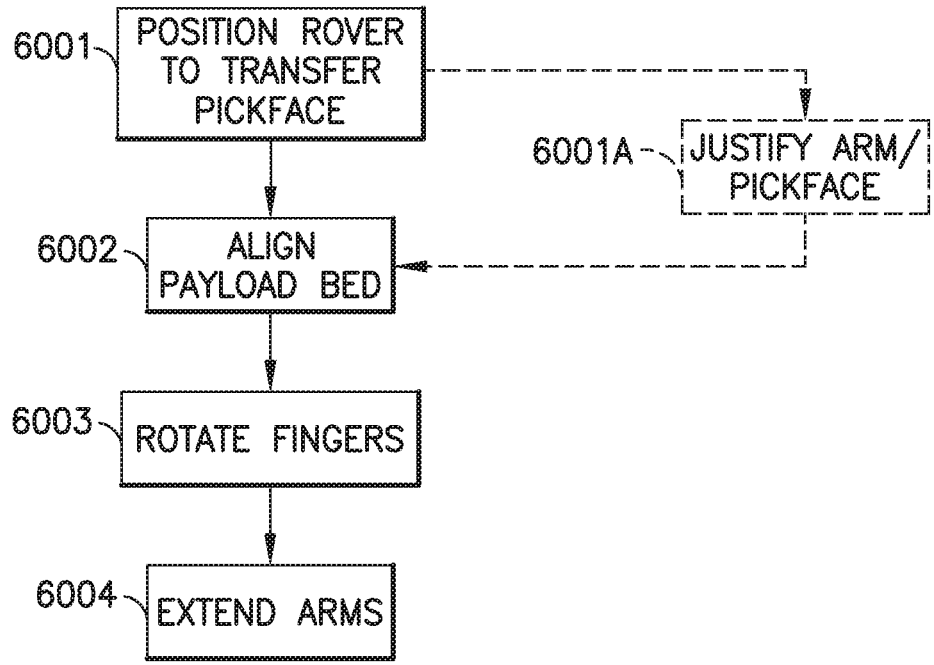
Figure 18:
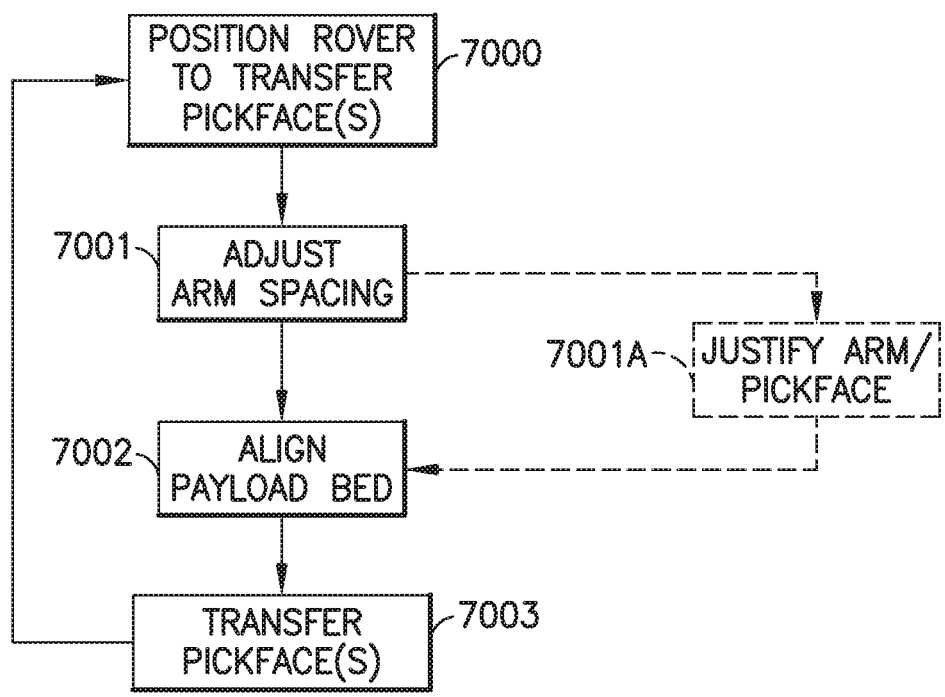

To place the pickface 210 the rover 110 is positioned to transfer a pickface from a shelf to the rover 110 in a manner substantially similar to that described above (FIG. 16, Block 6001). As described above, in one aspect the rover 110 includes justification in the direction of arrow 297, the telescoping arms of the rover are moved as a unit in the direction of arrow 297 to further align the pickface with a holding location (or to align the arms with the pickface), e.g. fine positioning of the telescoping arms relative to a pickface holding location (FIG. 16, Block 6001A). The payload bay 200 is moved in the direction of arrow 298 to substantially align the pickface support surface 200S of the payload bay 200 with a support surface (or plane) 140SPL of the shelf 140 as illustrated in FIG. 13B (FIG. 16, Block 6002). The fingers 900F are rotated to the retracted position shown in, e.g., FIG. 14A (as may be realized the gripping of the pickface between the pusher member(s) 900T and the finger(s) 900F may be sufficiently released to allow movement of the finger(s) 900F) (FIG. 16, Block 6003). The telescoping arms 802A, 802B are extended in the direction of arrow 299A so that the pusher members 900T push or slide the pickface 210 from the pickface support surface 200S of the payload bay to a support surface 140SPL of the shelf 140 or other pickface holding location (FIG. 16, Block 6004). In one aspect the pusher members 900T are moved in the direction of arrow 299A during and/or after the extension of the telescoping arms 802A, 802B to further position the pickface in the direction of arrow 299A. Referring again to FIG. 8 an exemplary pickface building operation of the rover 110 will be described. The rover 110 is positioned to transfer one or more first pickfaces 210 (FIG. 2C) from a shelf to the rover 110 in a manner substantially similar to that described above (FIG. 18, Block 7000). A spacing D1' between the arms 802A, 802B is adjusted in the direction of arrow 297 to align the arms 802A, 802B with the one or more first pickfaces 210 (so as to fit in the space SP between adjacent case units/pickfaces) as illustrated in FIG. 13A (FIG. 18, Block 7001). As described above, in one aspect the rover 110 includes justification in the direction of arrow 297, the telescoping arms of the rover are moved as a unit in the direction of arrow 297 to further align the telescoping arms 802A, 802B with the one or more first pickfaces 210, e.g. fine positioning of the telescoping arms relative to a pickface holding location (FIG. 18, Block 7001A). The payload bay 200 is moved in the direction of arrow 298 to substantially align the pickface support surface 200S of the payload bay 200 with a support surface (or plane) 140SPL of the shelf 140 as illustrated in FIG. 13B (FIG. 18, Block 7002). The telescopic arms 802A, 802B are extended and retracted in the direction of arrows 299A, 299B to transfer the one or more first pickfaces 210 to the payload bay (FIG. 18, Block 7003) in the manner described above with respect to Blocks 5003-5007 of FIG. 15. Once the one or more first pickfaces 210 are positioned within the payload bed 200 the rover 110 traverses the picking structure and is positioned relative to another pickface holding location (FIG. 18, Block 7000) for the transfer of one or more second pickfaces 210X (FIG. 2C) to the payload bay 200. The one or more first pickfaces 210 within the payload bay are unclamped and the spacing between the telescoping arms 802A, 802B are adjusted (FIG. 18, Block 7001) and/or justified (FIG. 18, Block 7001A) so as to align the telescoping arms 801A, 802B with the one or more second pickfaces 210X in the other pickface holding location. As may be realized, the one or more first pickfaces 210 already held on the payload bed 200 are moved with the telescoping arms in the direction of arrow 297 as the telescoping arms are justified. The payload bay 200 is moved in the direction of arrow 298 to substantially align the pickface support surface 200S of the payload bay 200 with a support surface (or plane) 140SPL of the shelf 140 as illustrated in FIG. 13B (FIG. 18, Block 7002). The telescopic arms 802A, 802B are extended and retracted in the direction of arrows 299A, 299B to transfer the one or more second pickfaces 210X to the payload bay (FIG. 18, Block 7003) in the manner described above with respect to Blocks 5003-5007 of FIG. 15. As may be realized, during the transfer of the one or more second pickfaces 210X into the payload bay 200 the telescoping arms 802A, 802B may be spaced from the sides of the one or more first pickfaces so that the pusher members 900T not contact the one or more first pickfaces 210 in the payload bay 200 (and/or the pusher members 900T are positioned so as to not contact the pickface in the payload bay 200). When the one or more second pickfaces 210X are located within the payload bed 200 the pusher members 900T and/or fingers 900F are used to snug the one or more first and second pickfaces together in the direction of arrows 299A, 299B. The one or more first and second pickfaces 210, 210X are transferred as a unit by the rover and placed at a pickface holding location as a unit (or at more than one pickface holding location separately) in a manner substantially opposite to that described above with respect to the transfer of the pickfaces 210, 210X into the payload bed.

In accordance with one or more aspects of the disclosed embodiment an autonomous transport vehicle is provided. The autonomous transport vehicle including a payload bed and an end effector disposed in the payload bed and configured to extend along a first axis to transfer a pickface to and from the payload bed, the end effector including at least one transfer arm and fingers that extend from the at least one transfer arm along a second axis substantially perpendicular to the first axis, the fingers being configured to support the pickface from underneath the pickface.

In accordance with one or more aspects of the disclosed embodiment the at least one transfer arm comprises two transfer arms configured to straddle opposing sides of the pickface.

In accordance with one or more aspects of the disclosed embodiment the at least one transfer arm is a telescoping transfer arm.

In accordance with one or more aspects of the disclosed embodiment each of the at least one transfer arm includes a belt drive configured to effect extension and retraction of the at least one transfer arm.

In accordance with one or more aspects of the disclosed embodiment the fingers are spaced apart by a predetermined pitch that corresponds to a pitch between support surfaces of a pickface support shelf so that the fingers pass through spaces located between the support surfaces.

In accordance with one or more aspects of the disclosed embodiment the autonomous transport vehicle includes a drive section configured to move the at least one transfer arm along a longitudinal axis of the autonomous transport vehicle.

In accordance with one or more aspects of the disclosed embodiment the autonomous transport vehicle includes a drive section configured to move each of the at least one transfer arm along a longitudinal axis of the autonomous transport vehicle independent of other ones of the at least one transfer arm.

In accordance with one or more aspects of the disclosed embodiment the autonomous transport vehicle includes a drive section configured to move the end effector in a direction substantially perpendicular to the first axis.

In accordance with one or more aspects of the disclosed embodiment the drive section is configured to move the end effector in a direction substantially perpendicular to the first axis to allow the autonomous transport vehicle to access multiple levels of stacked storage shelves.

In accordance with one or more aspects of the disclosed embodiment the fingers are fixedly mounted to the at least one transport arm.

In accordance with one or more aspects of the disclosed embodiment the fingers are movably mounted to the at least one transfer arm for movement between extended and retracted positions, where when in the extended position the fingers extend from the at least one transfer arm along the second axis.

In accordance with one or more aspects of the disclosed embodiment a storage and retrieval system is provided. The storage and retrieval system includes at least one autonomous transport vehicle including a payload bed and an end effector disposed in the payload bed and configured to extend along a first axis to transfer a pickface to and from the payload bed, at least one picking aisle configure to allow travel of the at least one autonomous transport vehicle through the picking aisle, and at least one storage shelf located adjacent the at least one picking aisle, the at least one storage shelf having spaced apart pickface support surfaces that extend along a second axis where the second axis is substantially perpendicular to the first axis and the end effector includes fingers that extend along the second axis and being configured to allow interleaving of the fingers with the pickface support surfaces.

In accordance with one or more aspects of the disclosed embodiment the end effector includes at least one transfer arm and the fingers extend from the at least one transfer arm.

In accordance with one or more aspects of the disclosed embodiment the at least one transfer arm comprises two transfer arms configured to straddle opposing sides of the pickface.

In accordance with one or more aspects of the disclosed embodiment the at least one autonomous transport vehicle includes a drive section configured to move the at least one transfer arm along a longitudinal axis of the autonomous transport vehicle.

In accordance with one or more aspects of the disclosed embodiment the at least one autonomous transport vehicle includes a drive section configured to move each of the at least one transfer arm along a longitudinal axis of the autonomous transport vehicle independent of other ones of the at least one transfer arm.

In accordance with one or more aspects of the disclosed embodiment the end effector is a telescoping end effector.

In accordance with one or more aspects of the disclosed embodiment the end effector includes at least one transfer arm and each of the at least one transfer arm includes a belt drive configured to effect extension and retraction of the end effector.

In accordance with one or more aspects of the disclosed embodiment the fingers are spaced apart by a predetermined pitch that corresponds to a pitch between the pickface support surfaces so that the fingers pass through spaces located between the support surfaces.

In accordance with one or more aspects of the disclosed embodiment the at least one autonomous transport vehicle includes a drive section configured to move the end effector in a direction substantially perpendicular to the first axis.

In accordance with one or more aspects of the disclosed embodiment the drive section is configured to move the end effector in a direction substantially perpendicular to the first axis to allow the at least one autonomous transport vehicle to access multiple levels of stacked storage shelves.

In accordance with one or more aspects of the disclosed embodiment the fingers are fixedly mounted to the end effector.

In accordance with one or more aspects of the disclosed embodiment the fingers are movably mounted to the end effector for movement between extended and retracted positions, where when in the extended position the fingers extend from the end effector along the second axis.

In accordance with one or more aspects of the disclosed embodiment a method for transferring pickfaces within a storage and retrieval system is provided where the storage and retrieval system includes at least autonomous transport vehicle, at least one picking aisle having a picking aisle deck configured to allow the at least one autonomous transport vehicle to travel along the at least one picking aisle and at least one storage shelf disposed adjacent the at least one picking aisle. The method includes extending an end effector of the at least one autonomous transport vehicle into the at least one storage shelf a predetermined distance so that arms of the end effector straddle opposing sides of a pickface, lowering the end effector so that fingers of the end effector are interleaved with and below pickface support surfaces of the at least storage shelf in a direction substantially perpendicular to an axis of extension of the end effector, positioning the fingers beneath the pickface, and lifting the pickface from the at least one storage shelf where the fingers support the weight of the pickface.

In accordance with one or more aspects of the disclosed embodiment positioning the fingers beneath the pickface comprises moving one or more arms of the end effector towards a respective side of the pickface.

In accordance with one or more aspects of the disclosed embodiment where the end effector includes arms and the method further includes adjusting a spacing between the arms so that the arms are contactlessly inserted into shelf spaces disposed along the opposing sides of the pickface.

In accordance with one or more aspects the at least one storage shelf includes stacked storage shelves and the method further includes raising or lowering the end effector to a level of one of the stacked storage shelves.

In accordance with one or more aspects of the disclosed embodiment multiple stacked storage shelves are accessible by the at least one autonomous transport vehicle from a common picking aisle deck.

In accordance with one or more aspects of the disclosed embodiment an autonomous transport vehicle includes a frame forming a payload area; telescoping arms movably mounted to the frame, each telescoping arm being configured for extension and retraction relative to the frame along an extension axis to effect transfer of at least one pickface to and from the payload area, and traversal, relative to the frame, in at least one direction that is angled to the extension axis; and at least one tab extending from each telescoping arm where the at least one tab extends in a direction transverse to the direction of extension and retraction, and the at least one tab on one of the telescoping arms opposes the at least one tab on another of the telescoping arms.

In accordance with one or more aspects of the disclosed embodiment the at least one direction is one or more of a vertical and horizontal direction.

In accordance with one or more aspects of the disclosed embodiment the autonomous transport vehicle further includes a three degree of freedom drive connected to the telescoping arms to effect the traversal of the telescoping arms and the extension and retraction of the telescoping arms.

In accordance with one or more aspects of the disclosed embodiment a distance between telescoping arms is a variable distance such that each telescoping arm has a variable location of extension and retraction.

In accordance with one or more aspects of the disclosed embodiment each telescoping arm includes a free end and a rotatable finger mounted to the free end, the rotatable finger being movable between a retracted position so as not to contact the at least one pickface and a deployed position so at to engage a vertical side of the at least one pickface and effect at least transfer of the at least one pickface into the payload area.

In accordance with one or more aspects of the disclosed embodiment each telescoping arm includes a wireless control module to effect actuation of at least a respective finger.

In accordance with one or more aspects of the disclosed embodiment each telescoping arm includes a movable pusher member that opposes the finger, the pusher member being configured to linearly move towards and away from the finger to at least clamp and release the pickface between the movable pusher member and finger.

In accordance with one or more aspects of the disclosed embodiment each telescoping arm includes a wireless control module to effect actuation of at least a movable pusher member.

In accordance with one or more aspects of the disclosed embodiment traversal of each transfer arm is in a plane substantially parallel with a pickface support plane of the payload area to effect a full payload area justification of the at least one pickface independent of a size of the at least one pickface.

In accordance with one or more aspects of the disclosed embodiment each telescoping arm includes fingers that extend from the telescoping arm along a second axis substantially perpendicular to the extension axis where the fingers are configured to support the at least one pickface from underneath the at least one pickface.

In accordance with one or more aspects of the disclosed embodiment the fingers are spaced apart by a predetermined pitch that corresponds to a pitch between support surfaces of a pickface support shelf so that the fingers pass through spaces located between the support surfaces.

In accordance with one or more aspects of the disclosed embodiment the fingers are fixedly mounted to the at least one transport arm.

In accordance with one or more aspects of the disclosed embodiment the fingers are movably mounted to the at least one transfer arm for movement between extended and retracted positions, where when in the extended position the fingers extend from the at least one transfer arm along the second axis.

In accordance with one or more aspects of the disclosed embodiment the at least one tab engages a pickface through vertical movement of the telescoping arms.

In accordance with one or more aspects of the disclosed embodiment a storage and retrieval system includes at least one autonomous transport vehicle including a frame forming a payload area, and telescoping arms movably mounted to the frame, each telescoping arm being configured for extension and retraction relative to the frame along an extension axis, and traversal, relative to the frame, in at least one direction that is angled to the extension axis; at least one picking aisle configured to allow travel of the at least one autonomous transport vehicle through the picking aisle; and at least one storage shelf located adjacent the at least one picking aisle, where extension and retraction of the telescoping arms to effects transfer of at least one pickface between the at least one storage shelf and the payload area.

In accordance with one or more aspects of the disclosed embodiment the at least one storage shelf includes more than one stacked storage shelf accessible from a common travel surface of the at least one picking aisle.

In accordance with one or more aspects of the disclosed embodiment the at least one direction is one or more of a vertical and horizontal direction.

In accordance with one or more aspects of the disclosed embodiment the at least one autonomous transport vehicle includes a three degree of freedom drive connected to the telescoping arms to effect the traversal of the telescoping arms and the extension and retraction of the telescoping arms.

In accordance with one or more aspects of the disclosed embodiment a distance between telescoping arms is a variable distance such that each telescoping arm has a variable location of extension and retraction.

In accordance with one or more aspects of the disclosed embodiment each telescoping arm includes fingers that extend from the telescoping arm along a second axis substantially perpendicular to the extension axis where the fingers are configured to support the at least one pickface from underneath the at least one pickface.

In accordance with one or more aspects of the disclosed embodiment a method for transferring pickfaces within a storage and retrieval system that includes at least one autonomous transport vehicle, at least one picking aisle having a picking aisle deck configured to allow the at least one autonomous transport vehicle to travel along the at least one picking aisle and at least one storage shelf disposed adjacent the at least one picking aisle, the method includes positioning telescoping arms of the at least one autonomous transport vehicle along at least one axis relative to a frame of the at least one autonomous transport vehicle so that the telescoping arms are disposed at a position corresponding to a predetermined location of the at least one storage shelf; extending the telescoping arms along a another axis relative to the frame so that the telescoping arms straddle opposing sides of a pickface where the at least one axis is angled relative to the other axis; and transferring the pickface into a payload area of the at least one autonomous transport vehicle through a retraction of the telescoping arms along the other axis.

In accordance with one or more aspects of the disclosed embodiment transferring the pickface into the payload area includes pulling the pickface into the payload area with rotatable fingers mounted to the telescoping arms;

In accordance with one or more aspects of the disclosed embodiment the method further includes clamping the pickface against the fingers with movable pusher members disposed on the telescoping arms.

In accordance with one or more aspects of the disclosed embodiment the method further includes wirelessly effecting actuation of at least the rotatable fingers.

In accordance with one or more aspects of the disclosed embodiment positioning the telescoping arms includes positioning the telescoping arms along two axes, where the two axes are substantially orthogonal to one another.

In accordance with one or more aspects of the disclosed embodiment an autonomous transport vehicle includes a frame forming a payload area; telescoping arms movably mounted to the frame, each telescoping arm being configured for extension and retraction relative to the frame along an extension axis to effect transfer of at least one pickface to and from the payload area, and traversal, relative to the frame, in at least one direction that is angled to the extension axis; and at least one tab extending from each telescoping arm, the at least one tab being mounted to a respective telescoping arm so as to be movable in a direction of extension and retraction of the telescoping arms to effect justification of the at least one pickface in the direction of extension and retraction independent of extension and retraction of the telescoping arms.

In accordance with one or more aspects of the disclosed embodiment the at least one tab extends in a direction transverse to the direction of extension and retraction, and the at least one tab on one of the telescoping arms opposes the at least one tab on another of the telescoping arms.

It should be understood that the foregoing description is only illustrative of the aspects of the disclosed embodiment. Various alternatives and modifications can be devised by those skilled in the art without departing from the aspects of the disclosed embodiment. Accordingly, the aspects of the disclosed embodiment are intended to embrace all such alternatives, modifications and variances that fall within the scope of the appended claims. Further, the mere fact that different features are recited in mutually different dependent or independent claims does not indicate that a combination of these features cannot be advantageously used, such a combination remaining within the scope of the aspects of the invention.

What is claimed is:

1. An autonomous transport vehicle comprising:
   a frame forming a payload area, the payload area having a fixed pickface support plane with respect to the frame;
   telescoping arm assemblies, each movably mounted so as to depend as a telescoping arm assembly unit from the frame, each telescoping arm assembly unit being configured for
      extension and retraction relative to the frame along an extension axis to effect transfer of at least one pickface to and from the payload area wherein each telescoping arm assembly unit has at least one longitudinally elongated arm portion where each longitudinally elongated arm portion is oriented so as to be longitudinally elongated along the extension axis of the telescoping arm assembly unit, and
      traversal, relative to the fixed pickface support plane of the payload area of the frame, so that each telescoping arm assembly unit and each of the at least one longitudinally elongated arm portion thereof, linearly traverses independently, from each other telescoping arm assembly unit, as a single traversing unit relative to the frame and the fixed pickface support plane in at least one linear traverse direction that is angled to the extension axis so that the traversal in each of the at least one linear traverse direction displaces the telescoping arm assembly unit, and each of the at least one longitudinally elongated arm portion thereof, as the single traversing unit in unit traverse motion in the at least one linear traverse direction relative to the fixed pickface support plane of the payload area; and
   at least one tab distinct from and depending from each telescoping arm assembly unit where the at least one tab extends in a direction transverse to the direction of extension and retraction along the extension axis, and the at least one tab on one of the telescoping arm assemblies opposes the at least one tab on the other of the telescoping arm assemblies;
   wherein each telescoping arm assembly includes a movable pusher member to which a respective tab is mounted so that the respective tab opposes the finger, the pusher member being configured to linearly move the tab along the extension axis towards and away from the finger to change a distance between the tab and the finger, independent of movement of a respective telescoping arm assembly.

2. The autonomous transport vehicle of claim 1, wherein the at least one linear traverse direction is one or more of a vertical and horizontal direction.

3. The autonomous transport vehicle of claim 1, further comprising a three degree of freedom drive connected to the telescoping arm assemblies to effect the traversal of the telescoping arm assemblies and the extension and retraction of the telescoping arm assemblies.

4. The autonomous transport vehicle of claim 1, wherein a distance between telescoping arm assemblies is a variable distance such that each telescoping arm assembly has a variable location of extension and retraction.

5. The autonomous transport vehicle of claim 1, wherein each telescoping arm assembly includes a free end and a rotatable finger mounted to the free end, the rotatable finger being movable between a retracted position so as not to contact the at least one pickface and a deployed position so at to engage a vertical side of the at least one pickface and effect at least transfer of the at least one pickface into the payload area.

6. The autonomous transport vehicle of claim 5, wherein each telescoping arm assembly includes a wireless control module to effect actuation of at least a respective finger.

7. The autonomous transport vehicle of claim 5, wherein the pusher member is configured to linearly move the tab along the extension axis towards and away from the finger, independent of movement of a respective telescoping arm assembly, to at least clamp and release the pickface between the tab, mounted on the movable pusher member, and the finger.

8. The autonomous transport vehicle of claim 7, wherein each telescoping arm assembly includes a wireless control module to effect actuation of at least a movable pusher member.

9. The autonomous transport vehicle of claim 1, wherein traversal of each telescoping arm assembly is in a plane substantially parallel with the fixed pickface support plane of the payload area to effect a full payload area justification of the at least one pickface independent of a size of the at least one pickface so that each payload seating position defined by the payload area in its entirety is within the full payload area justification.

10. The autonomous transport vehicle of claim 1, wherein each telescoping arm assembly includes fingers that extend from the telescoping arm assembly along a second axis substantially perpendicular to the extension axis where the fingers are configured to support the at least one pickface from underneath the at least one pickface.

11. The autonomous transport vehicle of claim 10, wherein the fingers are spaced apart by a predetermined pitch that corresponds to a pitch between support surfaces of a pickface support shelf so that the fingers pass through spaces located between the support surfaces.

12. The autonomous transport vehicle of claim 10, wherein the fingers are fixedly mounted to the at least one telescoping arm assembly.

13. The autonomous transport vehicle of claim 10, wherein the fingers are movably mounted to a respective telescoping arm assembly for movement between extended and retracted positions, where when in the extended position the fingers extend from the telescoping arm assembly along the second axis.

14. The autonomous transport vehicle of claim 1, wherein the at least one tab engages a pickface through vertical movement of the telescoping arm assemblies.

15. The autonomous transport vehicle of claim 1, wherein the extension of the at least one tab in the direction transverse to the direction of extension and retraction along the extension axis is independent of the at least one longitudinally elongated arm portion traversal in the at least one linear traverse direction.

16. An autonomous transport vehicle comprising:
a frame forming a payload area, the payload area having a fixed pickface support plane with respect to the frame;
telescoping arm assemblies, each movably mounted so as to depend as a telescoping arm assembly unit from the frame, each telescoping arm assembly unit being configured for
extension and retraction relative to the frame along an extension axis to effect transfer of at least one pickface to and from the payload area wherein each telescoping arm assembly unit has at least one longitudinally elongated arm portion where each longitudinally elongated arm portion is oriented so as to be longitudinally elongated along the extension axis of the telescoping arm assembly unit, and
traversal, relative to the fixed pickface support plane of the payload area of the frame, so that each telescoping arm assembly unit and each of the at least one longitudinally elongated arm portion thereof, linearly traverses independently, from each other telescoping arm assembly unit, as a single traversing unit relative to the frame and the fixed pickface support plane in at least one linear traverse direction that is angled to the extension axis so that the traversal in each of the at least one linear traverse direction displaces the telescoping arm assembly unit, and each of the at least one longitudinally elongated arm portion thereof, as the single traversing unit in unit traverse motion in the at least one linear traverse direction relative to the fixed pickface support plane of the payload area; and
at least one tab distinct from and depending from each telescoping arm assembly unit, the at least one tab being mounted to a respective telescoping arm assembly unit by a respective movable pusher member that is configured to move a respective tab along a direction of extension and retraction of the telescoping arm assemblies, independent of the extension and retraction of the telescoping arm assemblies, to change a location of the at least one tab, in the direction of extension and retraction, relative to the telescoping arm assembly unit to effect justification of the at least one pickface in the direction of extension and retraction independent of extension and retraction of the telescoping arm assemblies.

17. The autonomous transport vehicle of claim 16, wherein the at least one tab extends in a direction transverse to the direction of extension and retraction, and the at least one tab on one of the telescoping arm assemblies opposes the at least one tab on another of the telescoping arm assemblies.

* * * * *